US012517629B2

(12) United States Patent
Zhou

(10) Patent No.: US 12,517,629 B2
(45) Date of Patent: Jan. 6, 2026

(54) FEEDBACK METHOD, APPARATUS, AND SYSTEM

(71) Applicant: HUAWEI TECHNOLOGIES CO., LTD., Guangdong (CN)

(72) Inventor: Guiyan Zhou, Dongguan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 302 days.

(21) Appl. No.: 18/255,026

(22) PCT Filed: Nov. 26, 2021

(86) PCT No.: PCT/CN2021/133686
§ 371 (c)(1),
(2) Date: May 30, 2023

(87) PCT Pub. No.: WO2022/111653
PCT Pub. Date: Jun. 2, 2022

(65) Prior Publication Data
US 2024/0053868 A1    Feb. 15, 2024

(30) Foreign Application Priority Data

Nov. 30, 2020  (CN) .......................... 202011384377.3
Feb. 28, 2021  (CN) .......................... 202110222284.9

(51) Int. Cl.
*G06F 3/0484* (2022.01)

(52) U.S. Cl.
CPC .................................. *G06F 3/0484* (2013.01)

(58) Field of Classification Search
CPC .................................................. G06F 3/0484
See application file for complete search history.

(56) References Cited

U.S. PATENT DOCUMENTS

| 6,874,125 B1 * | 3/2005 | Carroll .................... G06F 9/451 715/764 |
| 8,886,552 B2 * | 11/2014 | Finkelstein ............ G06Q 30/02 705/7.29 |
| 9,772,748 B2 * | 9/2017 | Khanna ................. G06F 3/0482 |
| 10,129,156 B2 * | 11/2018 | Fan ..................... H04L 41/0893 |
| 2006/0085141 A1 * | 4/2006 | Neacsu ............... H01J 49/0036 702/23 |

(Continued)

FOREIGN PATENT DOCUMENTS

| CN | 103699396 A | 4/2014 |
| CN | 109471976 A | 3/2019 |
| CN | 110032698 A | 7/2019 |

OTHER PUBLICATIONS

Extended European Search Report in European Appln No. 21897153.9, dated Apr. 3, 2024, 29 pages.

*Primary Examiner* — Tadesse Hailu
(74) *Attorney, Agent, or Firm* — Fish & Richardson P.C.

(57) ABSTRACT

In an example, a method includes: obtaining an operation behavior of a user on at least one display interface of a first application; generating a feedback button on a current display interface after determining that the operation behavior successfully matches a feedback policy of the first application, where whether to generate the feedback button is determined based on the feedback policy; obtaining feedback information of the user for the first application based on the feedback button; and uploading the feedback information to a server.

19 Claims, 46 Drawing Sheets

(56) References Cited

U.S. PATENT DOCUMENTS

| | | | | |
|---|---|---|---|---|
| 2007/0127693 A1* | 6/2007 | D'Ambrosio | .......... | G06Q 30/02 |
| | | | | 379/265.06 |
| 2010/0036779 A1* | 2/2010 | Sadeh-Koniecpol | ... | H04L 63/20 |
| | | | | 709/224 |
| 2012/0221955 A1* | 8/2012 | Raleigh | ................ | H04M 15/00 |
| | | | | 726/1 |
| 2012/0303421 A1* | 11/2012 | Yokoi | ................... | G06Q 10/06 |
| | | | | 705/7.42 |
| 2013/0050118 A1* | 2/2013 | Kjelsbak | ................ | G06F 3/017 |
| | | | | 345/173 |
| 2013/0191197 A1* | 7/2013 | Hamrick | ........... | G06Q 30/0217 |
| | | | | 705/14.19 |
| 2013/0275429 A1* | 10/2013 | York | .................... | G06F 16/435 |
| | | | | 707/E17.002 |
| 2015/0262208 A1* | 9/2015 | Bjontegard | ........ | G06Q 30/0205 |
| | | | | 705/7.31 |
| 2016/0063523 A1* | 3/2016 | Nistor | ................ | G06Q 30/0203 |
| | | | | 705/7.32 |
| 2016/0086782 A1* | 3/2016 | Lock | .................... | H01J 49/004 |
| | | | | 250/288 |
| 2016/0196588 A1* | 7/2016 | Wei | ........................ | H04L 67/02 |
| | | | | 705/14.73 |
| 2016/0291937 A1* | 10/2016 | Khanna | ................ | G06F 3/0484 |
| 2016/0364774 A1* | 12/2016 | Wittsiepe | ........... | G06Q 30/0282 |
| 2017/0108995 A1* | 4/2017 | Ali | ........................ | G06F 3/0481 |
| 2018/0095612 A1* | 4/2018 | Rapp | .................... | G06F 3/04817 |
| 2018/0285102 A1* | 10/2018 | Sachdev | ............. | G06F 11/3692 |
| 2020/0357622 A1* | 11/2020 | Arnold | ................. | H01J 49/025 |
| 2022/0014512 A1* | 1/2022 | Raleigh | .................. | H04L 63/20 |

* cited by examiner

FEEDBACK METHOD, APPARATUS, AND SYSTEM

CROSS-REFERENCE TO RELATED APPLICATIONS

This application is a national stage of International Application No. PCT/CN2021/133686, filed on Nov. 26, 2021, which claims priority to Chinese Patent Application No. 202011384377.3 filed on Nov. 30, 2020 and Chinese Patent Application No. 202110222284.9, filed on Feb. 28, 2021. Both of the aforementioned applications are hereby incorporated by reference in their entireties.

TECHNICAL FIELD

This application relates to the field of terminal technologies, and in particular, to a feedback method, apparatus, and system.

BACKGROUND

To design a software application that conforms to a use habit of a user and better improve user experience, a software application developer often needs to obtain feedback of the user on a use status of the software application based on a technology of feedback interaction between the user and the software application, to improve the software application with reference to feedback information of the user. However, an existing application feedback method is weak in flexibility, and user experience is poor.

SUMMARY

Embodiments of this application provide a feedback method, apparatus, and system, to resolve a problem that an operation is complex, flexibility is poor, and user experience is low when a user performs application feedback.

According to a first aspect, an embodiment of this application provides an application feedback method, where the method includes: A terminal device obtains an operation behavior of a user on at least one display interface of a first application; generates a feedback button on a current display interface after determining that the operation behavior successfully matches a feedback policy of the first application, where the feedback policy is used to determine whether to generate the feedback button; obtains feedback information of the user for the first application based on the feedback button; and uploads the feedback information to a server.

According to the foregoing method, when the user uses the application, whether the user needs to perform application feedback can be dynamically determined with reference to the operation behavior of the user, and a feedback button is dynamically generated when it is determined that the user behavior complies with a preset feedback policy. This implements feedback interaction between the user and the application, has high flexibility, and improves user experience.

In a possible design, the terminal device displays a plug-in used for performing application feedback in a search interface based on a plug-in attribute indicated in the feedback policy; and the plug-in attribute includes a part or all of a plug-in type, a plug-in location, a plug-in size, a plug-in color, and a plug-in shape.

According to the foregoing method, the configured feedback policy in this embodiment of this application may further include the attribute of the generated plug-in, so that after a generation condition of the plug-in is met, the terminal device may directly generate the plug-in based on the plug-in attribute indicated in the feedback policy, and adaptability is strong.

In a possible design, the feedback policy includes at least one piece of policy information; and the policy information includes one or more of a tap operation, a page flipping operation, a scrolling operation, browsing duration, an entering operation, and an object opening operation.

According to the foregoing method, an embodiment of this application provides a feedback policy design method. The feedback policy may be designed with reference to a user behavior. For example, the feedback policy is designed with reference to a part or all of user behaviors such as selecting and staying duration, user entering, opening an object, user tapping, user page turning, and user scrolling.

In a possible design, before obtaining an operation behavior on at least one display interface, the terminal device detects a first operation of the user, where the first operation is an operation of opening the first application; and obtains the feedback policy of the first application from the server; or detects a first operation of the user, where the first operation is an operation of opening the first application; and obtains the feedback policy of the first application locally.

According to the foregoing method, this embodiment of this application provides a plurality of manners of obtaining the feedback policy.

In a possible design, before determining that the operation behavior successfully matches the feedback policy of the first application, the terminal device collects an operation behavior of the user after detecting that the user has a search behavior performed on the first application.

In a possible design, before determining that the operation behavior successfully matches a feedback policy of the first application, the terminal device determines scenario information of the first application, and determines a feedback policy corresponding to the scenario information based on a correspondence between scenario information and a feedback policy.

According to the foregoing method, different feedback policies are configured for different display scenarios, so that adaptability is stronger and user experience is better.

In a possible design, when the current scenario information indicates a box box scenario, the feedback policy includes at least one of the following parameters: tapping times, and browsing duration; when the current scenario information indicates an information stream scenario, the feedback policy includes at least one of the following parameters: scrolling times, and browsing duration; when the current scenario information indicates a web page scenario, the feedback policy includes at least one of the following parameters: object opening times, and browsing duration; and when the current scenario information indicates an entering scenario, the feedback policy includes at least one of the following parameters: entering times, and staying duration of a cursor in a search bar.

In a possible design, after receiving a feedback progress query instruction sent by the user, the terminal device obtains feedback progress of the first application.

In a possible design, after the terminal device displays the plug-in used for performing application feedback in the search interface, the method further includes: After the terminal device does not detect that the user performs an operation on the plug-in within threshold duration, the plug-in displayed in the search interface disappears.

According to the foregoing method, if the user does not perform an operation on the plug-in within the threshold duration, the plug-in displayed in the search interface disappears, which can effectively reduce display interface space occupied by the plug-in.

In a possible design, after the terminal device displays the plug-in used for performing application feedback in the search interface, after the terminal device detects that the user performs an operation on the plug-in, a feedback interface associated with the plug-in is displayed in the search interface; and the terminal device receives feedback information entered by the user through the feedback interface, and uploads the feedback information to a server corresponding to the search application.

According to the foregoing method, the terminal device receives the application feedback information from the server, and may improve and update the application based on the application feedback information, so that an updated application can better conform to a use habit of a user, and user experience can be improved.

In a possible design, the terminal device receives the feedback information entered by the user through the feedback interface; the terminal device determines an improvement solution of the search application based on the feedback information; and the terminal device sends the improvement solution to the server.

In a possible design, after the terminal device uploads the feedback information to the server, the terminal device receives an update file of the search application sent by the server, where the update file is determined by the server based on the improvement solution of the search application; and the terminal device updates the search application based on the update file of the search application.

In a possible design, the terminal device records a status of triggering the plug-in by the user, and the terminal device adjusts the feedback policy based on the status of triggering the feedback button by the user.

According to the foregoing method, the terminal device may adjust the feedback policy based on an actual behavior of the user, so that a designed feedback policy can better conform to a behavior habit of the user, and user experience is better.

According to a second aspect, an embodiment of this application provides an application feedback apparatus. The apparatus has a function of implementing the terminal device in the foregoing embodiment. The function may be implemented by hardware, or may be implemented by hardware executing corresponding software. The hardware or software includes one or more units or modules corresponding to the foregoing functions.

In a possible implementation, the communication apparatus may be the terminal device, or a component that may be used in the terminal device, for example, a chip, a chip system, or a circuit. The application feedback apparatus may include a transceiver and a processor. The processor may be configured to support the application feedback apparatus in performing a corresponding function of the terminal device shown above. The transceiver is configured to support communication between the application feedback apparatus and another device (for example, a server). Optionally, the application feedback apparatus may further include a memory. The memory may be coupled to the processor, and the memory stores program instructions and data that are necessary for the application feedback apparatus. The transceiver may be an independent receiver, an independent transmitter, a transceiver integrating receiving and sending functions, or an interface circuit.

According to a third aspect, an embodiment of the present invention provides an application feedback apparatus. The apparatus includes at least one processing unit and at least one storage unit, where the storage unit stores program code, and when the program code is executed by the processing unit, the processing unit is enabled to perform the following process: obtaining an operation behavior of a user on at least one display interface of a first application; generating a feedback button on a current display interface after it is determined that the operation behavior successfully matches a feedback policy of the first application, where the feedback policy is used to determine whether to generate a feedback button; obtaining feedback information of the user for the first application based on the feedback button; and uploading the feedback information to a server.

In a possible implementation, the processor is specifically configured to:

display a plug-in used for performing application feedback in a search interface based on a plug-in attribute indicated in the feedback policy, where the plug-in attribute includes a part or all of a plug-in type, a plug-in location, a plug-in size, a plug-in color, and a plug-in shape.

In a possible design, the feedback policy includes at least one piece of policy information; and the policy information includes one or more of a tap operation, a page flipping operation, a scrolling operation, browsing duration, an entering operation, and an object opening operation.

In a possible implementation, the processing unit is further configured to:

if it is not detected that the user performs an operation on the plug-in within threshold duration, enable the plug-in displayed in the search interface to disappear.

In a possible implementation, before obtaining the operation behavior of the user on the at least one display interface, the processing unit is further configured to: detect a first operation of the user, where the first operation is an operation of opening the first application; and obtain the feedback policy of the first application from the server; or detect a first operation of the user, where the first operation is an operation of opening the first application; and obtain the feedback policy of the first application locally.

In a possible implementation, before determining that the operation behavior successfully matches the feedback policy of the first application, the processing unit is further configured to collect an operation behavior of the user after detecting that the user performs a search behavior on the first application.

In a possible design, when the current scenario information indicates a box box scenario, the feedback policy includes at least one of the following parameters: tapping times, and browsing duration; when the current scenario information indicates an information stream scenario, the feedback policy includes at least one of the following parameters: scrolling times, and browsing duration; when the current scenario information indicates a web page scenario, the feedback policy includes at least one of the following parameters: object opening times, and browsing duration; and when the current scenario information indicates an entering scenario, the feedback policy includes at least one of the following parameters: entering times, and staying duration of a cursor in a search bar.

In a possible design, after receiving a feedback progress query instruction sent by the user, the processing unit is further configured to obtain feedback progress of the first application. In a possible implementation, the processing unit is further configured to:

after detecting that the user performs an operation on the plug-in, display a feedback interface associated with the plug-in in the search interface; and the terminal device receives feedback information entered by the user through the feedback interface, and uploads the feedback information to a server corresponding to the search application.

In a possible implementation, the processing unit is specifically configured to:
receive the feedback information entered by the user through the feedback interface; determine an improvement solution of the search application based on the feedback information; and sends the improvement solution to the server.

In a possible implementation, the processing unit is further configured to:
receive an update file of the search application sent by the server, where the update file is determined by the server based on the improvement solution of the search application; and update the search application based on the update file of the search application.

In a possible implementation, the processing unit is further configured to:
record a status of triggering the plug-in by the user, and adjust the feedback policy based on the status of triggering the feedback button by the user.

According to a fourth aspect, an embodiment of this application further provides a chip system, including a processor, and optionally further including a memory. The memory is configured to store a computer program, and the processor is configured to invoke the computer program from the memory, and run the computer program, to enable an application feedback apparatus on which the chip system is installed to perform any method in any one of the first aspect or the possible implementations of the first aspect.

According to a fifth aspect, an embodiment of this application provides a feedback system, including a terminal device and a server, where
the terminal device is configured to: obtain an operation behavior of a user on at least one display interface of a first application; generate a feedback button on a current display interface after determining that the operation behavior successfully matches a feedback policy of the first application, where the feedback policy is used to determine whether to generate a feedback button; obtain feedback information of the user for the first application based on the feedback button; and upload the feedback information to a server; and
the server is configured to: receive the feedback information uploaded by the terminal device, and improve the first application based on the feedback information.

In a possible implementation, the terminal device is further configured to: after receiving a feedback progress query instruction for the first application sent by the user, obtain feedback progress of the first application from the server; and
the server is further configured to: notify the terminal device of the feedback progress of the first application.

In a possible implementation, the terminal device is further configured to: determine scenario information of the first application; and determine a feedback policy corresponding to the scenario information based on a correspondence between scenario information and a feedback policy.

According to a sixth aspect, an embodiment of this application provides a computer-readable storage medium. The storage medium stores a computer program or instructions, and when the computer program or the instructions is/are executed by an application feedback apparatus, any one of the first aspect and the possible designs of the first aspect is implemented.

According to a seventh aspect, an embodiment of this application provides a computer program application including a program. When the application runs on an application feedback apparatus, the application feedback apparatus is enabled to perform any one of the first aspect or the possible designs of the first aspect.

DESCRIPTION OF EMBODIMENTS

For ease of understanding, an embodiment of this application provides an application scenario in which a user performs application feedback when using a software application by using a terminal device. After the user opens a browser application in a mobile phone, an operation behavior of the user is recorded, and when it is determined that the operation behavior of the user complies with a feedback policy, a feedback button is generated on a current interface.

The user may tap the feedback button to provide feedback and perform dynamic interaction with the browser.

The following describes a system architecture to which an application feedback method provided in embodiments of this application is applied.

Figure 1:
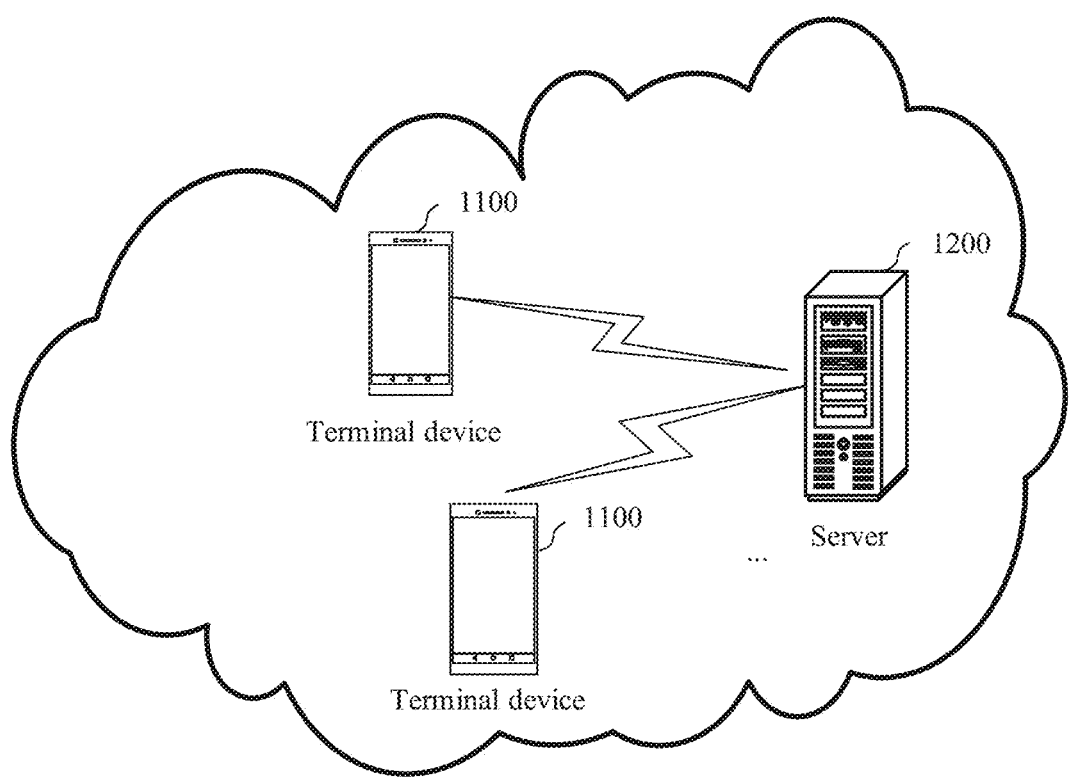
FIG. 1 is a schematic diagram of an architecture of an application feedback system according to an embodiment of this application.

As shown in FIG. 1, an architecture of an application feedback system provided in an embodiment of this application includes at least one terminal device 1100 and a server 1200.

The terminal device 1100 and the server 1200 are interconnected through a communication network. The communication network may be a local area network, or may be a wide area network connected by using a relay (relay) device. For example, when the communication network is a local area network, the communication network may be a short-range communication network such as a Wi-Fi hotspot network, a Wi-Fi P2P network, a Bluetooth network, a ZigBee network, or a near field communication (near field communication, NFC) network. When the communication network is a wide area network, for example, the communication network may be the 3rd generation mobile communication technology (3rd-generation wireless telephone technology, 3G) network, a 4th generation mobile communication technology (the 4th generation mobile communication technology, 4G) network, a 5th generation mobile communication technology (5th-generation mobile communication technology, 5G) network, a future evolved public land mobile network (public land mobile network, PLMN), or the Internet.

Further, hardware structures and software structures of the terminal device 1100 and the server 1200 are described by using examples.

1. Terminal Device 1100

Figure 2:
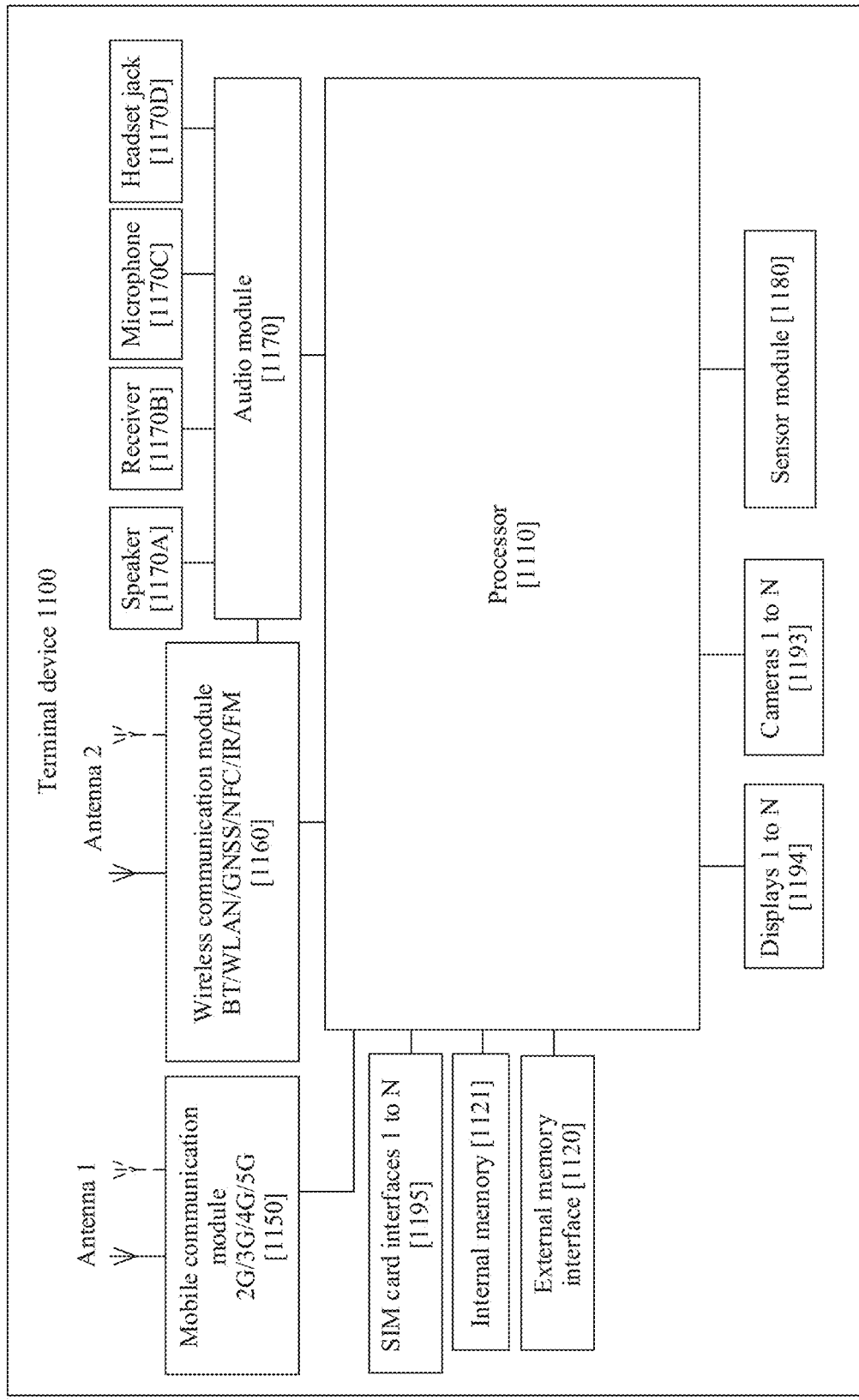
FIG. 2 is a schematic diagram of an internal structure of a terminal device according to an embodiment of this application.

In some embodiments, the terminal device 1100 may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop (laptop) with a touch-sensitive surface (for example, a touch panel). The following describes an example in which the terminal device 1100 is a mobile phone. FIG. 2 is a block diagram of a partial structure of the terminal device 1100 related to embodiments of this application.

As shown in FIG. 2, the terminal device 1100 is a mobile phone, and the phone may include a processor 1110, an external memory interface 1120, an internal memory 1121, a USB interface 1130, a charging management module 1140, a power management module 1141, a battery 1142, an antenna 1, an antenna 2, a mobile communication module 1150, a wireless communication module 1160, an audio module 1170, a speaker 1170A, a receiver 1170B, a microphone 1170C, a headset jack 1170D, a sensor module 1180, a button 1190, a motor 1191, an indicator 1192, a camera 1193, a display 1194, a SIM card interface 1195, and the like.

It may be understood that the structure shown in this embodiment of this application does not constitute a specific limitation on the terminal device 1100. In some other embodiments of this application, the terminal device 1100 may include more or fewer components than those shown in the figure, combine some components, split some components, or have different component arrangements. The components shown in the figure may be implemented by hardware, software, or a combination of software and hardware.

The processor 1110 may include one or more processing units. For example, the processor 1110 may include an application processor (application processor, AP), a modem processor, a graphics processing unit (graphics processing unit, GPU), an image signal processor (image signal processor. ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the terminal device 1100. The controller may generate an operation control signal based on an instruction operation code and a time sequence signal, to complete control of instruction reading and instruction execution.

A memory may be further disposed in the processor 1110 in this embodiment of this application, and is configured to store instructions and data. In some embodiments, the memory in the processor 1110 is a cache memory. The memory may store instructions or data that has been used or cyclically used by the processor 1110. If the processor 1110 needs to use the instructions or the data again, the processor 1110 may directly invoke the instructions or the data from the memory. This avoids repeated access and reduces a waiting time of the processor 1110, and therefore improves system efficiency.

In some embodiments, the processor 1110 may include one or more interfaces. The interface may be an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface, MIPI), a general-purpose input/output (general-purpose input/output. GPIO) interface, a subscriber identity module (subscriber identity module, SIM) interface, a universal serial bus (universal serial bus, USB) interface, and/or the like.

A wireless communication function of the terminal device 1100 may be implemented through the antenna module 1, the antenna module 2, the mobile communication module 1150, the wireless communication module 1160, the modem processor, the baseband processor, and the like.

The antenna 1 and the antenna 2 are configured to transmit and receive an electromagnetic wave signal. Each antenna in the terminal device 1100 may be configured to cover one or more communication frequency bands. Different antennas may be further multiplexed, to improve antenna utilization. For example, a cellular network antenna may be multiplexed as a diversity antenna of a wireless local area network. In some other embodiments, the antenna may be used in combination with a tuning switch.

The mobile communication module 1150 may provide a solution applied to the terminal device 1100 for wireless communication such as 2G/3G/4G/5G. The mobile communication module 1150 may include at least one filter, a switch, a power amplifier, a low noise amplifier (Low Noise Amplifier, LNA for show below), and the like. The mobile communication module 1150 may receive an electromagnetic wave through the antenna 1, perform processing such as filtering or amplification on the received electromagnetic wave, and transmit the electromagnetic wave to the modem processor for demodulation. The mobile communication module 1150 may further amplify a signal modulated by the modem processor, and convert the signal into an electromagnetic wave for radiation through the antenna 1. In some embodiments, at least some function modules in the mobile communication module 1150 may be disposed in the processor 1110. In some embodiments, at least some function modules in the mobile communication module 1150 may be disposed in a same component as at least some modules in the processor 1110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 1170A, the receiver 1170B, or the like), or displays an image or a video on the display 1194. In some embodiments, the modem processor may be an independent component. In some other embodiments, the modem processor may be independent of the processor 1110, and is disposed in a same component as the mobile communication module 1150 or another functional module.

The wireless communication module 1160 may provide a wireless communication solution that is applied to the terminal device 1100 and that includes a wireless local area network (wireless local area networks, WLAN), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 1160 may be one or more components integrating at least one communication processing module. The wireless communication module 1160 receives an electromagnetic wave through the antenna 2, performs frequency modulation and filtering processing on an electromagnetic wave signal, and sends a processed signal to the processor 1110. The wireless communication module 1160 may further receive a to-be-sent signal from the processor 1110, perform frequency modulation and amplification on the signal, and convert a processed signal into an electromagnetic wave for radiation through the antenna 2.

In some embodiments, in the terminal device 1100, the antenna 1 and the mobile communication module 1150 are coupled, and the antenna 2 and the wireless communication module 1160 are coupled, so that the terminal device 1100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The terminal device 1100 may implement a display function through the GPU, the display 1194, the application processor, and the like. The GPU is a microprocessor for image processing, and is connected to the display 1194 and the application processor. The GPU is configured to: perform mathematical and geometric computation, and render an image. The processor 1110 may include one or more GPUs that execute program instructions to generate or change display information. In this embodiment of this application, the terminal device 1100 plays and displays a short video by using the GPU, the display 1194, the application processor, and the like.

The display 1194 is configured to display an image, a video, and the like. The display 1194 includes a display panel. The display panel may use an LCD (liquid crystal display, liquid crystal display), an OLED (organic light-emitting diode, organic light-emitting diode), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), and the like. In some embodiments, the terminal device 1100 may include one or N displays, where N is a positive integer greater than 1.

The terminal device 1100 may implement a photographing function through the ISP, the camera 1193, the video codec, the GPU, the display 1194, the application processor, and the like.

The ISP is configured to process data fed back by the camera 1193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and a skin color of the image. The ISP may further optimize parameters such as exposure and a color temperature of a photographing scenario. In some embodiments, the ISP may be disposed in the camera 1193.

The camera 1193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal device 1100 may include one or N cameras, where N is a positive integer greater than 1.

The digital signal processor is configured to process a digital signal, and may process another digital signal in addition to the digital image signal. For example, when the terminal device 1100 selects a frequency, the digital signal processor is configured to perform Fourier transform and the like on frequency energy.

The video codec is configured to compress or decompress a digital video. The terminal device 1100 may support one or more types of video codecs. In this way, the terminal device 1100 may play or record videos in a plurality of encoding formats, for example, MPEG 1, MPEG 2, MPEG 3, and MPEG 4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the terminal device 1100, for example, image recognition, face recognition, speech recognition, and text understanding, may be implemented through the NPU.

The external memory interface 1120 may be configured to connect to an external storage card, for example, a micro SD card, to extend a storage capability of the terminal device 1100. The external memory card communicates with the processor 1110 through the external memory interface 1120, to implement a data storage function. For example, files such as music and videos are stored in the external storage card.

The internal memory 1121 may be configured to store computer-executable program code. The executable program code includes instructions. The processor 1110 executes various function applications and data processing of the terminal device 1100 by running the instructions stored in the internal memory 1121. The memory 1121 may include a program storage area and a data storage area. The program storage area may store an operating system, an application required by at least one function (for example, a sound playing function or an image playing function), and the like. The data storage area may store data (for example, audio data and a phone book) and the like created during use of the terminal device 1100. In addition, the memory 1121 may include a high-speed random access memory, and may further include a non-volatile memory such as at least one disk storage device, a flash memory, or a universal flash storage (universal flash storage, UFS).

The terminal device 1100 may implement an audio function, for example, music playing and recording, through the audio module 1170, the speaker 1170A, the receiver 1170B, the microphone 1170C, the headset jack 1170D, the application processor, and the like.

The audio module 1170 is configured to convert digital audio information into an analog audio signal for output, and is also configured to convert an analog audio input into a digital audio signal. The audio module 1170 may be further configured to encode and decode an audio signal. In some embodiments, the audio module 1170 may be disposed in the processor 1110, or some function modules in the audio module 1170 are disposed in the processor 1110.

The speaker 1170A, also referred to as a "horn", is configured to convert an audio electrical signal into a sound signal. The terminal device 1100 may listen to music or listen to a hands-free call by using the speaker 1170A.

The receiver 1170B, also referred to as an "earpiece", is configured to convert an audio electrical signal into a sound signal. When a call is answered or speech information is received by using the terminal device 1100, the receiver 1170B may be put close to a human ear to listen to a speech.

The microphone 1170C, also referred to as a "mike" or a "mic", is configured to convert a sound signal into an electrical signal. When making a call or sending a voice message, a user may make a sound near the microphone 1170C through the mouth of the user, to input a sound signal to the microphone 1170C. At least one microphone 1170C may be disposed in the terminal device 1100. In some other embodiments, two microphones may be disposed in the terminal device 1100, to collect a sound signal and further implement a noise reduction function. In still some other embodiments, three, four, or more microphones may alternatively be disposed in the terminal device 1100, to collect a sound signal, implement noise reduction, and identify a sound source, to implement a directional recording function and the like. In this embodiment of this application, the microphone 1170C may be configured to collect a voice of a user, for example, a first voice of a first language of a first user.

In embodiments of this application, an Android system with a layered architecture is used as an example to describe a software structure of the terminal device 1100.

Figure 3:
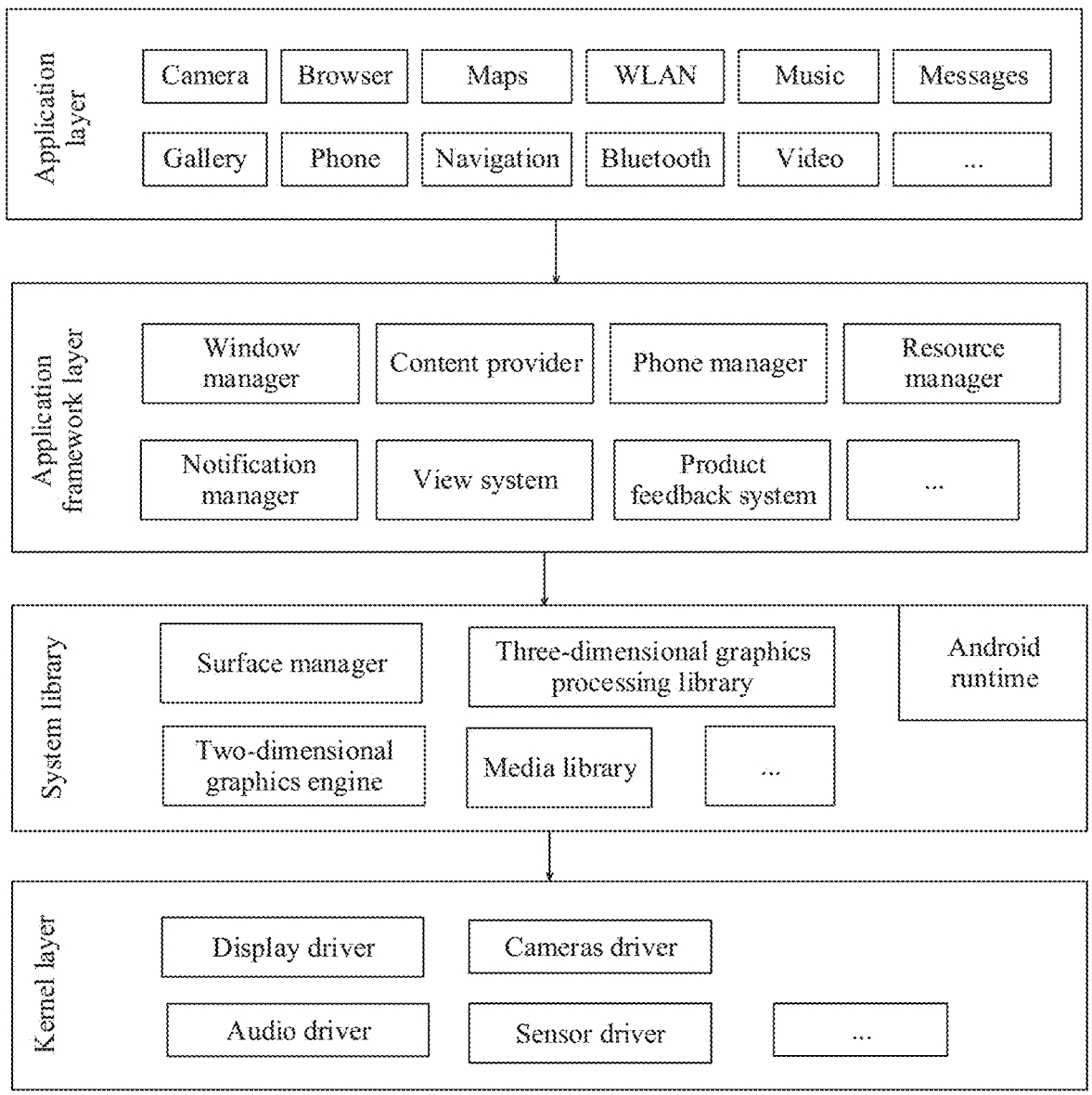
FIG. 3 is a schematic diagram of a structure of an Android operating system of a terminal device according to an embodiment of this application.

FIG. 3 is a block diagram of a software structure of the terminal device 1100 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

(1) In this embodiment of this application, the application layer of the terminal device 1100 may include a series of application packages.

As shown in FIG. 3, the application packages may include applications such as Dialer, Camera. Gallery, Browser, Phone, Map, Navigation, WLAN, Bluetooth, Music, Videos, and Massages.

(2) Application Framework Layer:

In an optional manner of this embodiment of this application, the application framework layer in the terminal device 1100 provides an application programing interface (application programing interface, API) and a programming framework for an application at the application layer. The application framework layer may include some predefined functions.

As shown in FIG. 3, the application framework layer may include a window manager, a content provider, a view system, a telephony manager, a resource manager, a notification manager, an application feedback system, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is used to provide a communication function of the terminal device 1100, for example, management of a call status (including answering or declining).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The application feedback system is configured to execute the application feedback method in this embodiment of this application, and may dynamically generate a feedback button when detecting that an operation behavior of a user on an application complies with a feedback policy of the application, to implement interaction between the user and the application.

(3) Android Runtime and System Library:

In this embodiment of this application, the Android Runtime in the terminal device 1100 may include a kernel library and a virtual machine, and is configured to be responsible for scheduling and management of an Android system.

Further, the kernel library in this embodiment of this application includes two parts: a function that needs to be invoked in java language and a kernel library of Android.

The virtual machine in this embodiment of this application is configured to implement functions such as object lifecycle management, stack management, thread management, security and exception management, and garbage collection. For example, the application layer and the application framework layer run on the virtual machine. The virtual machine executes java files of the application layer and the application framework layer as binary files.

The system library in this embodiment of this application may include a plurality of function modules, for example, a surface manager (surface manager), a media library (Media Libraries), a three-dimensional graphics processing library (for example, OpenGL ES), and a 2D graphics engine (for example, SGL).

Further, the surface manager in this embodiment of this application is used to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG 4, H.264, MP3, AAC, AMR. JPG, and PNG.

The three-dimensional graphics processing library is configured to implement three-dimensional graphics drawing, image rendering, composition, layer processing, and the like.

The 2D graphics engine is a drawing engine for 2D drawing.

(4) Kernel Layer:

In this embodiment of this application, the kernel layer of the terminal device 1100 may be a layer between hardware and software, and includes at least a display driver, a camera driver, an audio driver, and a sensor driver.

2. Server 1200

Figure 4:
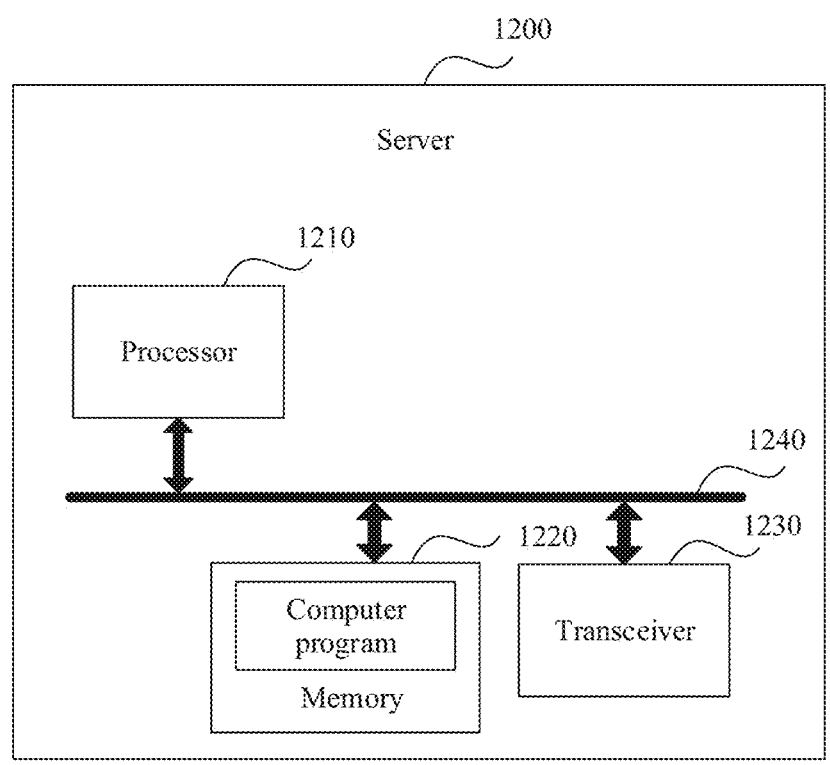
FIG. 4 is a schematic diagram of an internal structure of a server according to an embodiment of this application.

As shown in FIG. 4, an embodiment of this application provides a framework diagram of a partial structure of the server 1200, and the server 1200 may include:

a processor 1210, a memory 1220, and a transceiver 1230.

One or more computer programs are stored in the memory 1220 and configured to be executed by the one or more processors 1210.

The processor 1210 in this embodiment of this application may be a central processing unit (central processing unit, CPU), a digital processing unit, or the like.

The processor 1210 is a control center of the server 1200, is connected to all parts of the entire server 1200 by using various interfaces and lines, and performs various functions of the server 1200 by running or executing a computer program stored in the memory 1220 and invoking data such as a configuration file stored in the memory 1220.

In an optional manner, the transceiver 1230 is configured to: receive information from a terminal device, send information to the terminal device, and the like.

In this embodiment of this application, a specific connection medium between the processor 1210 and the memory 1220 is not limited. In this embodiment of this application, the memory 1220, the processor 1210, and the transceiver 1230 are connected by using a bus 1240 in FIG. 4. The bus is represented by using a thick line in FIG. 4. A manner of connection between other components is only an example for description, and imposes no limitation. The bus may be classified into an address bus, a data bus, a control bus, and the like. For ease of representation, the bus is represented by using only a thick line in FIG. 4. However, this does not indicate that there is only one bus or only one type of bus.

The memory 1220 may be a volatile memory (volatile memory) such as a random access memory (random access memory, RAM). Alternatively, the memory 1220 may be a non-volatile memory (non-volatile memory) such as a read-only memory, a flash memory (flash memory), a hard disk drive (hard disk drive, HDD), or a solid-state drive (solid-state drive, SSD). Alternatively, the memory 1220 is any other medium that can be used to carry or store expected program code in a form of an instruction or a data structure and can be accessed by a computer. The memory 1220 may be a combination of the foregoing memories. It should be noted that, in this embodiment of this application, the application feedback system and the structure are not limited to the content shown in FIG. 1 to FIG. 3, and any variation of the foregoing system architecture and/or software and hardware structures may be applied to this embodiment of this application. For ease of understanding, examples of descriptions of some concepts related to embodiments of this application are provided as follows for reference:

(1) A BOX scenario is an interface display scenario, in which a box| control is used for display in the interface.

For example, related information is displayed in the display interface in a form of a card.

The box control may be understood as a window control. When an operation is performed in a window, an interface display outside the window is not changed. The box control may include a plurality of controls such as a text box, an option box, and a password box.

(2) Search is a search technology that searches for information from the Internet by using a specific policy based on a user requirement and a specific algorithm and sends the information to users.

(3) User feedback (Feedback) is feedback made by a customer using an electronic application on the electronic application.

(4) A software application is software embedded in computer software, an information system, or a device provided for a user, or computer software provided for providing technical services such as computer information system integration and application services.

For example, the software application is not limited to an application (Application, APP), an advanced hypertext markup language (HTML5, H5), and a front-end interface (WEB).

(5) A first operation is an operation behavior performed by a user on a search application, such as tapping, page turning, scrolling, entering, and object opening.

(6) A second operation is an operation behavior performed by a user on a feedback control, for example, tapping a feedback control or touching and holding a feedback control.

In the embodiments of this application, a term "at least one" means one or more, and "a plurality of" means two or more. The term "and/or" describes an association relationship between associated objects and represents that three relationships may exist. For example, A and/or B may represent the following three cases. Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate; a, b, c, a and b, a and c, b and c, or a, b, and c, where a, b, and c may be singular or plural.

Unless otherwise stated, ordinal numbers such as "first" and "second" mentioned in embodiments of this application are used to distinguish between a plurality of objects, and are not intended to limit a sequence, a time sequence, priorities, or importance of the plurality of objects. In addition, the terms "include" and "have" in embodiments, claims, and accompanying drawings of this application are not exclusive. For example, a process, a method, a system, an application, or a device including a series of steps or modules is not limited to the listed steps or modules, and may further include steps or modules that are not listed.

Further, an embodiment of this application further provides an application feedback system architecture used to perform an application feedback method. A software program used to construct the application feedback system architecture may be stored in the server 1200.

In an optional manner of this embodiment of this application, a developer may design a program solution used to execute application feedback for an application based on the application feedback system architecture in the server 1200. In addition, the terminal device 1100 may invoke, from the server 1200, a program solution used by an application to execute application feedback, so that the terminal device locally integrates an application feedback system of the application based on the program solution fed back by the application. When a user operates the application in the terminal device, the terminal device performs the application feedback method in this embodiment of this application based on a locally integrated application feedback system of the application.

The following describes in detail the application feedback system architecture used to perform the application feedback method and an operation procedure in this embodiment of this application.

Figure 5:
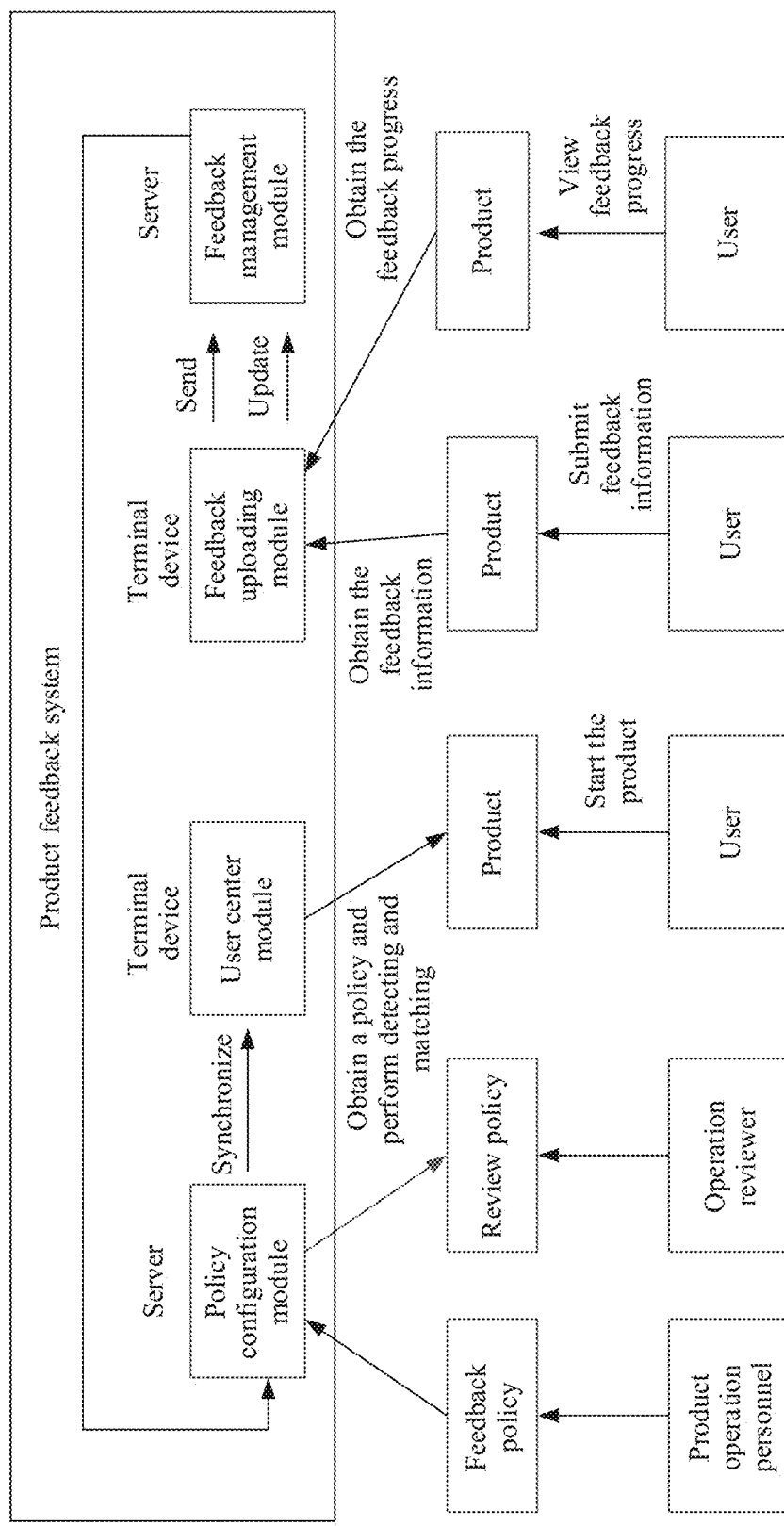
FIG. 5 is a schematic diagram of an architecture of an application feedback system according to an embodiment of this application.

As shown in FIG. 5, an application feedback system architecture provided in an embodiment of this application includes a policy configuration module, a user center module, a feedback upload module, a feedback management module, and the like.

(1) The policy configuration module is configured to perform policy configuration and policy review on an application.

For example, during actual application, application operation personnel may configure a feedback policy for the application by using the policy configuration module, and an operation reviewer may perform policy review on the feedback policy configured for the application by using the policy configuration module.

In an optional manner of this embodiment of this application, the policy configuration module is located in a server.

According to a first aspect, in a policy configuration par, a feedback policy used to trigger an application to generate a plug-in used for performing application feedback is configured, so that when it is detected that a manner of an operation performed by a user on the application complies with the configured feedback policy, the plug-in used for performing application feedback is dynamically generated.

Further, in an optional manner of this embodiment of this application, when the feedback policy is configured for the application, the feedback policy may be designed with reference to a plurality of dimensions. The designed feedback policy may be flexibly changed based on an actual situation, and a representation form of the feedback policy is not limited.

For example, the feedback policy provided in this embodiment of this application may be configured with reference to policy information (that is, a policy indicator) in all or some of the following dimensions:

1. "User Tapping" Policy Information.

In this embodiment of this application, when "user tapping" is used as policy information, a reference attribute may include a tap location, tapping times, and the like.

2. "User Page Turning" Policy Information.

In this embodiment of this application, when "user page turning" is used as policy information, a reference attribute may include a page turning sequence (for example, page turning forward or page turning backward), page turning times, a page turning location (for example, a specific turned-to page number), and the like.

3. "User Object Opening" Policy Information.

In this embodiment of this application, when "user object opening" is used as policy information, a reference attribute may include an opening manner (for example, internal opening or creating and opening), or the like.

4. "User Scrolling" Policy Information.

In this embodiment of this application, when "user scrolling" is used as policy information, a reference attribute may include a scrolling manner (for example, a scrolling manner of a system peripheral device such as mouse scrolling or screen swiping), scrolling duration, and the like.

5. "User Entering" Policy Information.

In this embodiment of this application, when "user entering" is used as policy information, a reference attribute may include an entering manner (for example, an entering manner of a system peripheral device such as keyboard entering or mouse pasting and entering).

6. "User Staying Duration (User Browsing Duration, User Entering Duration, and User Staying Duration)" Policy Information.

In this embodiment of this application, when the "user staying duration" is used as policy information, a reference attribute may include a staying scenario (for example, a user browsing duration, a user entering duration, and duration of no operation).

7. "Operation Type" Policy Information.

In this embodiment of this application, the "operation type" may be an operation such as adding, deleting, modifying, or searching.

8. "Application Scenario" Policy Information.

In this embodiment of this application, the "application scenario" may be an information stream, a box, a web page, a suggestion, or the like.

For example, it is assumed that policy configuration needs to be performed on a search application A currently.

Based on actual application experience, application operation personnel consider that, when a search application is applied, if a user performs a page turning operation and an interface scrolling operation for a plurality of times after entering information in a search bar, it may be understood that content retrieved by the search application based on the entered information is not content actually required by the user. In this case, the user may need to perform application feedback.

Therefore, the application operation personnel may select two dimensions of user page turning and user scrolling, in the foregoing policy information to perform policy configuration on the search application A. For example, a feedback policy designed by the application operation personnel for the search application A based on the two dimensions of user page turning and user scrolling is shown in the following Table 1.

TABLE 1

Feedback policy 1 of the search application A
Feedback policy of the search application A

| Selected dimension | Criteria | Generated feedback policy | Feedback policy description |
|---|---|---|---|
| User scrolling User page turning | Scrolling times > 2 Page turning times > 2 | (Scrolling times > 2) + (page turning times > 2) | After a user enters information to be searched for by using the search application A and performs the search, a quantity of times of page turning performed by the user exceeds two, and a quantity of times of scrolling performed by the user exceeds two |

Further, in this embodiment of this application, when the feedback policy of the application is configured, different feedback policies may be set based on a type of a terminal device.

For example, the terminal device that carries the application is a mobile phone. Considering that a user may perform a screen touching operation on the mobile phone, when an application feedback policy is configured, the user only needs to perform a touching and swiping operation on a screen when the user needs to scroll an interface. Therefore, a feedback policy that is set for the same application based on a mobile phone form may be shown in the following Table

TABLE 2

Feedback policy 2 of the search application A
Feedback policy of the search application A

| Selected dimension | Criteria | Generated feedback policy | Feedback policy description |
|---|---|---|---|
| User tapping User touching and swiping | Tapping times > 2 Swiping times > 2 | (Tapping times > 2) + (swiping times > 2) | After a user enters information to be searched for by using the search application A and performs the search, a quantity of times of touching and swiping performed by the user exceeds two, and a quantity of times of scrolling performed by the user exceeds two |

When the terminal device that carries the application is a PC end, considering that the PC end may not support a screen touching operation, when the user needs to scroll an interface, the user may need to drag a scroll bar in the interface by using a mouse connected to the PC end. Therefore, a feedback policy that is set for the same application based on a PC form may be shown in the following Table 3.

TABLE 3

Feedback policy 3 of the search application A
Feedback policy of the search application A

| Selected dimension | Criteria | Generated feedback policy | Feedback policy description |
|---|---|---|---|
| User tapping Dragging a scroll bar | Tapping times > 2 Dragging times > 2 | (Tapping times > 2) + (dragging times > 2) | After a user enters information to be searched for by using the search application A and performs the search, a quantity of times of tapping performed by the user exceeds two, and a quantity of times of dragging performed by the user exceeds two |

Further, the application feedback policy configured in this embodiment of this application may be continuously updated based on actual feedback in a process of using the application by the user, so that the configured application feedback policy better conforms to an actual behavior habit of the user.

For example, it is assumed that an initial feedback policy of the application A is shown in Table 1. In a process of using the application A by the user, after it is detected that an operation behavior of the user complies with the initial feedback policy, a plug-in used for application feedback is generated. However, the user does not tap the plug-in within threshold duration, but continues to perform another operation on the application. On the contrary, in a process in which the user uses the application A, it is often detected that the user performs a feedback operation after it is detected that the user performs an entering operation for more than five times. Therefore, the feedback policy of the application A may be updated and perfected based on an actual behavior habit of the user, so that the configured application feedback policy matches the user better, and user experience is improved.

In addition, in this embodiment of this application, when the feedback policy is configured, an attribute of a plug-in used for application feedback and/or a display location of the plug-in may be further configured in the feedback policy. In this way, when a manner of an operation performed on the search application by the user complies with the feedback policy corresponding to the current display scenario, the plug-in used for application feedback is displayed at a preset display location in a search interface based on a plug-in attribute indicated in the feedback policy and the display location of the plug-in.

The plug-in attribute includes a part or all of a plug-in type, a plug-in location, a plug-in size, a plug-in color, and a plug-in shape.

For example, in a process of using a mobile phone, a user often prefers a one-hand operation. Therefore, to better adapt to an operation habit of the user, a display location of the plug-in on a screen may be set at a lower right corner of the screen.

For another example, in order to better increase interest of a user in an application feedback process, the plug-in may be designed as a circular button, a rectangular button, or the like.

According a second aspect, in a policy review part, after the feedback policy of the application is determined, to ensure that the feedback policy configured by the application is practical, the feedback policy of the application may be reviewed according to a preset review policy.

If the feedback policy of the application passes the review, the feedback policy is applied when the application feedback method provided in this embodiment of this application is performed on the application. Optionally, the policy configuration module may store the application feedback policy that passes the review in the user center module.

If the feedback policy of the application does not pass the review, the feedback policy of the application needs to be modified again.

The review policy in this embodiment of this application may be designed based on a big data model obtained based on daily behaviors of a user. The user may be a common operation user of the terminal device, or may be a public user. This is not limited in this embodiment of this application.

By using the policy configuration module, a feedback policy configured for an application to dynamically generate a feedback button is provided, so that when a user behavior complies with the configured application feedback policy, the feedback button can be dynamically generated, which is more flexible and more adaptable.

(2) The user center module is configured to: when the user performs an operation on the application, collect a user behavior, analyze and process the user behavior, determine whether the collected user behavior meets the feedback policy corresponding to the application, and dynamically generate a feedback button when determining that the user behavior complies with the feedback policy of the application.

In an optional manner of this embodiment of this application, the user center module is located in the terminal device.

In this embodiment of this application, operation data of the user may be obtained by using at least one sensor carried in the terminal device, an operation behavior of the user may be identified with reference to a machine learning capability or even a deep learning capability, and an accumulated quantity of times of performing an operation behavior by the user is counted. For example, in this embodiment of this application, a pressure sensor in the terminal device may detect a touch operation behavior of the user on the terminal device in real time.

It should be noted that, in this embodiment of this application, the sensor apparatus in the terminal device may detect and collect statistics on only an operation behavior of the user included in the application feedback policy, or may detect and collect statistics on all operation behaviors of the user. This is not limited in this embodiment of this application.

In addition, in this embodiment of this application, before determining whether the user behavior complies with the feedback policy corresponding to the application, the feedback policy corresponding to the application needs to be obtained.

In this embodiment of this application, a manner of obtaining the feedback policy corresponding to the application is not specifically limited to the following several manners:

Manner 1: In this embodiment of this application, the feedback policy corresponding to the application may be determined based on system file content of the application.

For example, assuming that the terminal device needs to obtain a feedback policy of an application 1, the feedback policy of the application 1 is already stored in a system file of the application 1 in advance.

Therefore, the terminal device may invoke the system file of the application 1, and obtain the feedback policy of the application 1 from the system file.

Manner 2: In this embodiment of this application, a feedback policy corresponding to an application may be determined based on a correspondence between an application identifier and a feedback policy identifier.

In an optional manner of this embodiment of this application, the feedback policy corresponding to the application and the correspondence between an application identifier and a feedback policy identifier may be stored in the server.

When the terminal device needs to obtain a feedback policy of an application, for example, needs to obtain the feedback policy corresponding to the application 1, the terminal device may communicate with the server, and invoke the correspondence between an application identifier and a feedback policy identifier.

The feedback policy corresponding to the application 1 is determined based on the correspondence. Then, the terminal device obtains the feedback policy corresponding to the application 1 from the feedback policy stored by the server.

In another optional manner of this embodiment of this application, the correspondence between an application identifier and a feedback policy identifier and the feedback policy corresponding to the application are stored in a general memory of the terminal device. [01%] When the terminal device needs to obtain a feedback policy of an application, for example, needs to obtain the feedback policy corresponding to the application 1, the terminal device may invoke the correspondence between an application identifier and a feedback policy identifier from the local general memory.

The feedback policy corresponding to the application 1 is determined based on the correspondence. Then, the terminal device obtains the feedback policy corresponding to the application 1 from the feedback policy stored by the server.

For example, it is assumed that the correspondence between an application identifier and a feedback policy identifier is shown in the following Table 4.

The current user is performing an operation on the application A. Therefore, a feedback policy corresponding to the application A needs to be obtained. It can be learned with reference to content in the following Table 4 that the application A applies a feedback policy whose identifier is 1, and the user center module may invoke the feedback policy from a memory that stores the feedback policy.

TABLE 4

Correspondence between an application identifier and a feedback policy identifier

| Application identifier | Feedback policy identifier |
|---|---|
| Application A | Feedback policy 1 |
| Application B | Feedback policy 2 |
| Application C | Feedback policy 3 |

Further, the application A is used as an example, and the feedback policy corresponding to the application A is content shown in the following Table 5.

TABLE 5

Feedback policy 4 of the search application A
Feedback policy of the search application A

| Selected dimension | Criteria | Generated feedback policy | Feedback policy description |
|---|---|---|---|
| User page turning Object opening | Page turning times > 2 Opening times > 0 | (Page turning times > 2) + (Opening times < 0) | After a user enters information to be searched for by using the search application A and performs the search, a quantity of times of page turning performed by the user exceeds two, and no object opening operation is performed. |

For example, when the application A is used by the user, it is assumed that information entered by the user in a search bar of the application A is "basketball", and after the user taps a search operation, a user behavior is collected.

For example, the user behavior collected by the user center module is as follows:

The user has performed the page turning operation for three times, but does not perform an object opening operation.

The user center module analyzes the collected user behavior and determines that the collected user behavior complies with the feedback policy shown in Table 5. Therefore, a feedback button is dynamically generated on a current display interface of the application A.

When detecting the user behavior, if the user center module detects that the user performs an object opening operation before the user performs the third page turning operation after detecting that the user performs the page turning operation twice, the user center module may confirm that the previously collected user behavior does not comply with the feedback policy. Therefore, the user center module continues to perform user behavior detection until the user center module determines an operation that the user exits the application A. When the user uses the application, the user center module continuously matches the operation behavior of the user with the feedback policy, so that when the user behavior meets the configured application feedback policy, the user center module dynamically generates the feedback button, which is more flexible and more adaptable.

(3) The feedback uploading module is configured to report feedback content to the feedback management module.

Figure 6:
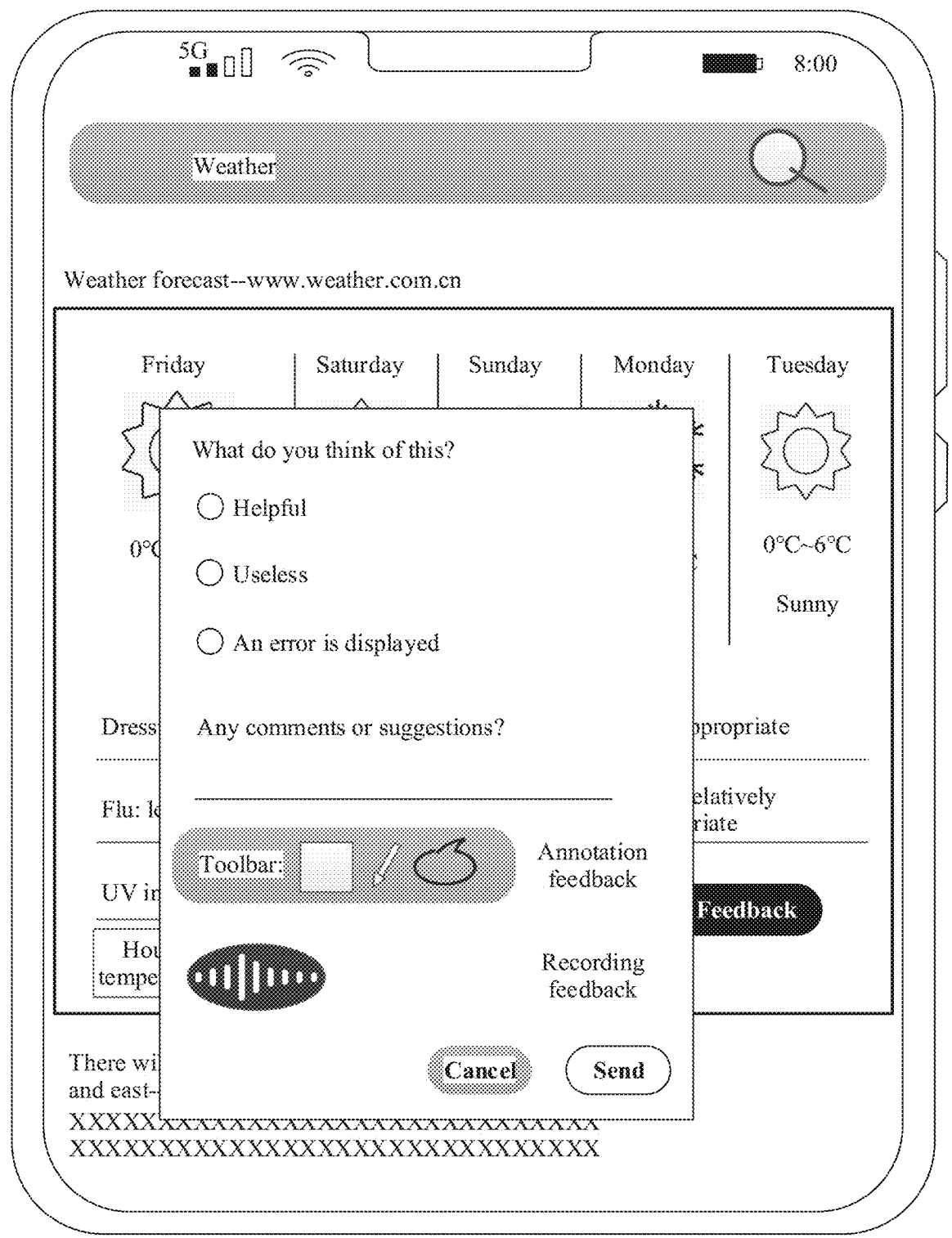
FIG. 6 is a schematic diagram of an application feedback interface according to an embodiment of this application.

In an optional manner of this embodiment of this application, after the user taps the feedback button, a feedback list is popped up. The feedback list may include a plurality of types of content, and is not specifically limited to the following types:

Content 1: As shown in FIG. 6, a feedback list popped up in this embodiment of this application may include an option box and/or a text box. The user may select an option from the option box, and/or perform feedback in a manner of text entering in the text box.

Content 2: As shown in FIG. 6, the feedback list popped up in this embodiment of this application may include an audio and video recording button. On the premise that authorization of the user is obtained, voice feedback information and/or video feedback information uploaded by the user by using the audio and video recording button are/is received, and the feedback information is uploaded to the feedback management module.

Manner 3: As shown in FIG. 6, the feedback list popped up in this embodiment of this application may include an annotation tool button. The user may tap the annotation tool button to annotate a current interface, and upload annotation content of the user on a current interface to the feedback management module as feedback information.

For example, after the user taps a feedback button, the current interface automatically changes to a picture. The user may annotate the picture by using an annotation tool provided in the current display interface, and upload an interface with annotation content as feedback information to the feedback management module.

In another optional manner of this embodiment of this application, after the user taps the feedback button, current interface content and/or user operation content are/is used as feedback information and uploaded to the feedback management module.

For example, after a tap on the feedback button by the user is received, a screenshot of a current display interface may be automatically taken, and a screenshot picture and operation content of the user are used as feedback information for uploading.

In addition, in this embodiment of this application, account information of the user, the screenshot picture, and the operation content of the user may alternatively be used as feedback information for uploading.

Further, in this embodiment of this application, a feedback manner after a feedback button is tapped may be determined based on a correspondence between a scenario identifier and a feedback manner.

A same feedback manner may include at least one feedback template. In this embodiment of this application, a feedback template displayed on the search interface may be determined based on a correspondence between a scenario identifier, a feedback manner, and a feedback template.

For example, it is assumed that a correspondence between an interface scenario, a feedback manner, and a feedback template is shown in the following Table 6:

TABLE 6

Correspondence between an interface scenario,
a feedback manner, and a feedback template

| Scenario identifier | Feedback manner | Feedback template identifier |
|---|---|---|
| Scenario 1 | Feedback list | Template 1 |
| Scenario 2 | Feedback list | Template 2 |
| Scenario 3 | Audio and video interface | Template 3 |
| Scenario 4 | Direct feedback | None |

It is assumed that the current search application displays a scenario of the scenario identifier 1. After detecting that the user behavior complies with the corresponding feedback policy, the terminal device generates a feedback button.

After the terminal device detects that the user taps the feedback button, it can be learned from the content in Table 6 that a feedback manner in the current scenario is in a form of a feedback list, and the corresponding feedback template is the template 1. Therefore, the feedback template corresponding to the identifier 1 is displayed on the current interface.

The user fills in and/or selects, various information, such as ideas, suggestions, and feedback of the user on the application A, that needs to be interacted in the feedback template displayed on the current interface, and then taps a submit button in the feedback template, to complete feedback interaction with the application A.

After receiving the feedback information of the user for the application A, the feedback uploading module sends the feedback information to the feedback management module.

By using the feedback uploading module, when the user feeds back the application, the feedback information of the user for the application can be obtained in time, and the application feedback information is sent to the feedback management module, to implement information collection in a process of feedback interaction between the user and the application.

Further, in this embodiment of this application, after the user uploads the feedback by using the feedback uploading module, the user may further view content such as the feedback and a processing progress of the current feedback by using the feedback uploading module.

(4) The feedback management module is configured to receive the application feedback information sent by the feedback uploading module, and process the application feedback information.

In a first optional manner of this embodiment of this application, the feedback management module may directly upload the received application feedback information to a server corresponding to the application.

In a second optional manner of this embodiment of this application, after receiving a threshold quantity of pieces of application feedback information, the feedback processing module may upload the received application feedback information to a server corresponding to the application together.

For example, it is assumed that a threshold quantity is 3. After receiving the application feedback information submitted by the user for the application A for three times, the feedback management module uploads the three times of application feedback information to a server corresponding to the application A. Then, the feedback management module recalculates a quantity of times of receiving the application feedback information of the application A.

In a third optional manner of this embodiment of this application, after receiving the application feedback information of a threshold volume, the feedback module may upload the received application feedback information to a server corresponding to the application together.

For example, it is assumed that a threshold volume is 120 k. After a volume of accumulatively received application feedback information submitted by the user for the application A is not less than 120 k, the feedback management module uploads the accumulatively received application feedback information to the server corresponding to the application A. Then, the feedback management module recalculates a volume of received application feedback information of the application A.

In a fourth optional manner of this embodiment of this application, the feedback management module may locally analyze and process the received application feedback information, and upload the processed application feedback information to a server corresponding to the application.

For example, the feedback management module may perform screening and sorting on the received application feedback information, delete repeated content in the application feedback information, and upload the sorted application feedback information to a corresponding server, to effectively reduce redundancy of uploaded information.

For another example, the feedback management module may analyze the received application feedback information, obtain an application improvement solution based on an analysis result, and upload the application improvement solution to a server corresponding to the application.

The feedback management module uploads the application feedback information to the server corresponding to the application, so that an operator of the application can obtain the application feedback information from the server corresponding to the application, and improve and update the application based on the feedback information of the application, so that the updated application can better meet a use habit of the user, and user experience is improved.

In addition, the operator may further send a file obtained after the application is improved and updated to the feedback management module by using the server. After receiving an improvement and update file of the application, the feedback management module performs improvement update on the application, and the like.

By using the feedback management module, obtained user feedback information can be effectively processed, and the application can be better updated and improved based on content fed back by the user, to implement benign interaction between the user and the application.

Further, based on the foregoing application feedback system architecture, an execution process of the application feedback method provided in embodiments of this application may be divided into three phases: an early deployment phase, a matching execution phase, and a post-processing phase.

Figure 7A:
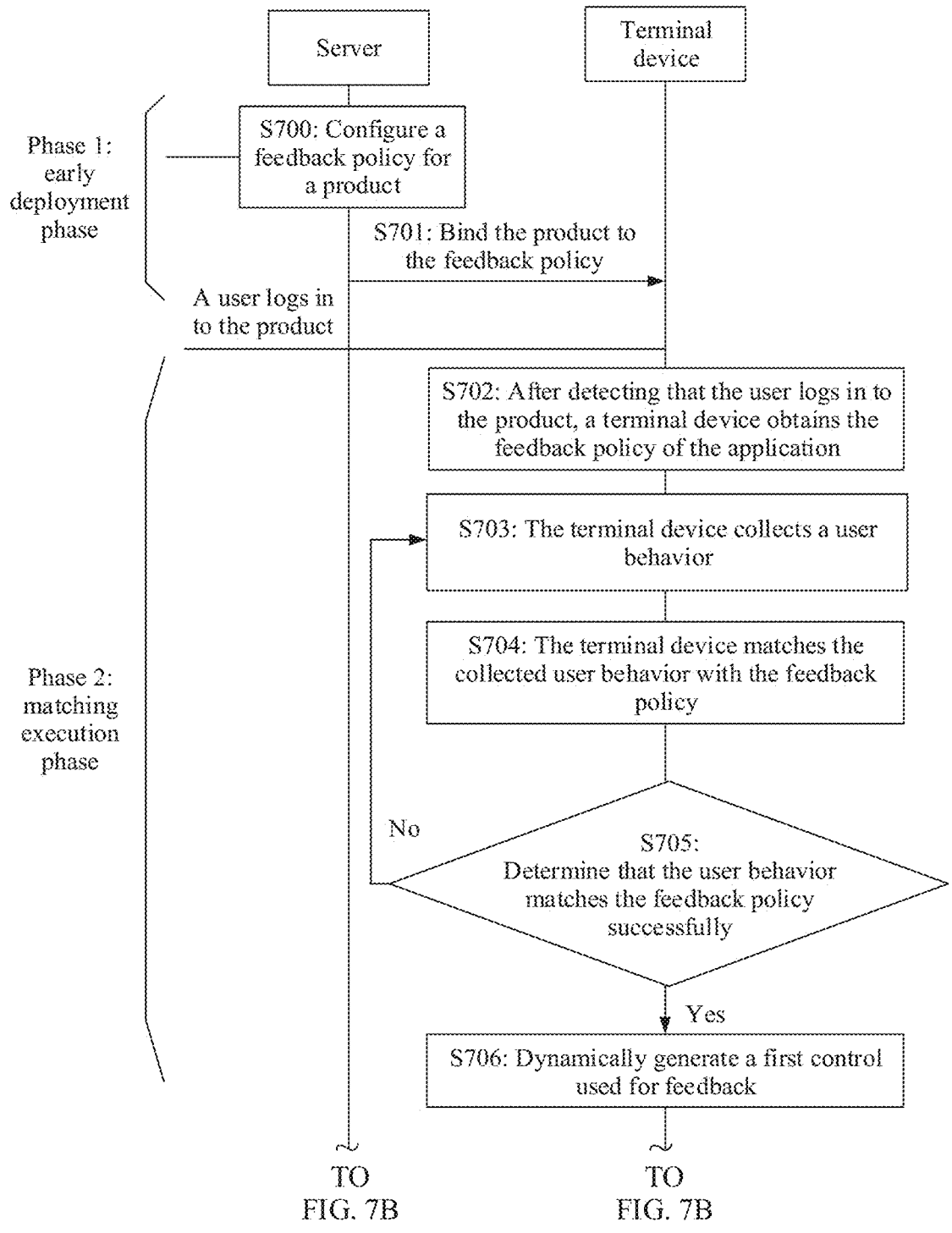
FIG. 7A and FIG. 7B are a schematic flowchart of an application feedback method according to an embodiment of this application.
Figure 7B:
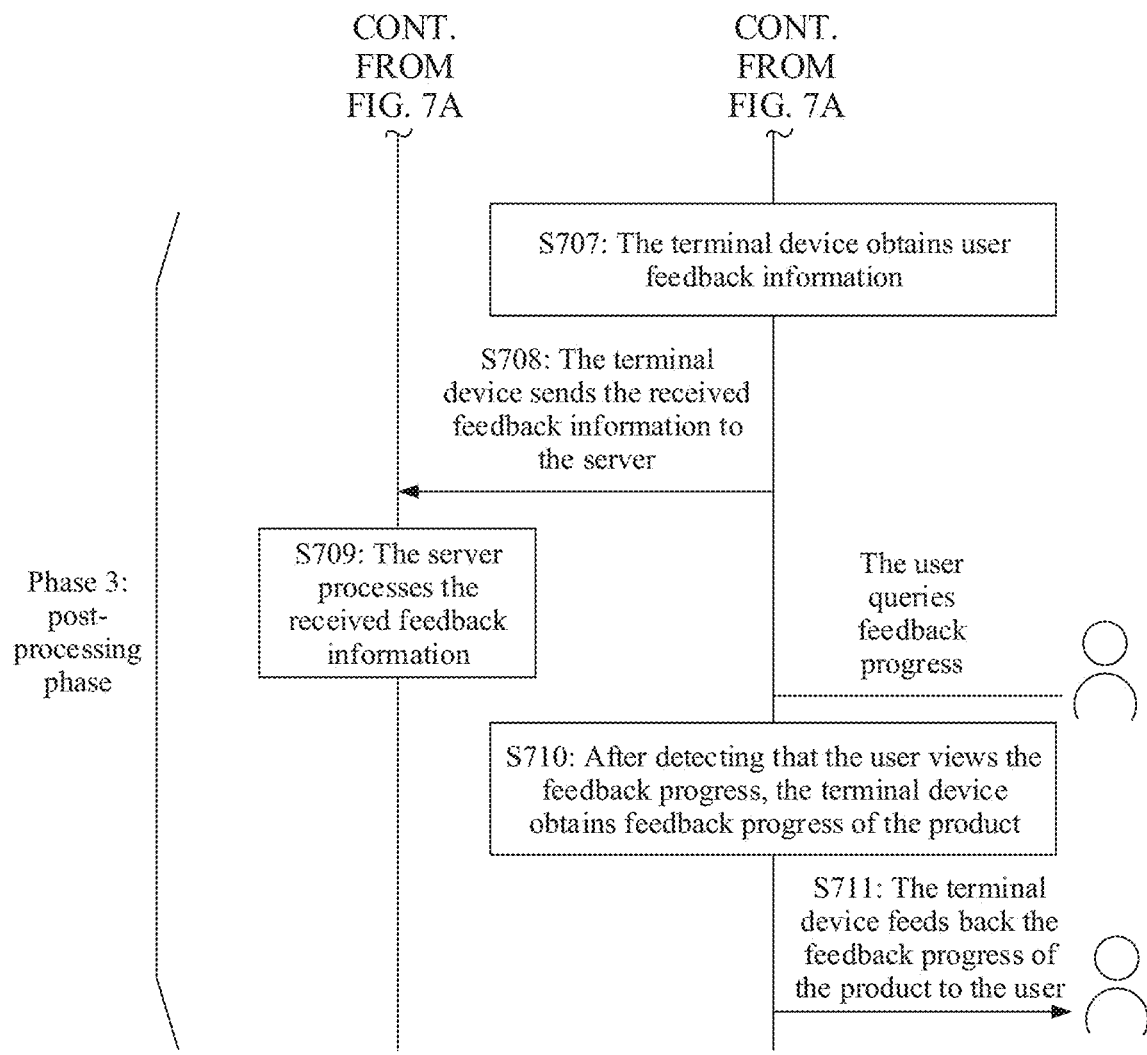
Figure 8A:
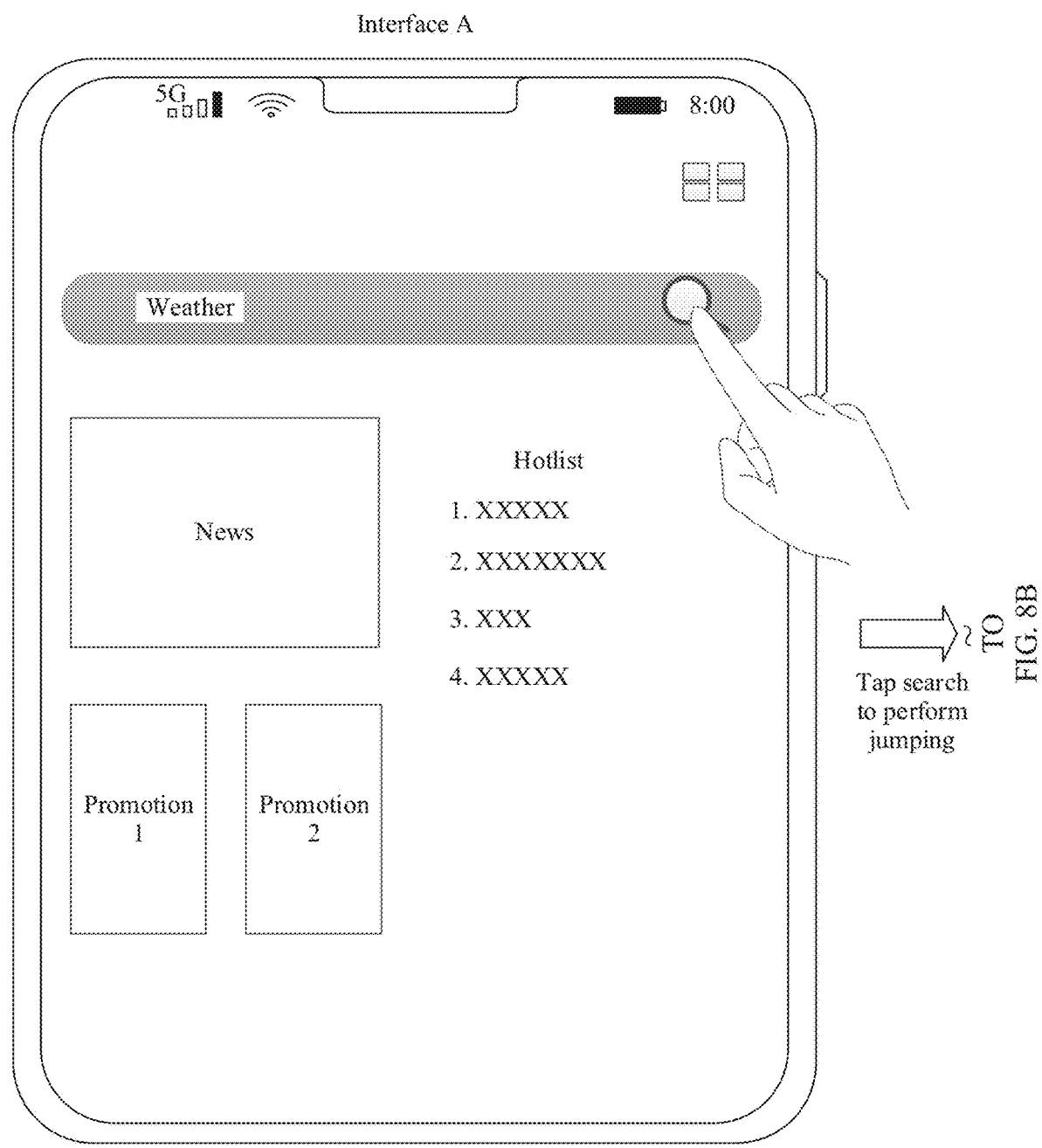
FIG. 8A to FIG. 8E are a schematic diagram of user interface operations in a BOX case according to an embodiment of this application.
Figure 8B:
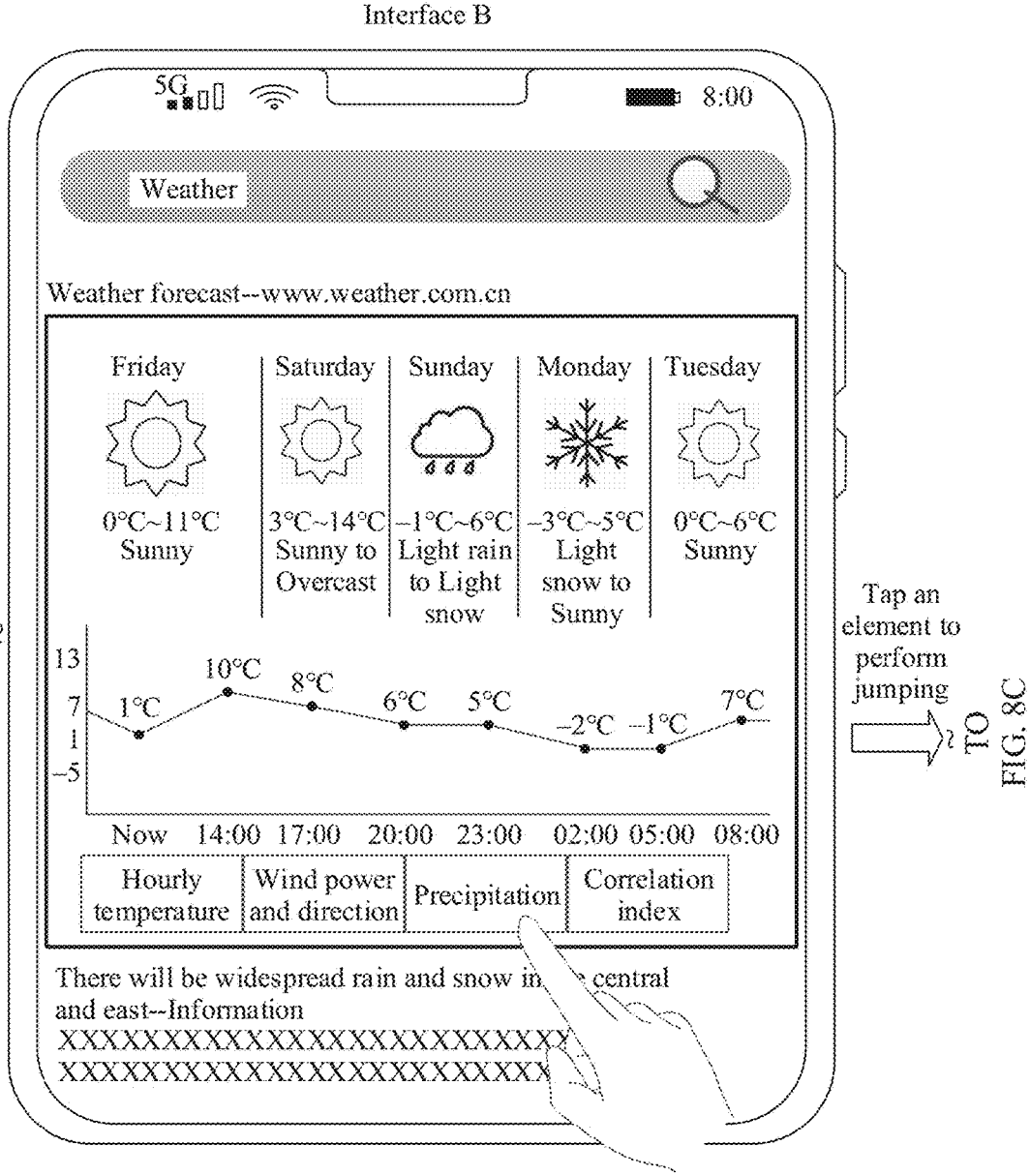
Figure 8C:
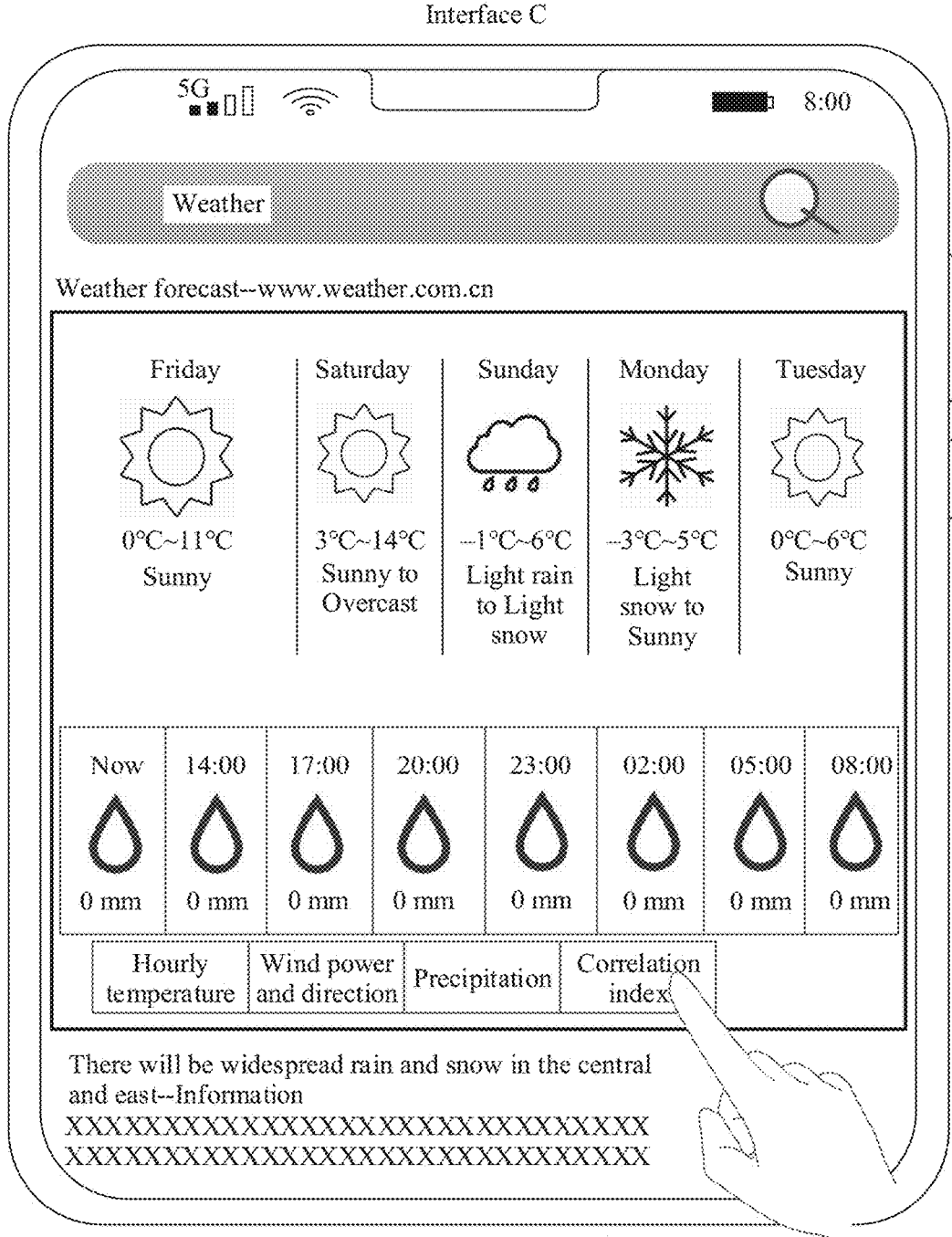
Figure 8D:
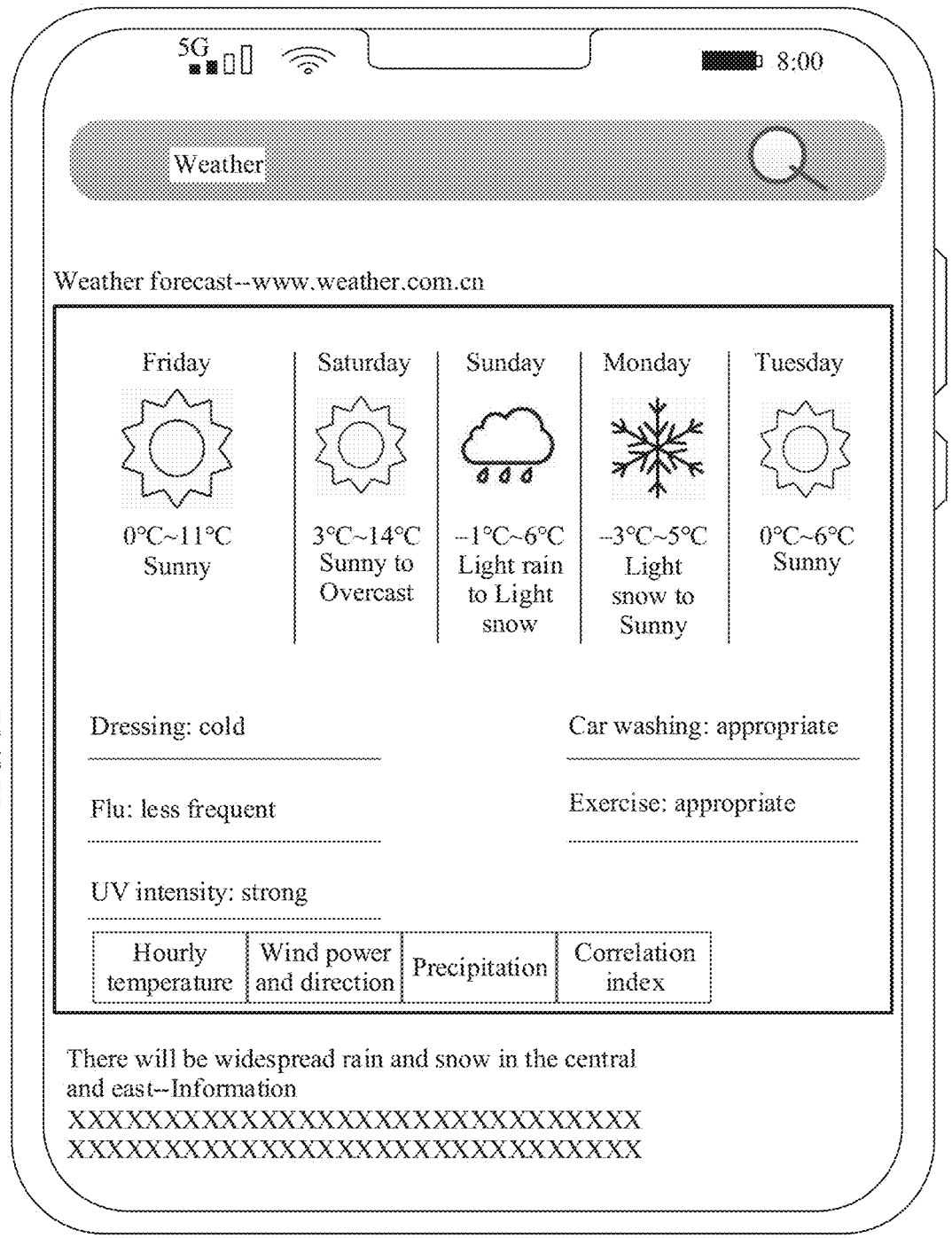
Figure 8E:
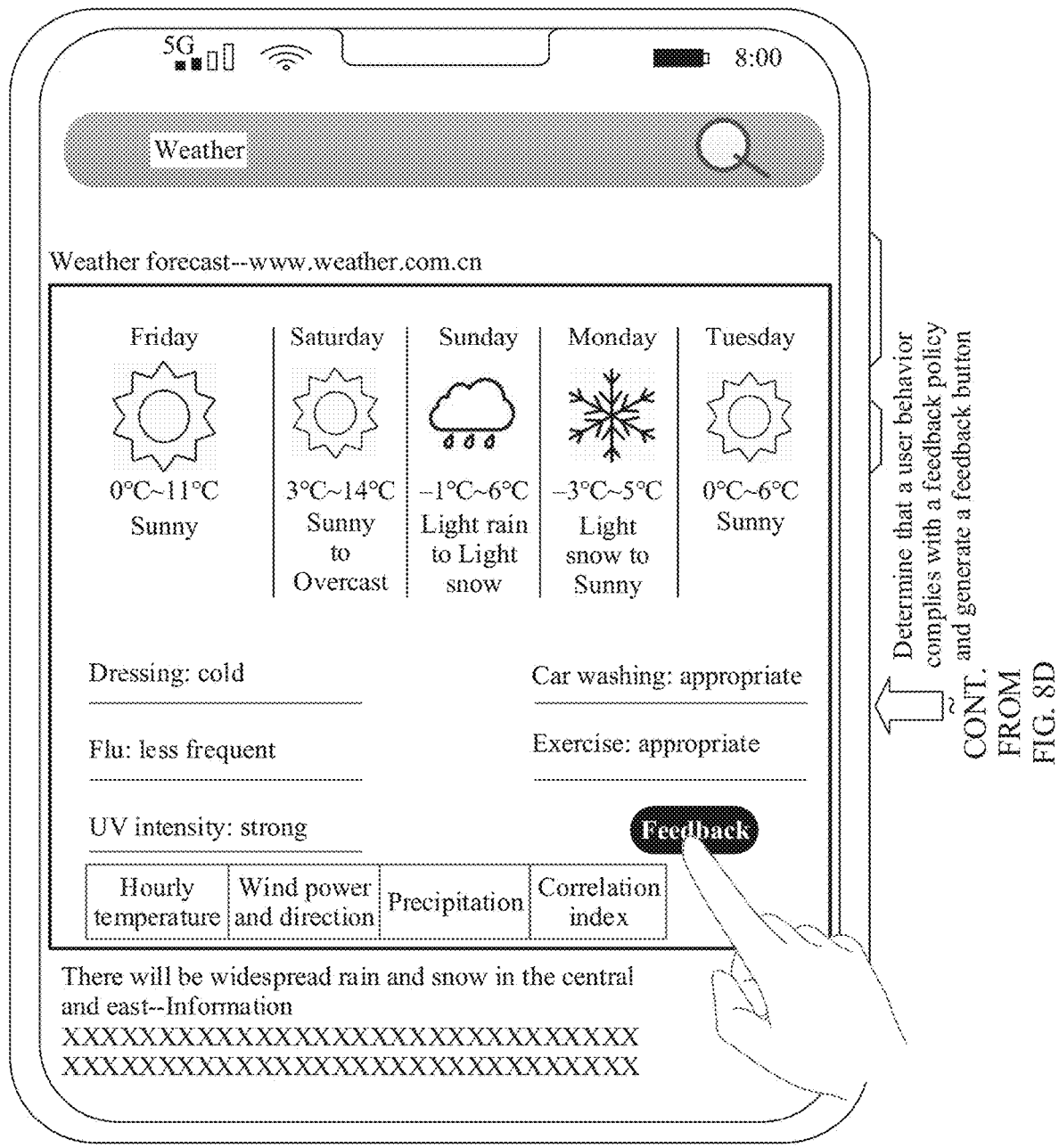

As shown in FIG. 7A and FIG. 7B, a procedure of an application feedback method according to an embodiment of this application includes the following steps.

Phase 1: Early Deployment Phase.

S700: Configure a feedback policy of an application.

In an optional manner of this embodiment of this application, application operation personnel configure the feedback policy for the application by using a server, and then an operation reviewer reviews the feedback policy configured for the application.

S701: Bind the application to the feedback policy.

In an optional manner of this embodiment of this application, before the application is bound to the feedback policy, the operation reviewer determines that the feedback policy of the application passes the review.

Phase 2: Matching Execution Phase.

S702: After detecting that a user logs in to the application, a terminal device obtains the feedback policy of the application.

In an optional manner of this embodiment of this application, after detecting that the user logs in to the application, a user center module in the terminal device downloads the feedback policy corresponding to the application from the server.

In an optional manner of this embodiment of this application, after detecting that the user logs in to the application, the terminal device invokes the feedback policy corresponding to the application locally.

If the feedback policy of the application is updated, the server may send the updated feedback policy of the application to the terminal device. The terminal device receives the updated feedback policy of the application, and replaces the locally stored feedback policy of the application.

In addition, in this embodiment of this application, in a case in which the terminal device locally stores the feedback policy of the application, the terminal device may download a latest feedback policy of the application from the server at intervals of threshold duration, and replace the previously locally stored feedback policy of the application.

S703: The terminal device collects a user behavior after detecting that the user has a search behavior.

In an optional manner in this embodiment of this application, the user center module in the terminal device collects the user behavior after detecting that the user has the search behavior.

S704: The terminal device matches the collected user behavior with the feedback policy.

In an optional manner in this embodiment of this application, the user center module in the terminal device matches the collected user behavior with the feedback policy. It should be noted that an occasion for triggering the terminal device to match the user behavior with the feedback policy is not limited in this embodiment of this application. For example, the terminal device may match the user behavior with the feedback policy after the application is opened. Alternatively, the terminal device may match the user behavior with the feedback policy after receiving a query word entered by the user on a first interface of the application.

S705: The terminal device determines whether the user behavior matches the feedback policy successfully, and if the user behavior matches the feedback policy successfully, the terminal device performs S706; otherwise, the terminal device still performs S703.

S706: Dynamically generate a first control used for feedback.

In an optional manner, the first control may be a feedback button.

In an optional manner in this embodiment of this application, after determining that the user behavior successfully matches the feedback policy, the user center module in the terminal device dynamically generates the first control used for feedback.

S707: The terminal device obtains user feedback information.

In an optional manner of this embodiment of this application, after detecting that the user performs an operation on the first control, the user center module in the terminal device displays a feedback interface, where the feedback interface is used to receive the feedback information entered or selected by the user.

In an optional manner of this embodiment of this application, the user center module in the terminal device obtains user feedback information, and then sends the feedback information to a feedback uploading module.

Phase 3: Post-Processing Phase.

S708: The terminal device sends the received feedback information to the server.

In an optional manner in this embodiment of this application, the feedback uploading module in the terminal device sends the received feedback information to a feedback management module in the server.

S709: The server processes the received feedback information.

In an optional manner in this embodiment of this application, a feedback management module in the server processes the received feedback information.

It should be noted that the foregoing three phases may be performed independently, or may be performed cooperatively.

In addition, this embodiment of this application may further include the following steps.

S710: After detecting that the user views feedback progress, the terminal device obtains the feedback progress of the application.

In an optional manner in this embodiment of this application, after detecting that the user views the feedback progress, the terminal device obtains the feedback progress of the application from the feedback uploading module.

S711: The terminal device feeds back the feedback progress of the application to the user.

For better understanding of the application feedback method in this application, the following separately describes the application feedback method provided in embodiments of this application based on several cases.

Embodiment 1: An example of application performed based on the application feedback method in this application when a display interface in a search application is a box case is provided.

For example, it is assumed that, in this embodiment of this application, when the search application A is in a BOX case, an application feedback policy that is set is shown in the following Table 7.

TABLE 7

| | | Feedback policy 5 of the search application A | | | |
| | | Feedback policy of the search application A | | | |
| Applicable to | Selected dimension | Criteria | Necessity | Generated feedback policy | Feedback policy description |
| BOX case | User tapping | Tapping times > 1 | Necessary | (Tapping times > 1) + | The user enters information to be |

TABLE 7-continued

Feedback policy 5 of the search application A
Feedback policy of the search application A

| Applicable to | Selected dimension | Criteria | Necessity | Generated feedback policy | Feedback policy description |
|---|---|---|---|---|---|
| | User page turning<br>Object opening<br>Staying duration | Page turning times < 1<br>Opening times > 0<br>Duration > 5 s | Necessary<br><br>Unnecessary<br><br>Necessary | (page turning times < 1) + (staying duration > 5 s) or (tapping times > 0) + (page turning times < 1) + (staying duration > 5 s) + (object opening times > 0) | searched by using the search application A. After the search application A displays an interface obtained after the searching in a form of a BOX, it is detected that a quantity of times of tapping performed by the user exceeds one, staying duration on the interface exceeds 5 s, and no page turning action is performed. The feedback policy may further include that the user performs an operation of object opening at least once. |

According to the content in Table 7, it can be known that a matching calculation formula of the feedback policy of the search application is as follows:

(tapping times>1)+(page turning times<1)+(staying duration>5 s); or (tapping times>1)+(page turning times<1)+(staying duration>5 s)+(object opening times>0).

That is, the feedback policy is that, when a user behavior is detected, the following conditions need to be met: tapping times exceeds 1, no page turning behavior exists, and staying duration of the user on the current interface exceeds 5 s. Because the object opening times >0 is an unnecessary evaluation criterion in the feedback policy, before a feedback button is dynamically generated, a quantity of times of an object opening operation performed in the detected user behavior >0 may be further satisfied.

For example, as shown in FIG. 8A to FIG. 8E, it is assumed that the terminal device determines that the user enters a query word "weather" on an interface A of the application A and taps search to jump to an interface B. In this case, a weather box control is displayed on the interface B. Then, after detecting that the user performs an operation on the weather box control, it is determined that the current scenario is a BOX scenario, and the terminal device may determine that a feedback policy used when the application feedback method is executed is the feedback policy corresponding to the BOX scenario, that is, content in Table 6.

Further, it is detected whether the operation behavior of the user in the BOX scenario meets the corresponding feedback policy.

For example, when the terminal device performs S703, the terminal device detects that the user performs a tapping operation on an element in the weather box control once, so that the display interface of the current weather box control changes to an interface C. The terminal device further detects that the user performs a tapping operation on an element in the interface C, so that the current display interface changes to an interface D, and browsing duration of the user in this entire operation process is as long as 10 s. The user behavior detected by the terminal device includes two tapping operations and browsing duration of 10 s.

Further, the terminal device matches the collected user behavior with the feedback policy in Table 7, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on the current interface D. After detecting that the user taps the feedback button, the terminal device displays a feedback interface associated with the scenario, and the terminal device performs S707 to obtain a feedback suggestion that is submitted by the user through the feedback interface and that is for the search application, to complete a feedback interaction process between the user and the application.

Figure 9A:
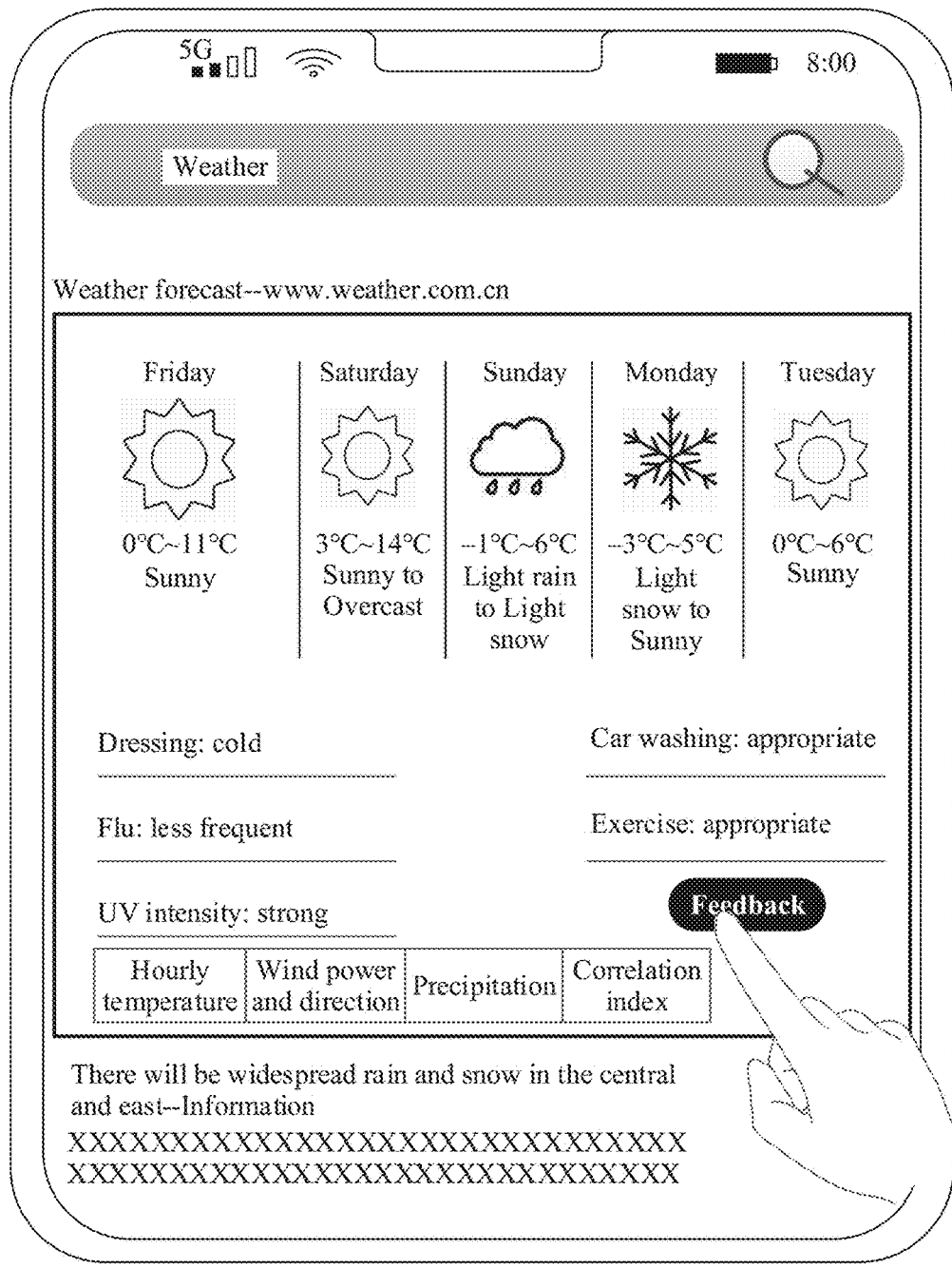
FIG. 9A and FIG. 9B are a schematic diagram of feedback interfaces in a first BOX case according to an embodiment of this application.
Figure 9B:
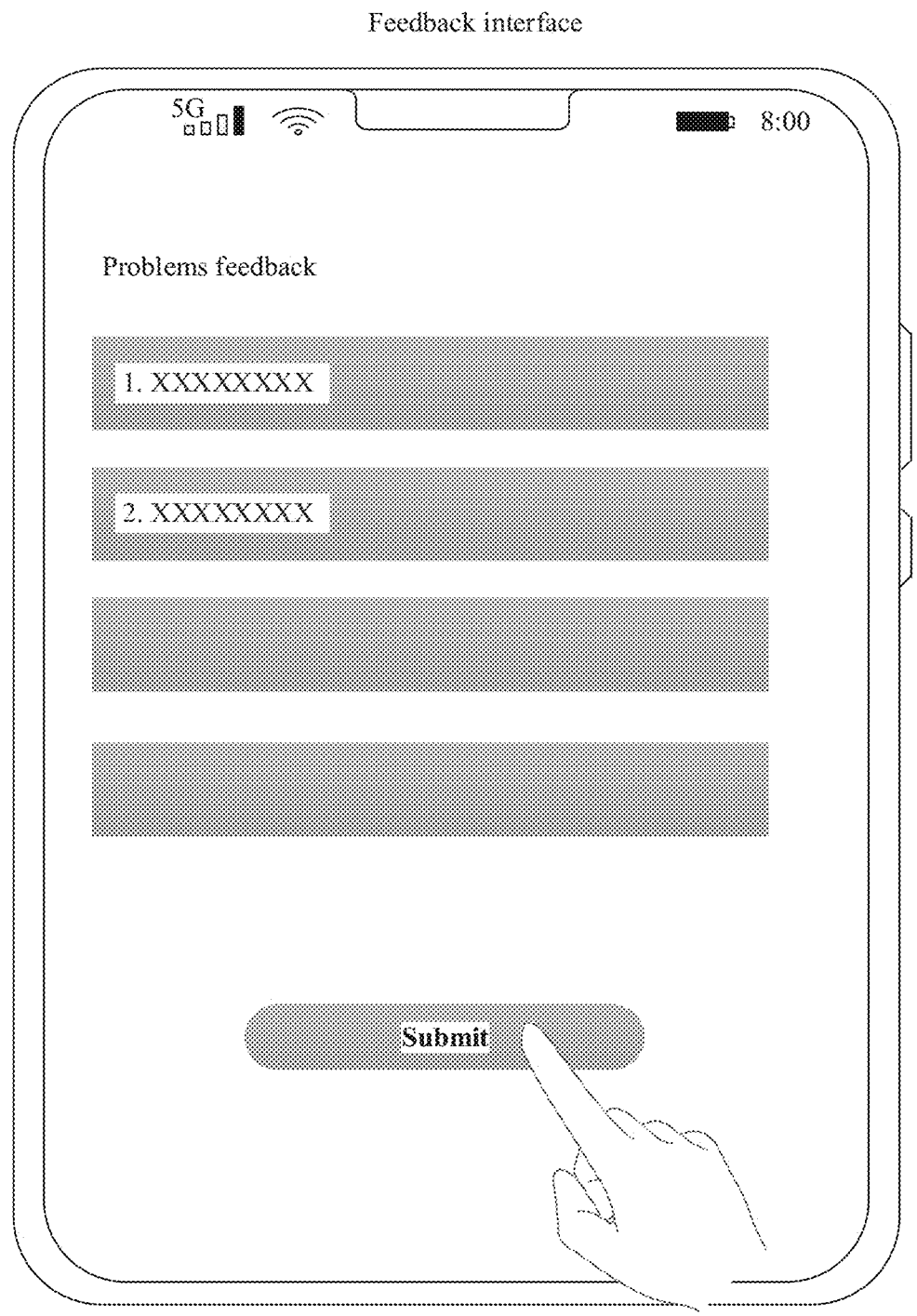

In this embodiment of this application, after the terminal device detects that the user taps the feedback button, specific displayed cases are not limited to the following:

Displaying 1: As shown in FIG. 9A and FIG. 9B, after detecting that the user taps the feedback button, the terminal device performs interface jumping, and displays a feedback interface.

Figure 10A:
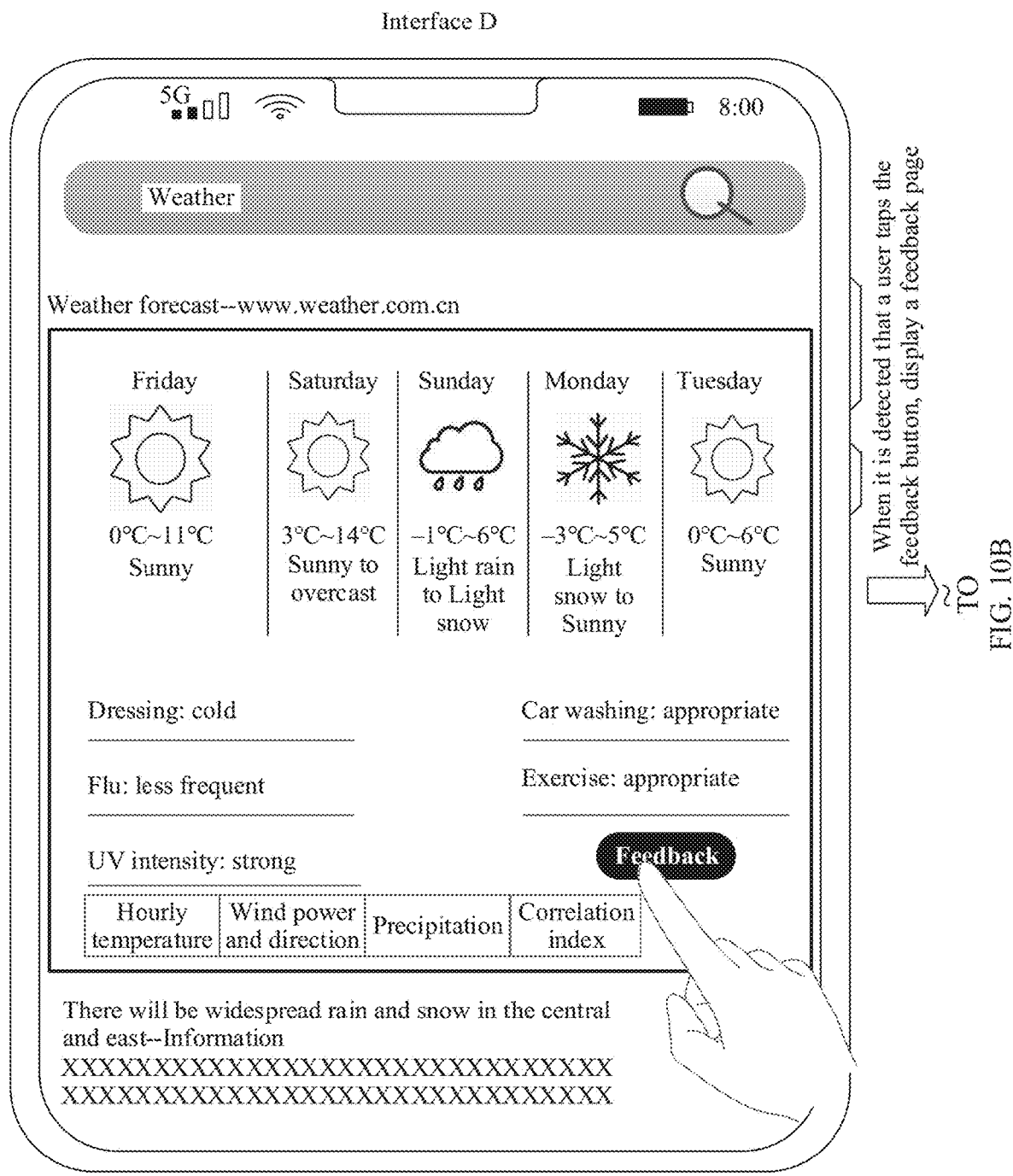
FIG. 10A and FIG. 10B are a schematic diagram of feedback interfaces in a second BOX case according to an embodiment of this application.
Figure 10B:
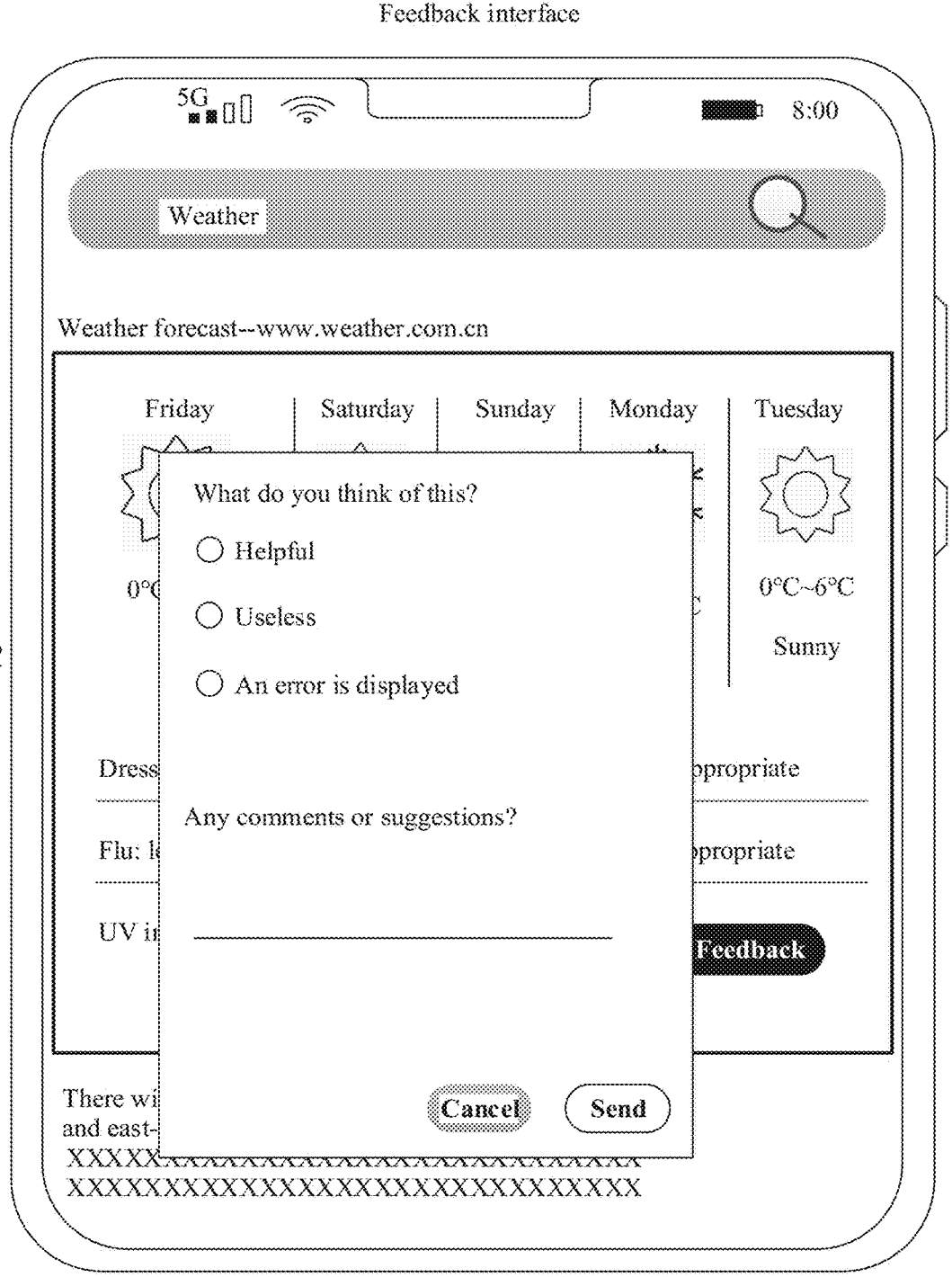

Displaying 2: As shown in FIG. 10A and FIG. 10B, after detecting that the user taps the feedback button, the terminal device pops up a feedback window on the current interface, where content in the feedback window includes an option box, a text box, and the like.

Figure 11A:
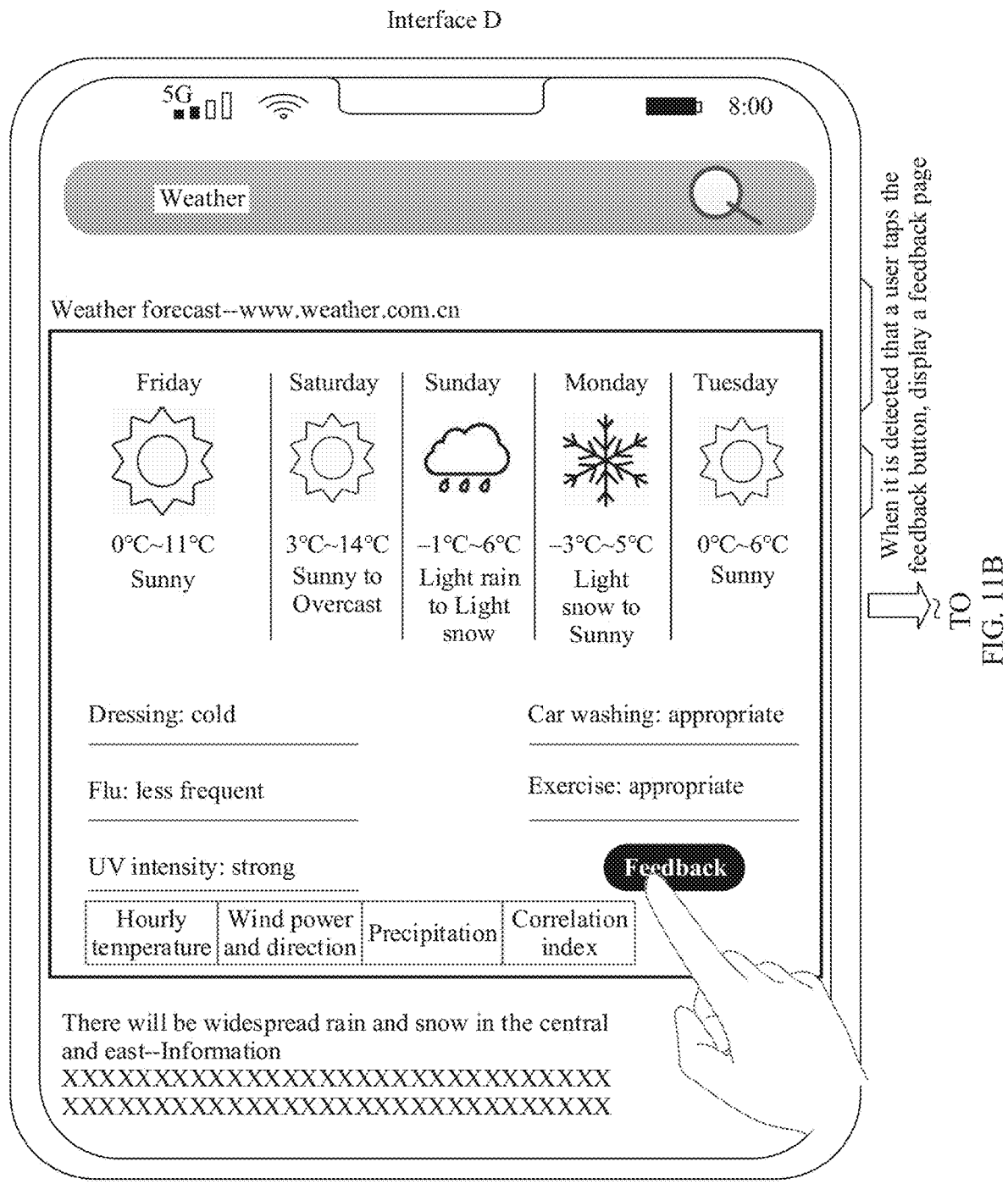
FIG. 11A and FIG. 11B are a schematic diagram of feedback interfaces in a third BOX case according to an embodiment of this application.
Figure 11B:
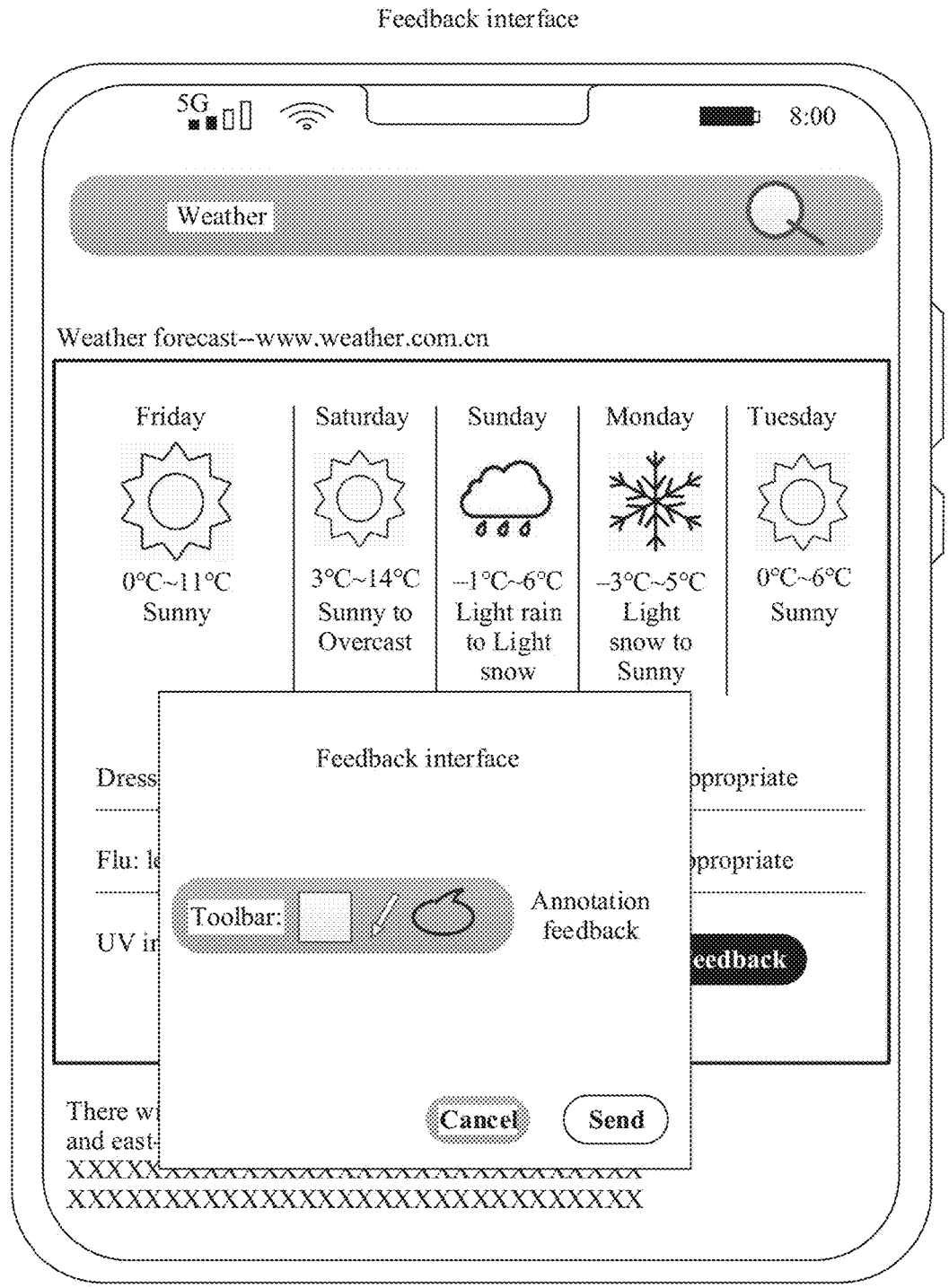

Displaying 3: As shown in FIG. 11A and FIG. 11B, after detecting that the user taps the feedback button, the terminal device pops up a feedback window in the current interface, where content in the feedback window includes an annotation toolbar, and the annotation toolbar is used to perform graffiti annotation on the current interface.

According to the foregoing content, this embodiment of this application provides a BOX display scenario, in which a feedback button is dynamically generated based on a detected user behavior and a corresponding feedback policy, flexibility is better, and user experience is high.

Embodiment 2: An example of application performed based on the application feedback method in this application when a display interface in a search application is an information stream case is provided.

An optional information flow scenario in this embodiment of this application is a home page display scenario of a search application.

For example, it is assumed that, in this embodiment of this application, when the search application A is in an information stream case, an application feedback policy that is set is shown in the following Table 8.

feedback policy corresponding to the information stream scenario, that is, content in Table 8.

Figure 12A:
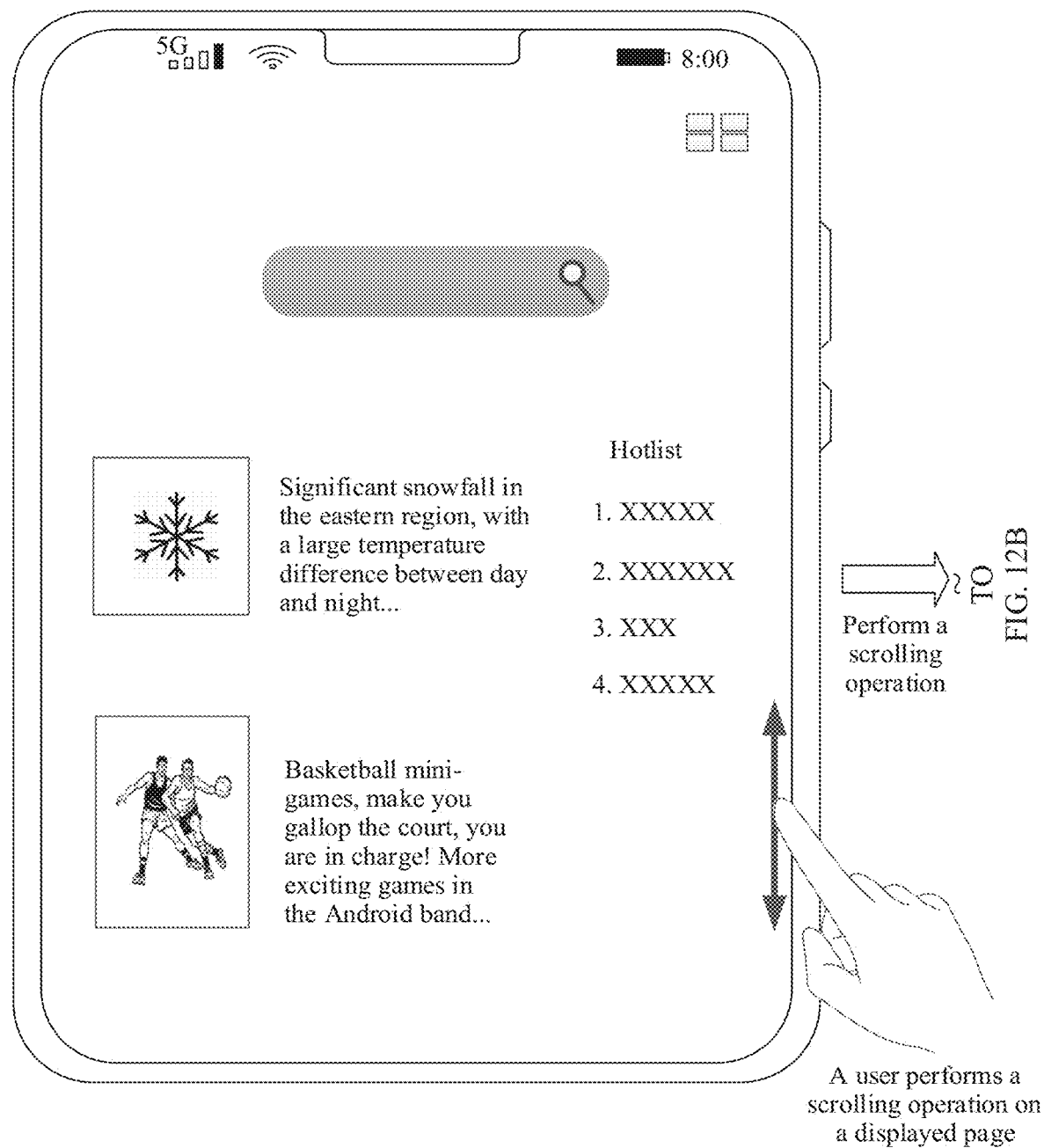
FIG. 12A to FIG. 12E are a schematic diagram of user interface operations in an information stream case according to an embodiment of this application.
Figure 12B:
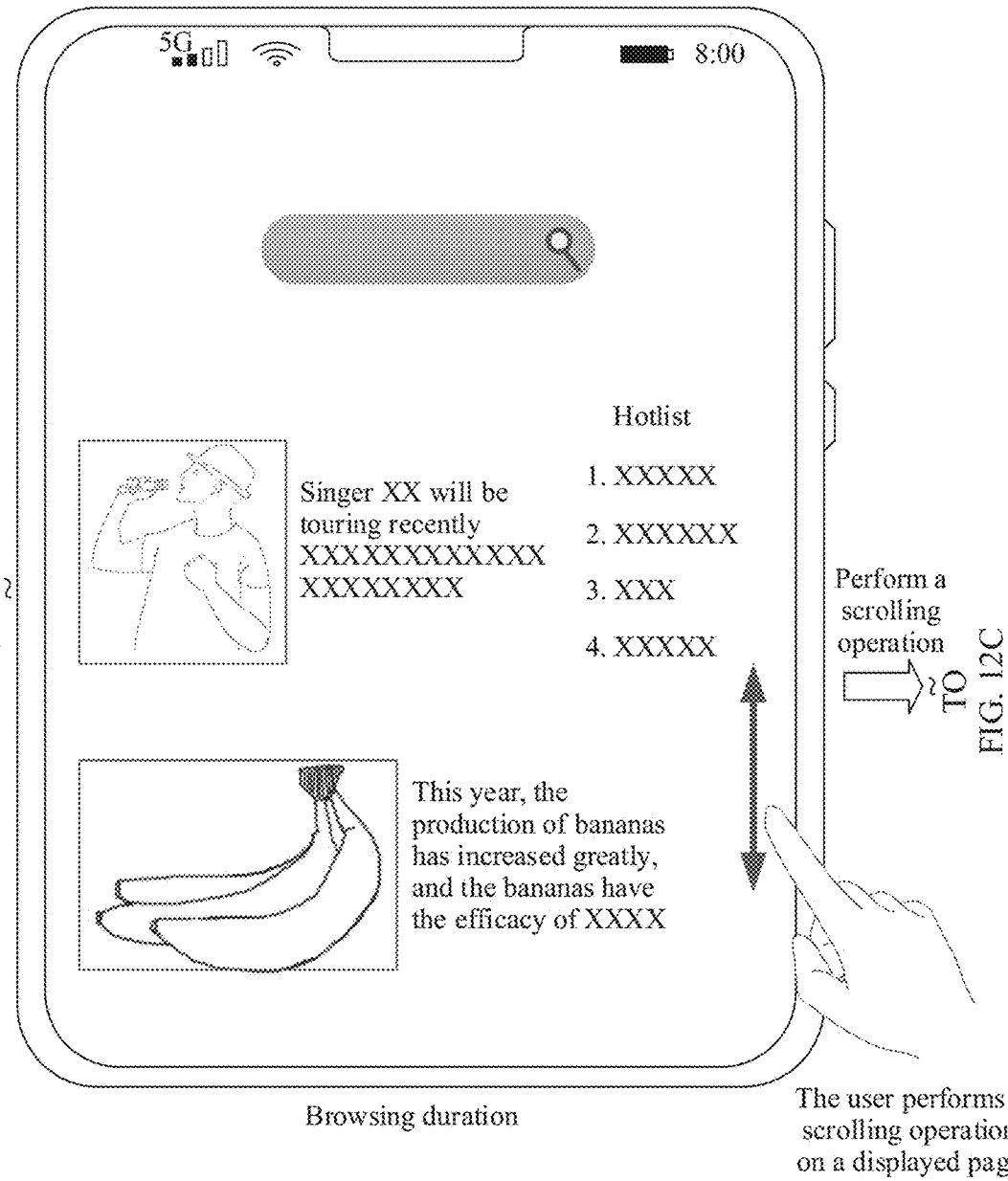

When the terminal device performs S703, the terminal device detects that the user performs a scrolling operation on the interface A, so that a current display interface is shown as an interface B in FIG. 12B, and browsing duration of the user on the interface B is as long as 10 s.

Figure 12C:
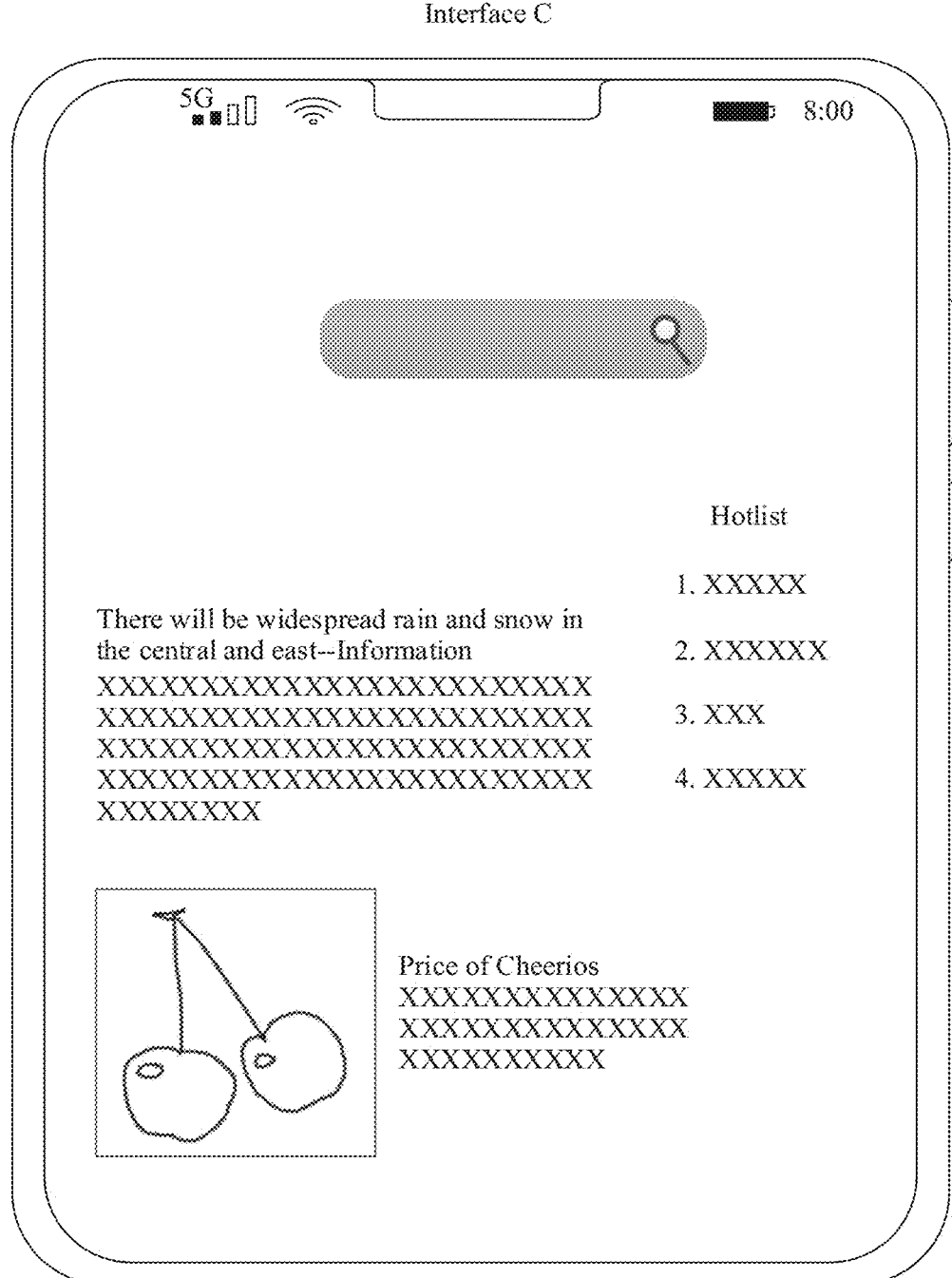
Figure 12D:
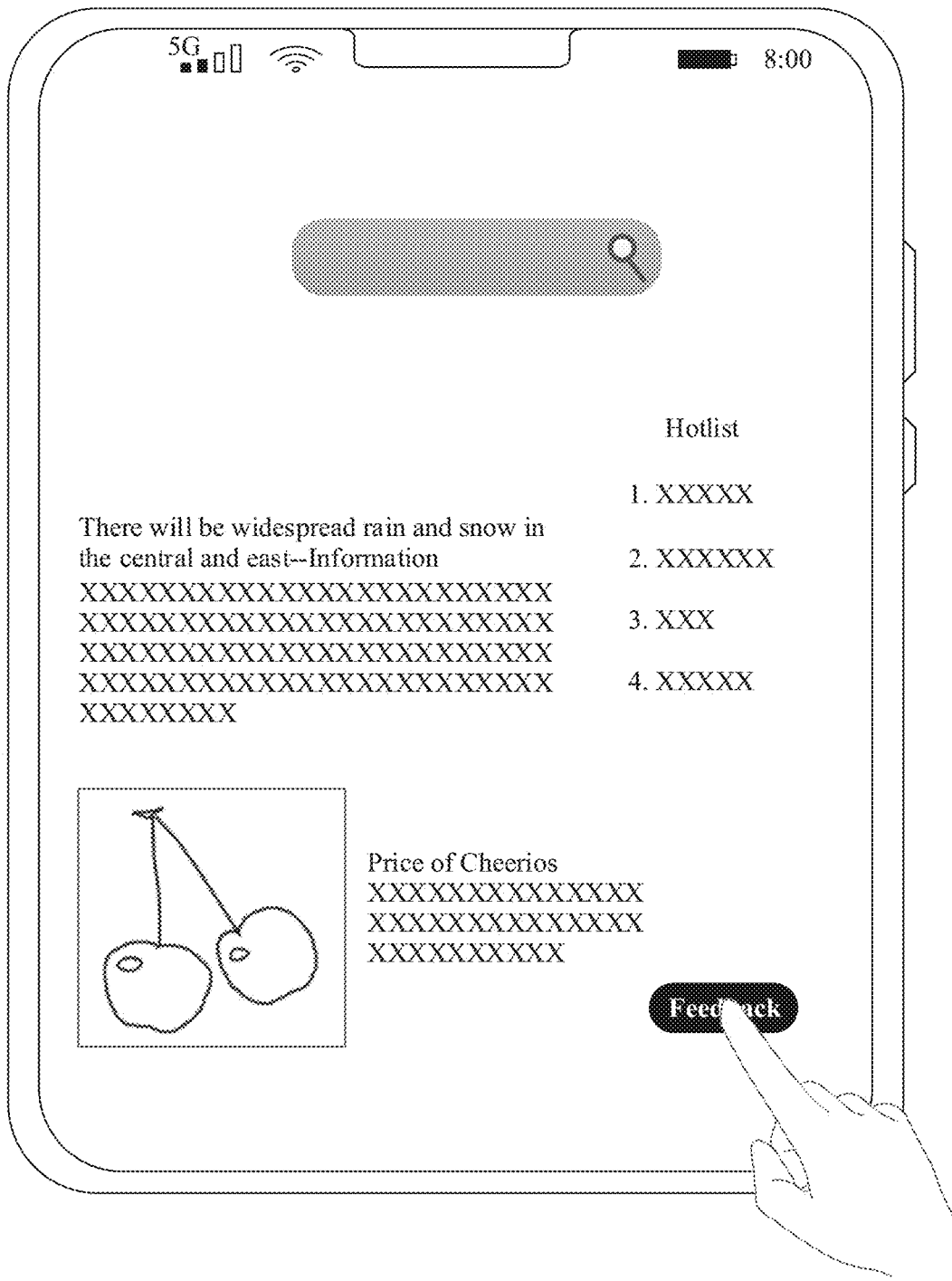
Figure 12E:
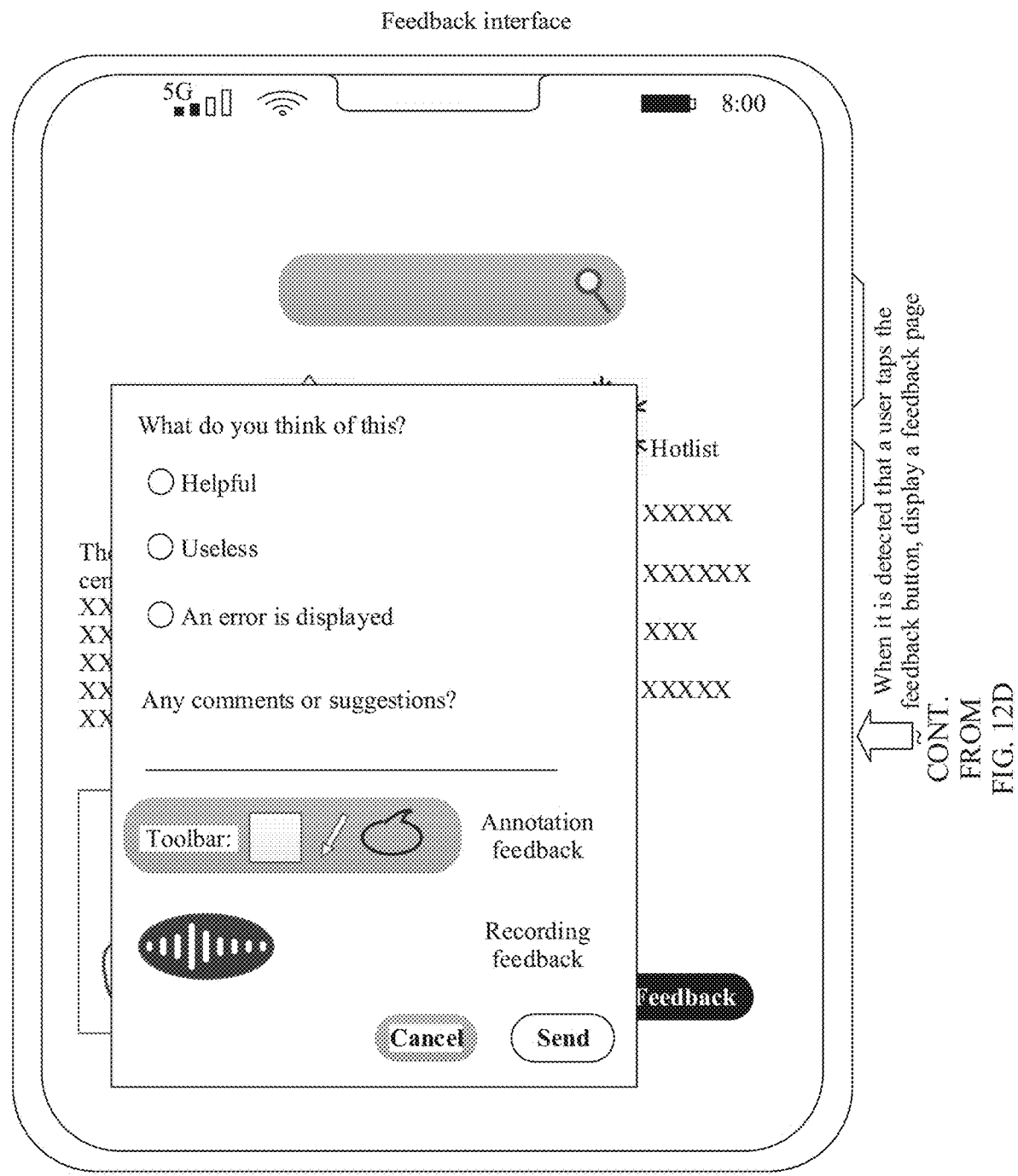
Figure 13A:
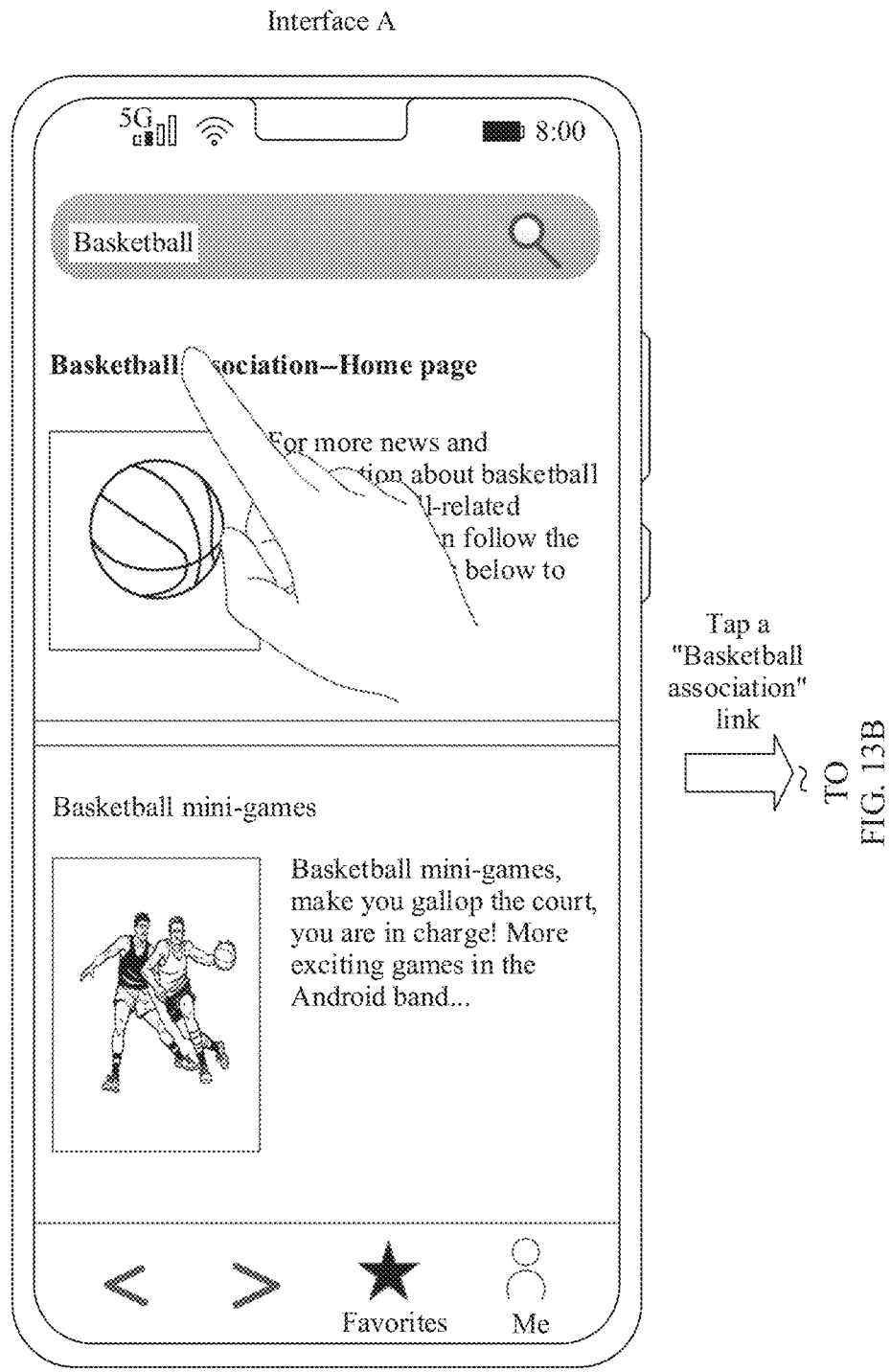
FIG. 13A to FIG. 13G are a schematic diagram of user interface operations in a web page case according to an embodiment of this application.
Figure 13B:
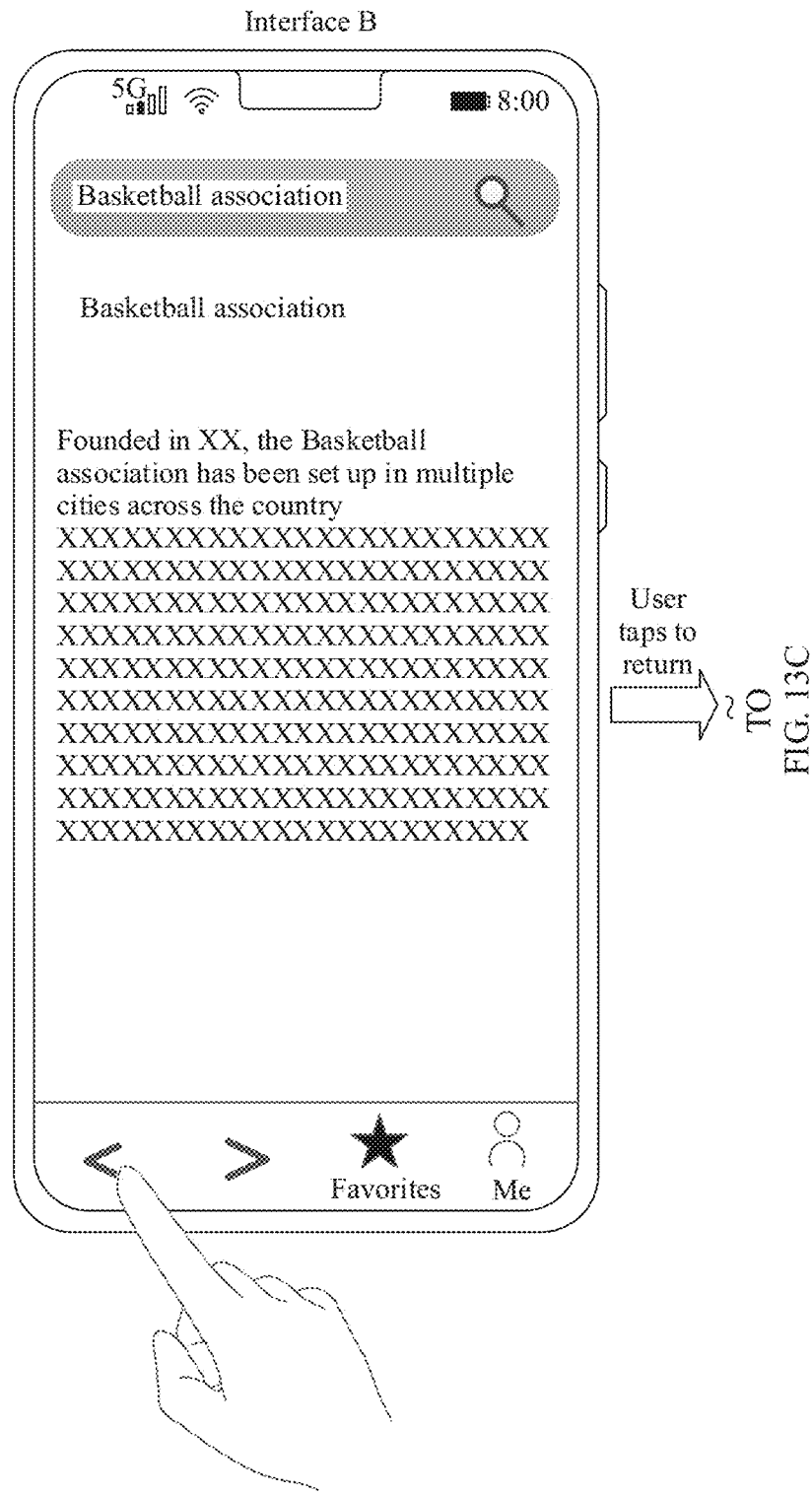
Figure 13C:
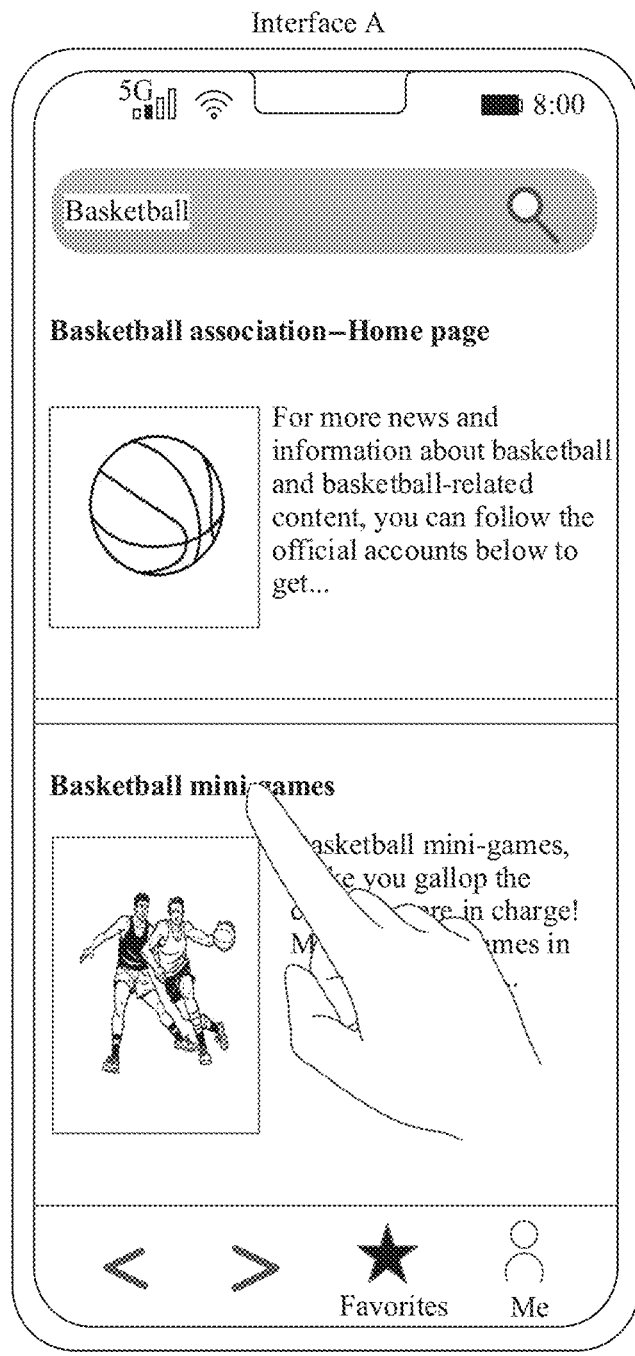
Figure 13D:
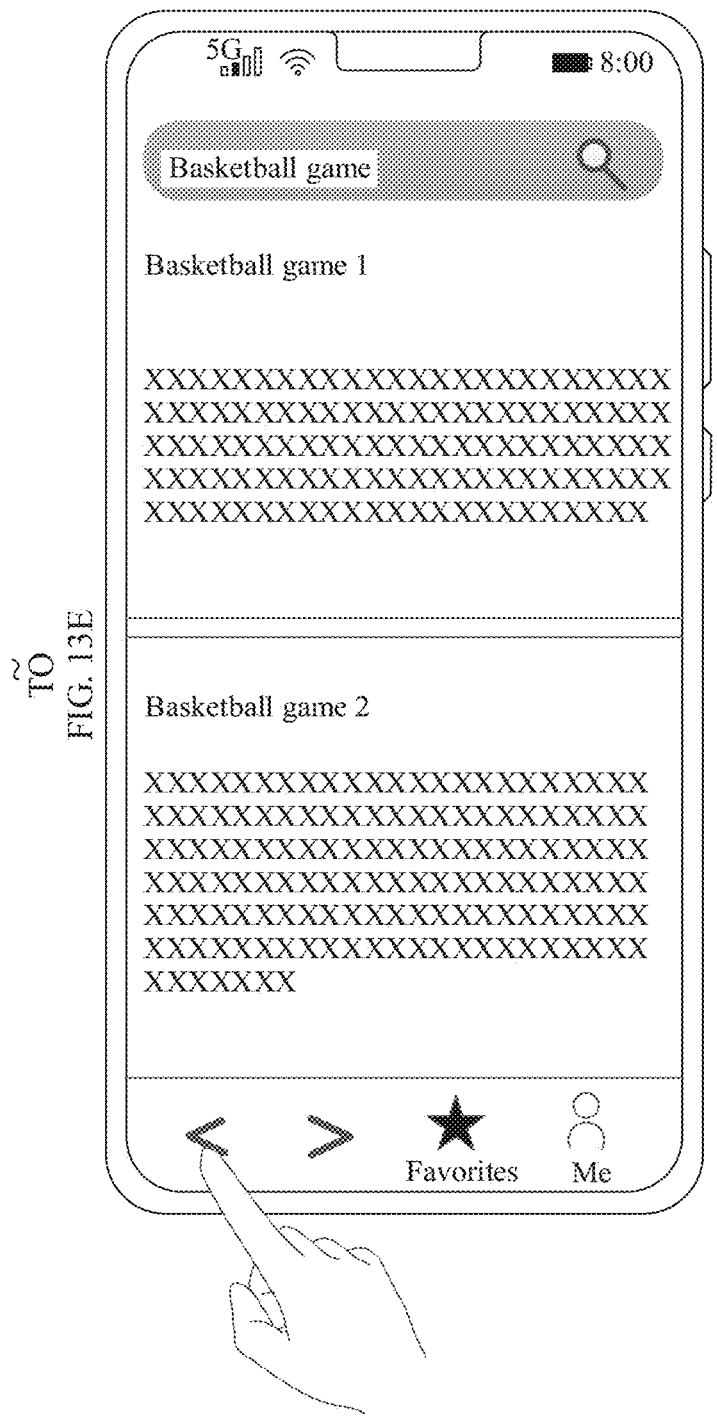
Figure 13E:
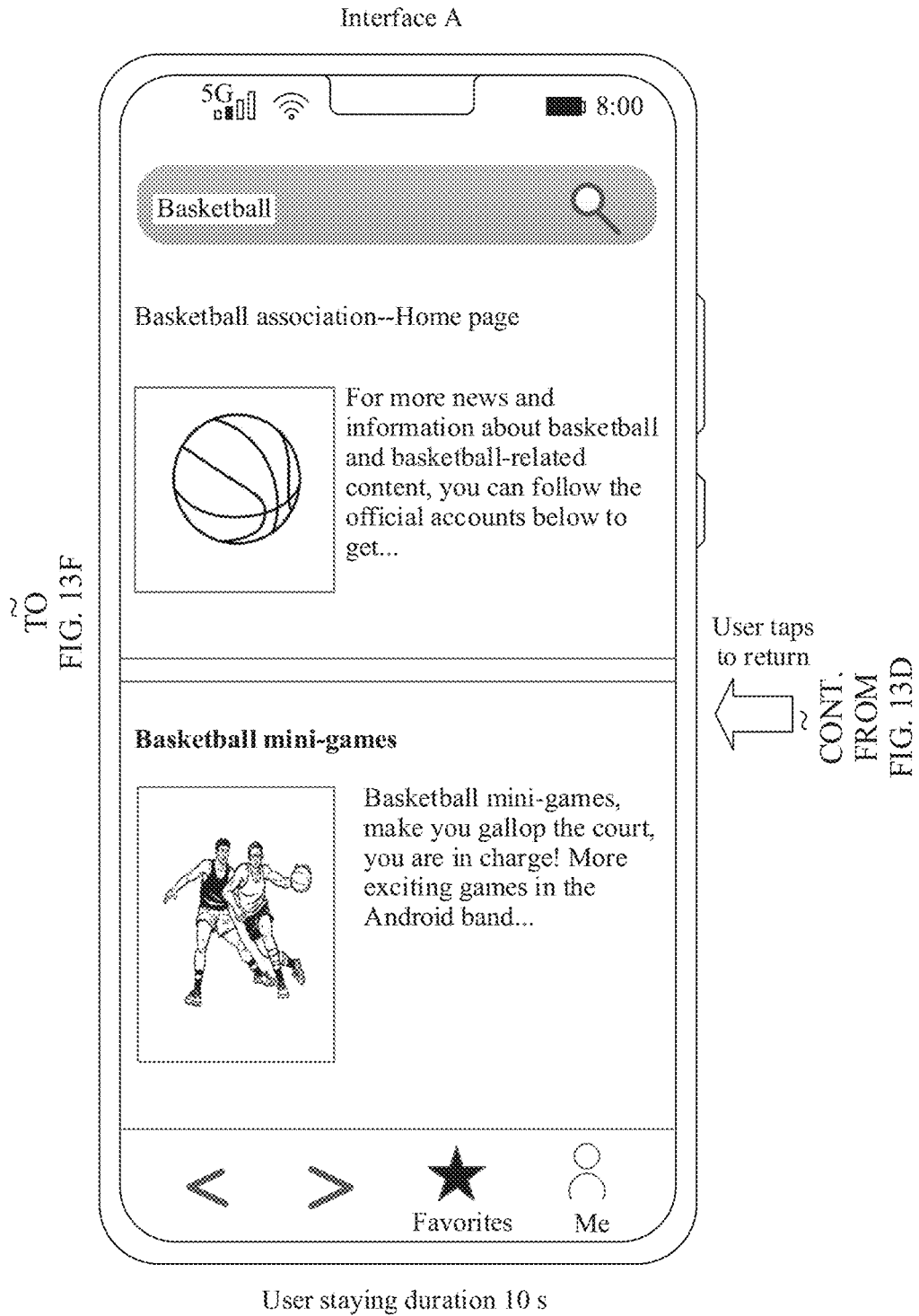
Figure 13F:
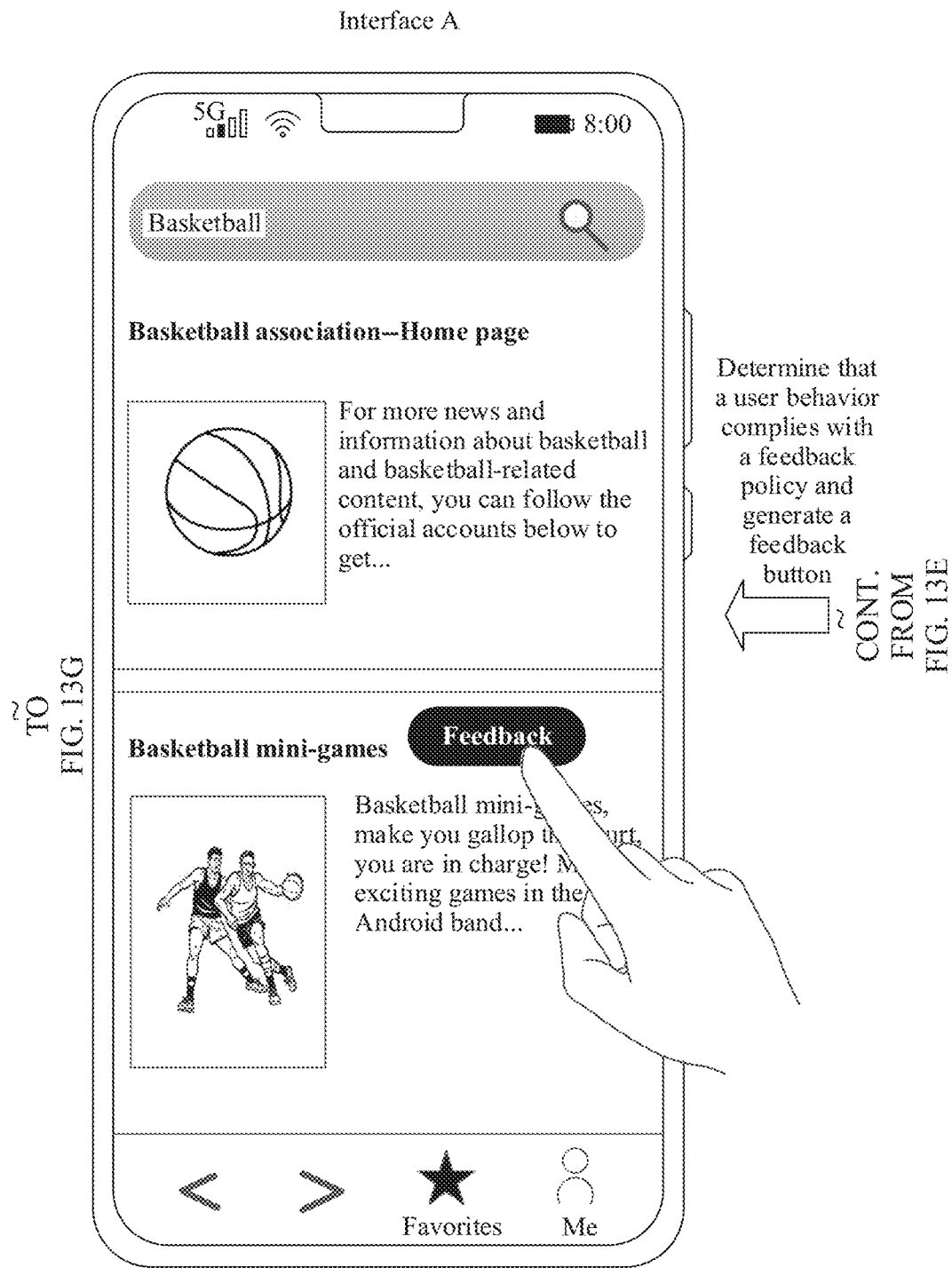
Figure 13G:
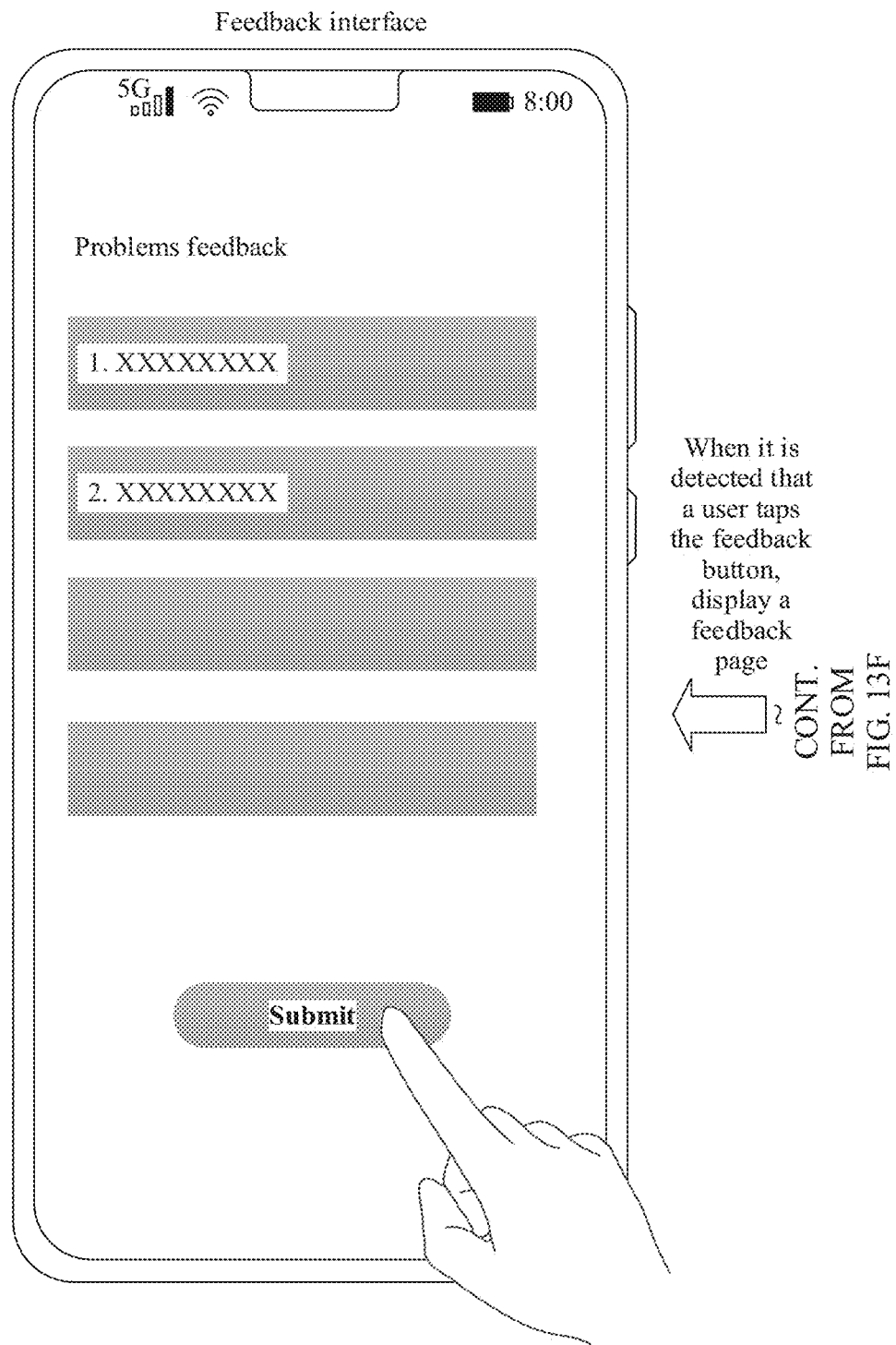
Figure 14A:
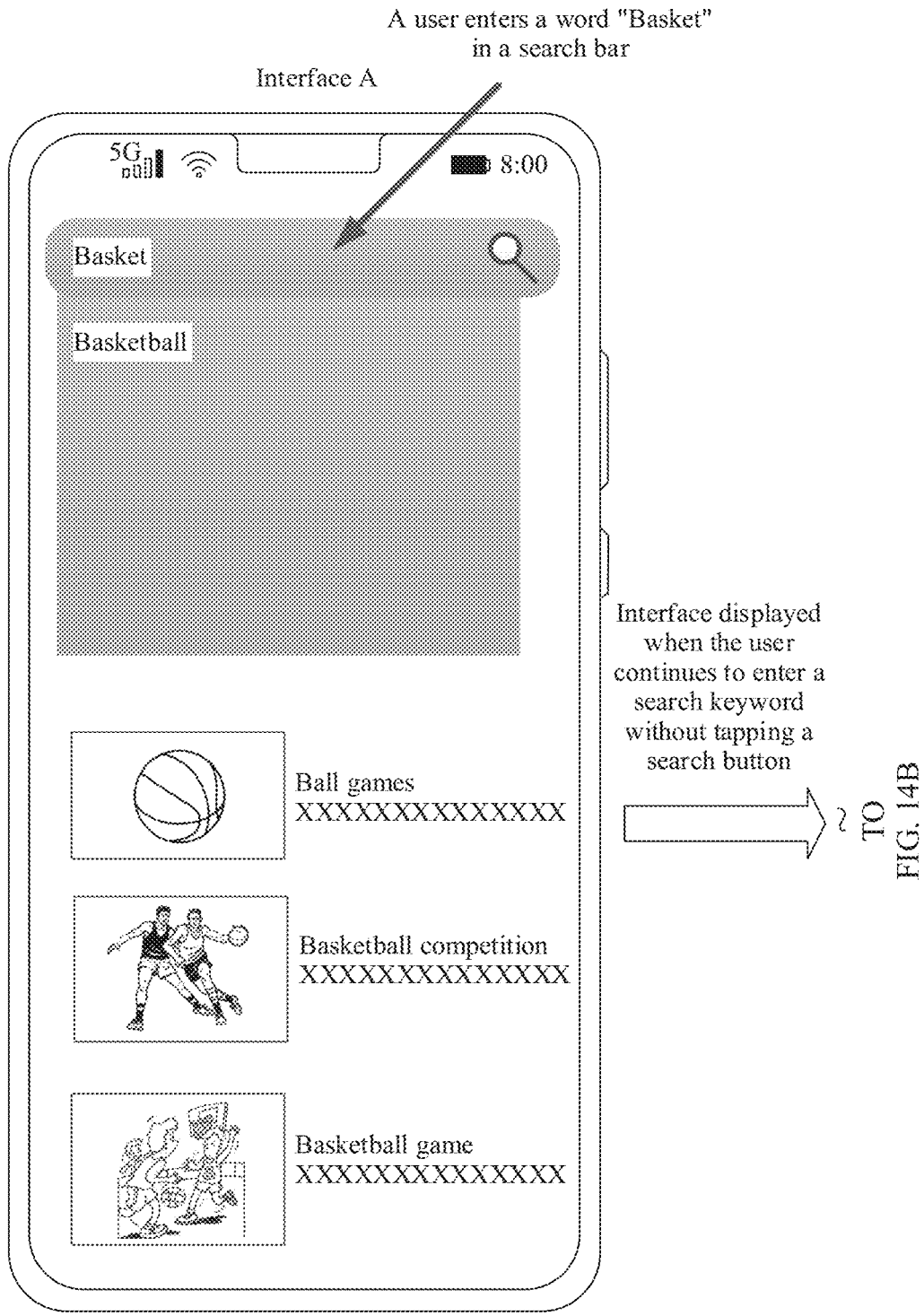
FIG. 14A to FIG. 14F are a schematic diagram of user interface operations in a first recommendation case according to an embodiment of this application.
Figure 14B:
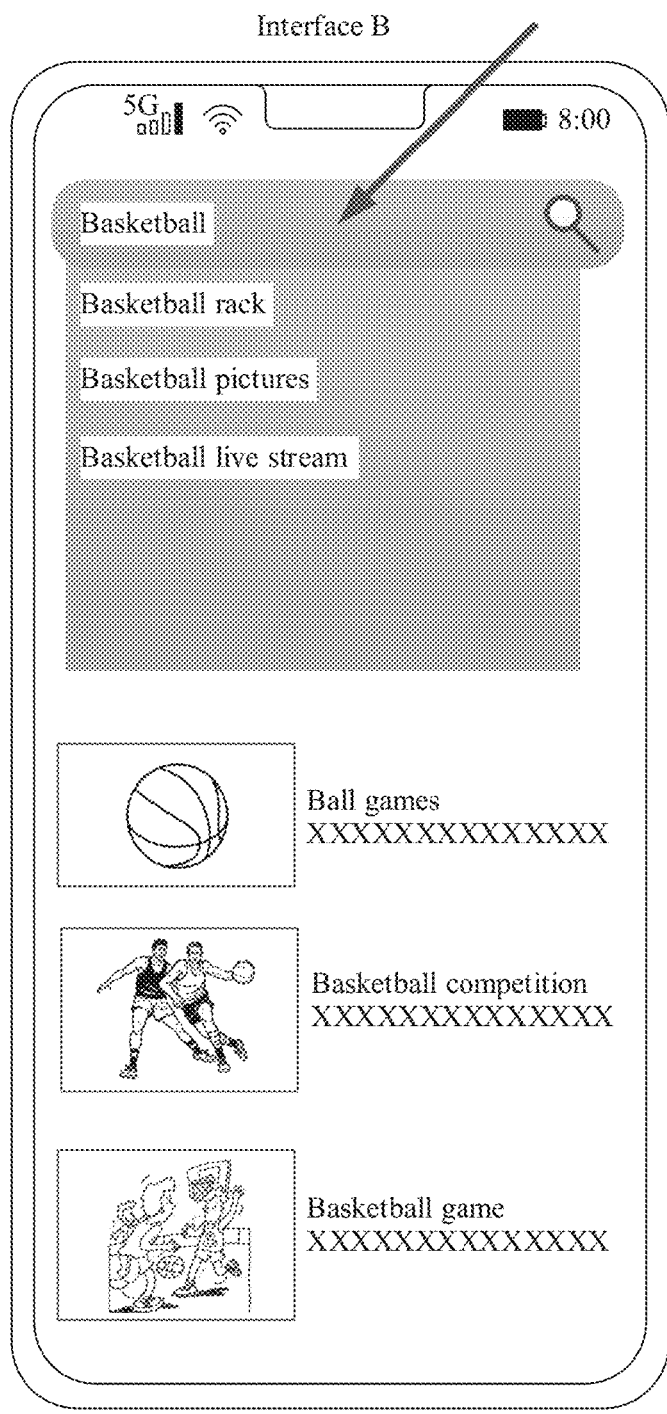
Figure 14C:
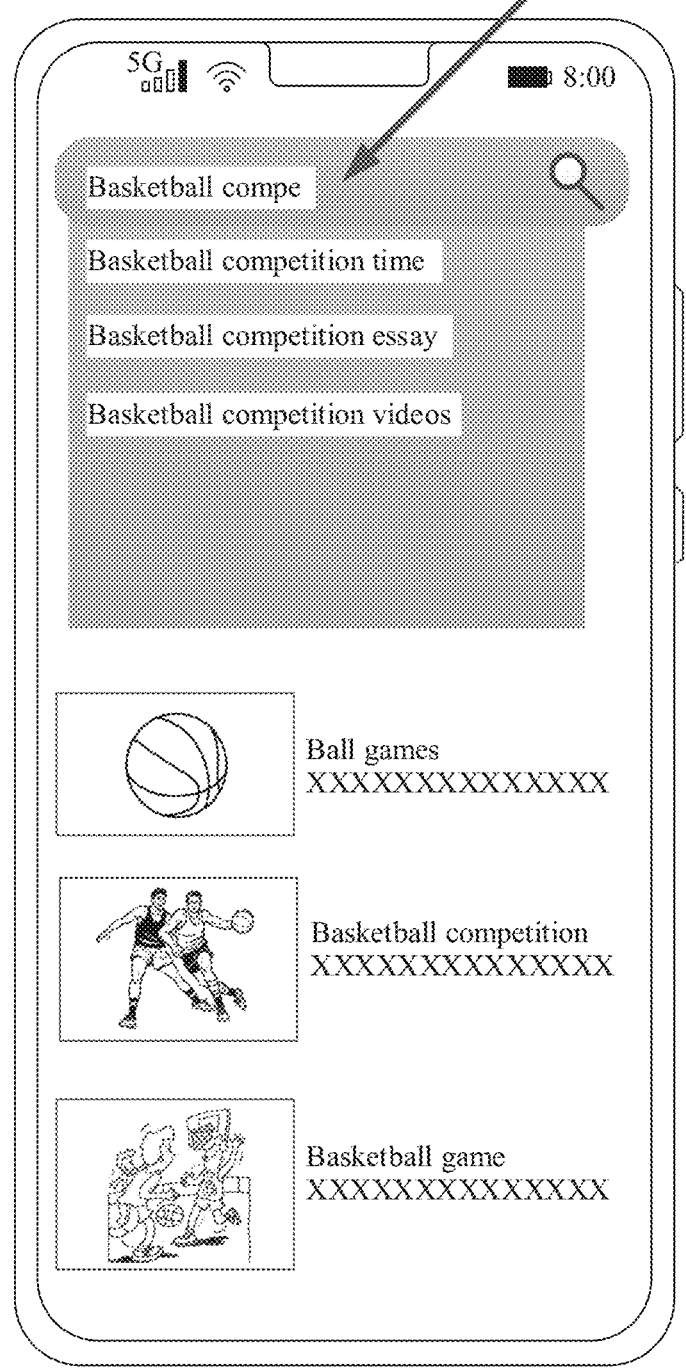
Figure 14D:
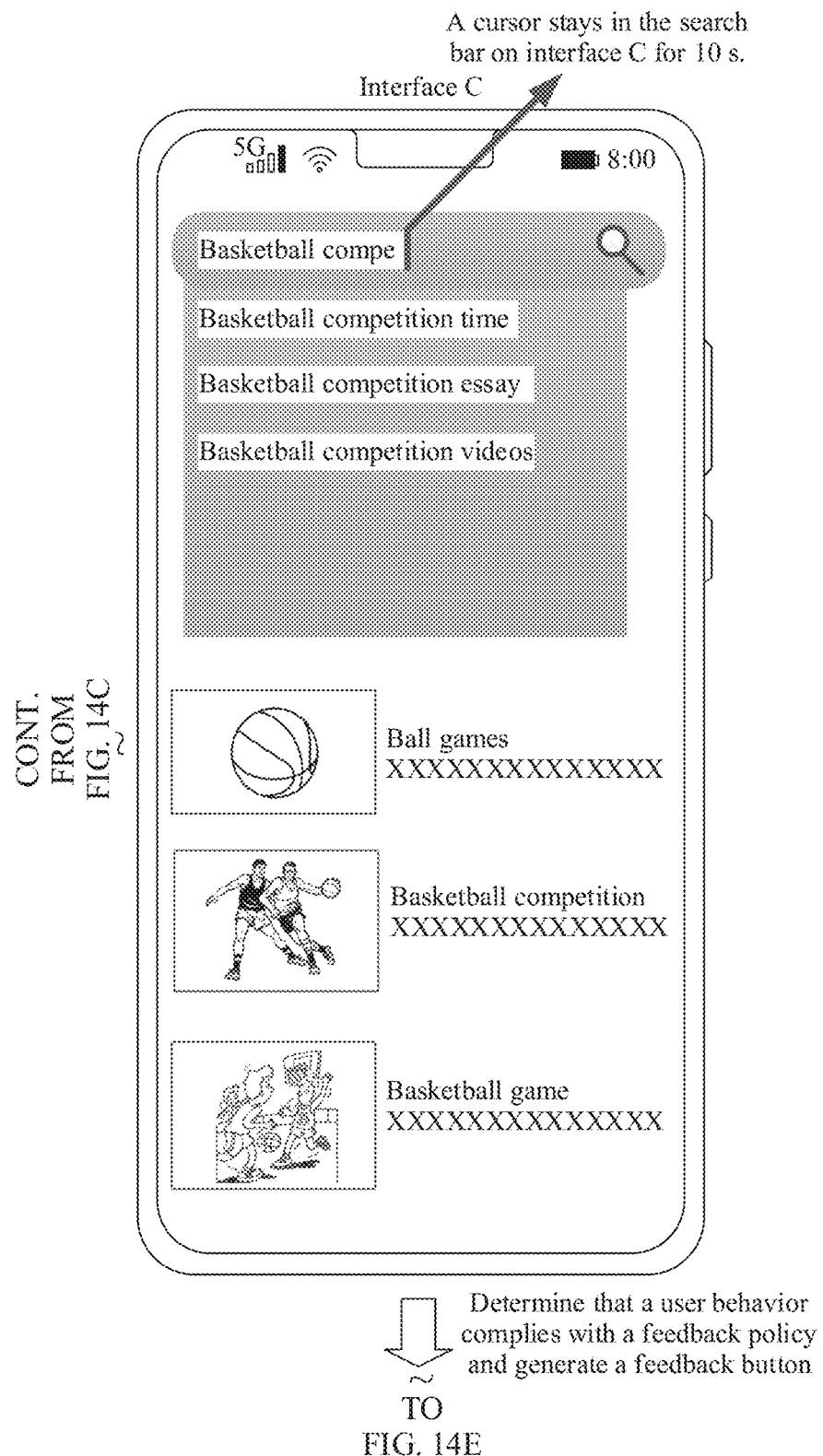
Figure 14E:
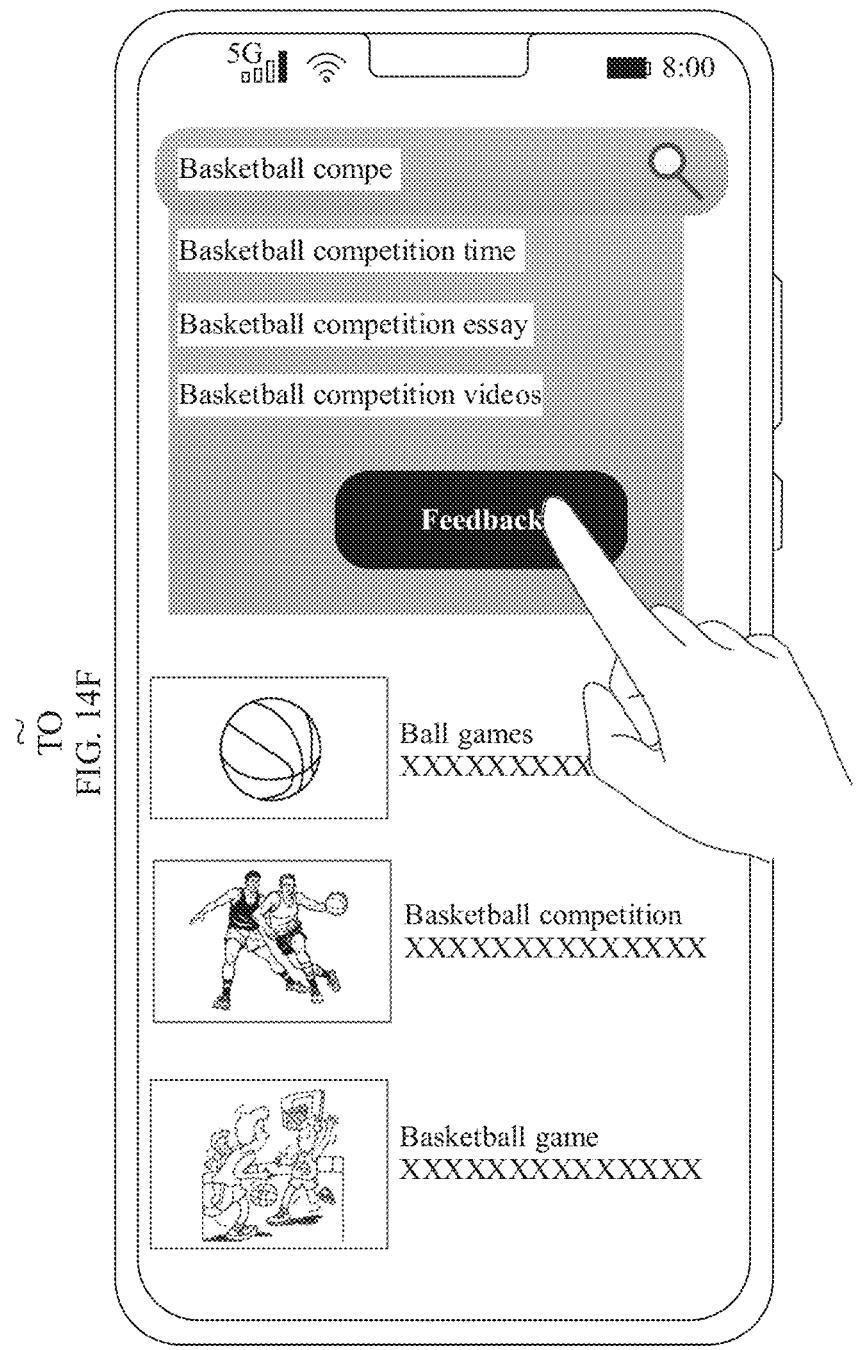
Figure 14F:
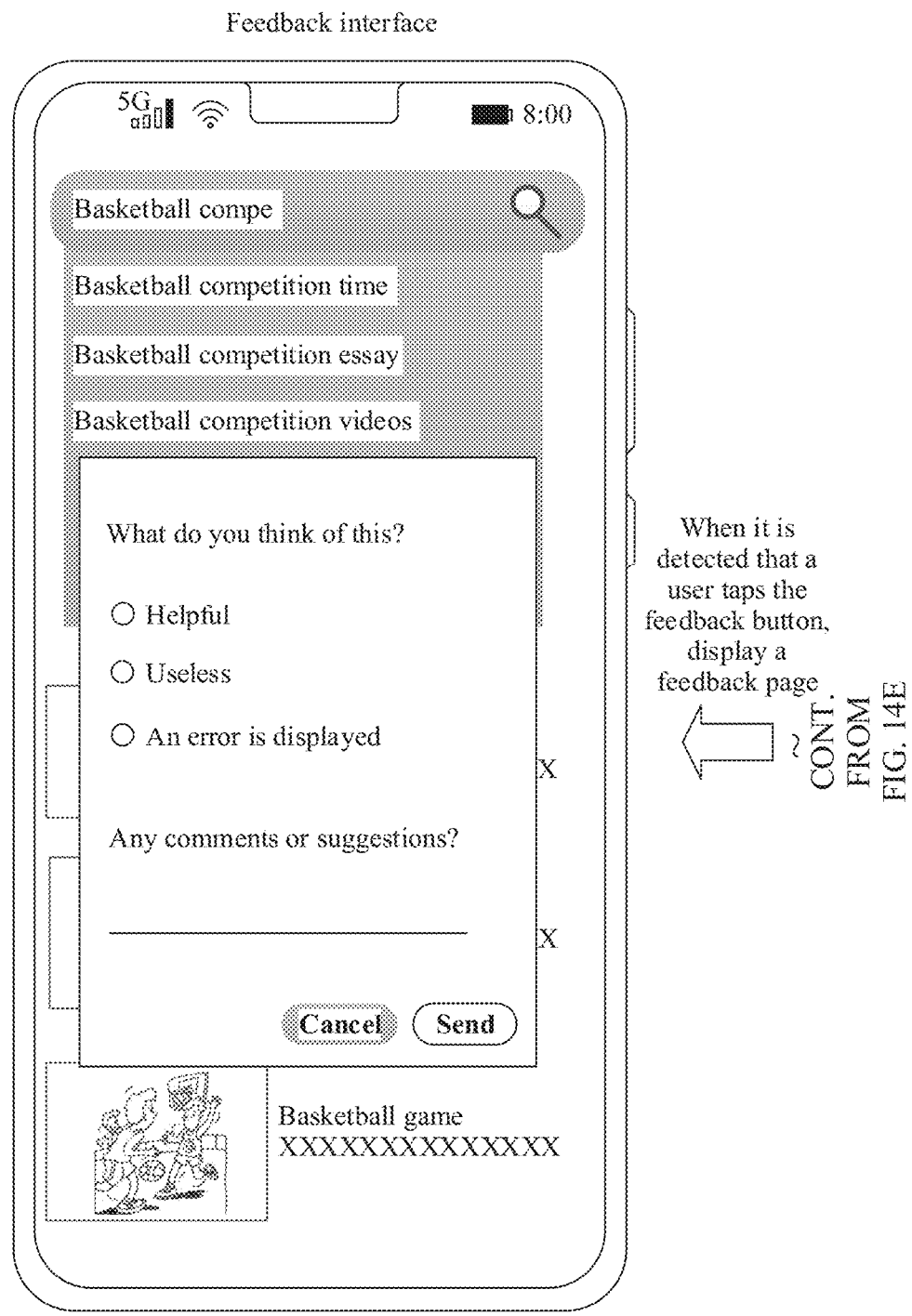
Figure 15A:
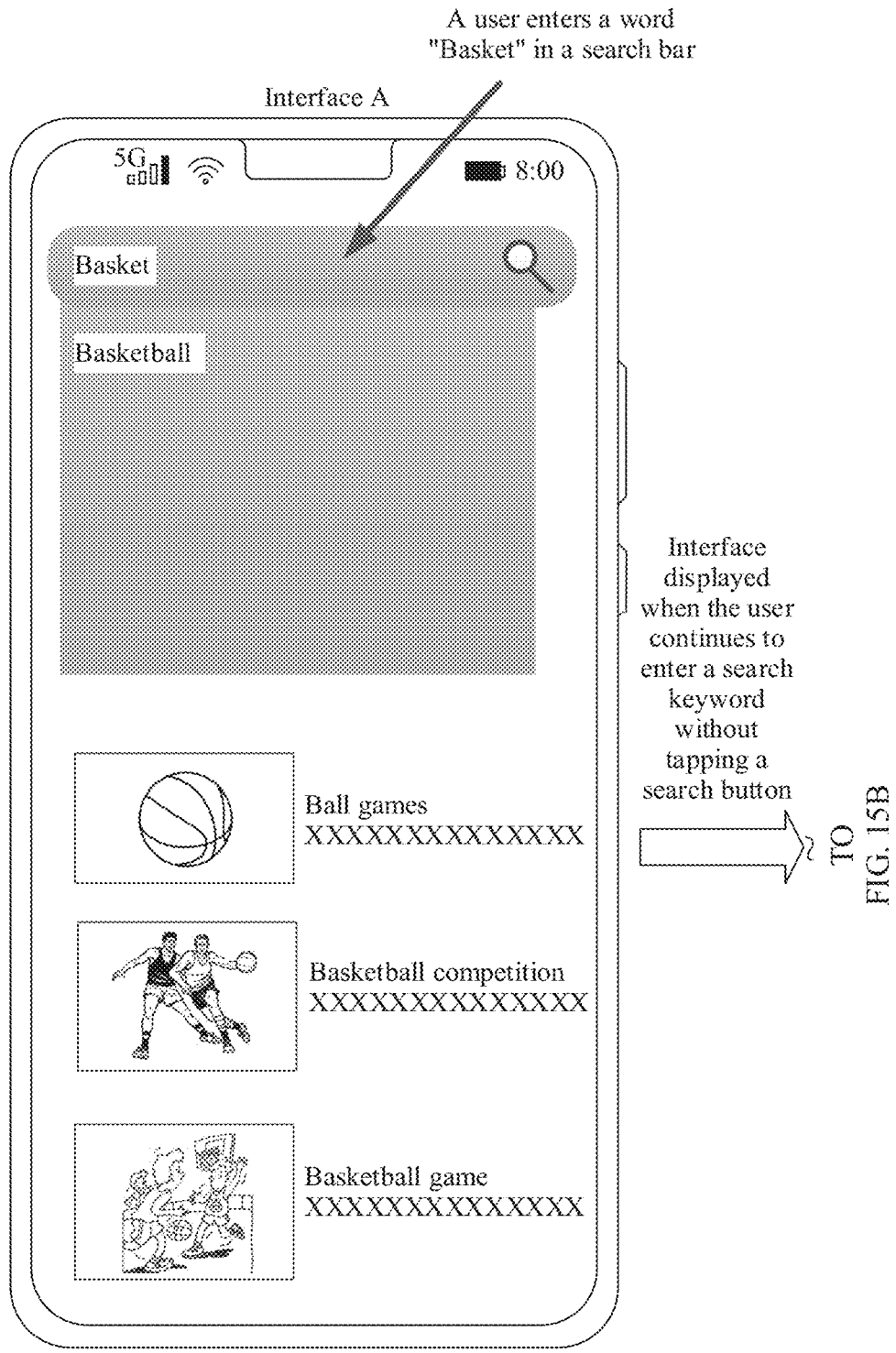
FIG. 15A to FIG. 15F are a schematic diagram of user interface operations in a second recommendation case according to an embodiment of this application.
Figure 15B:
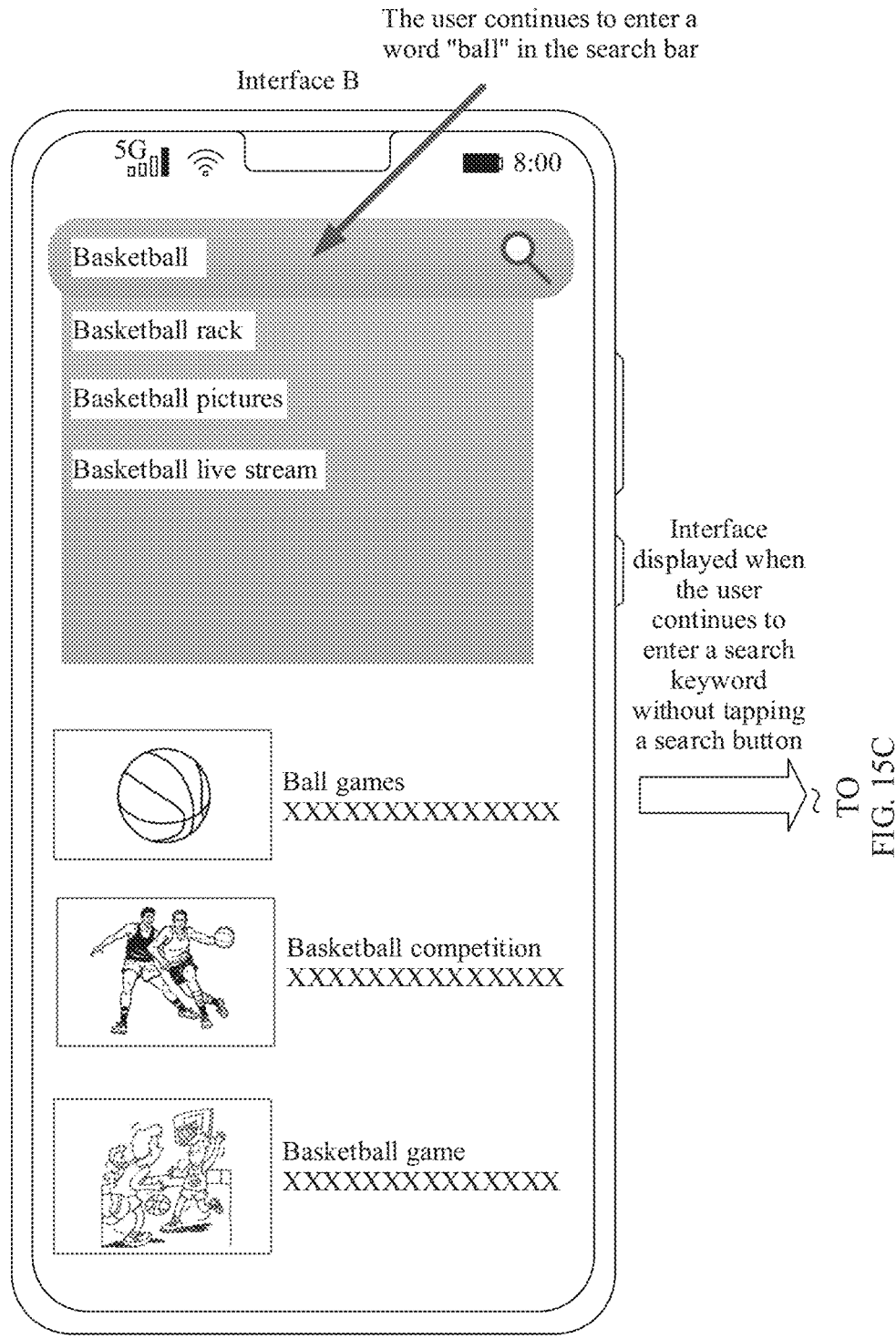
Figure 15C:
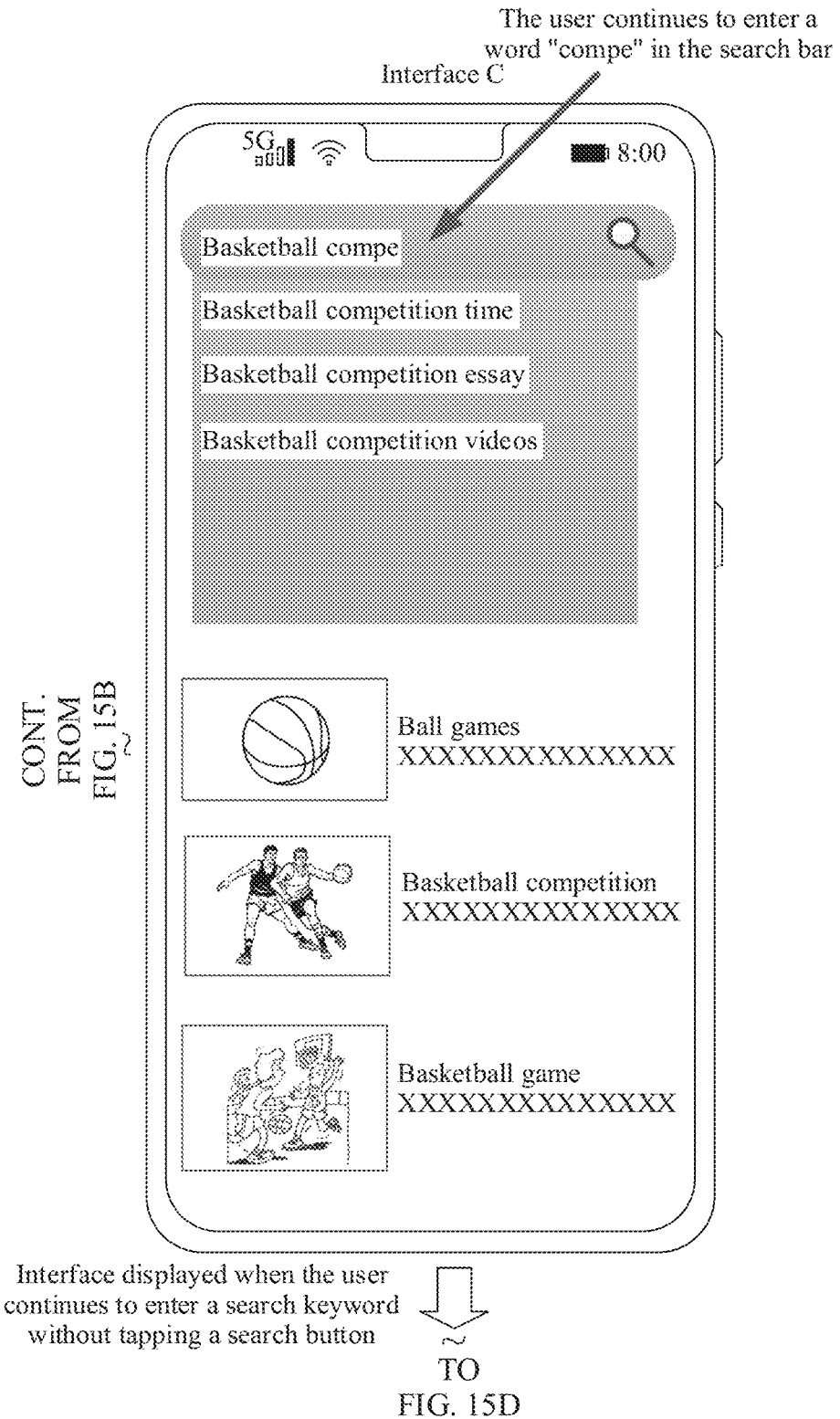
Figure 15D:
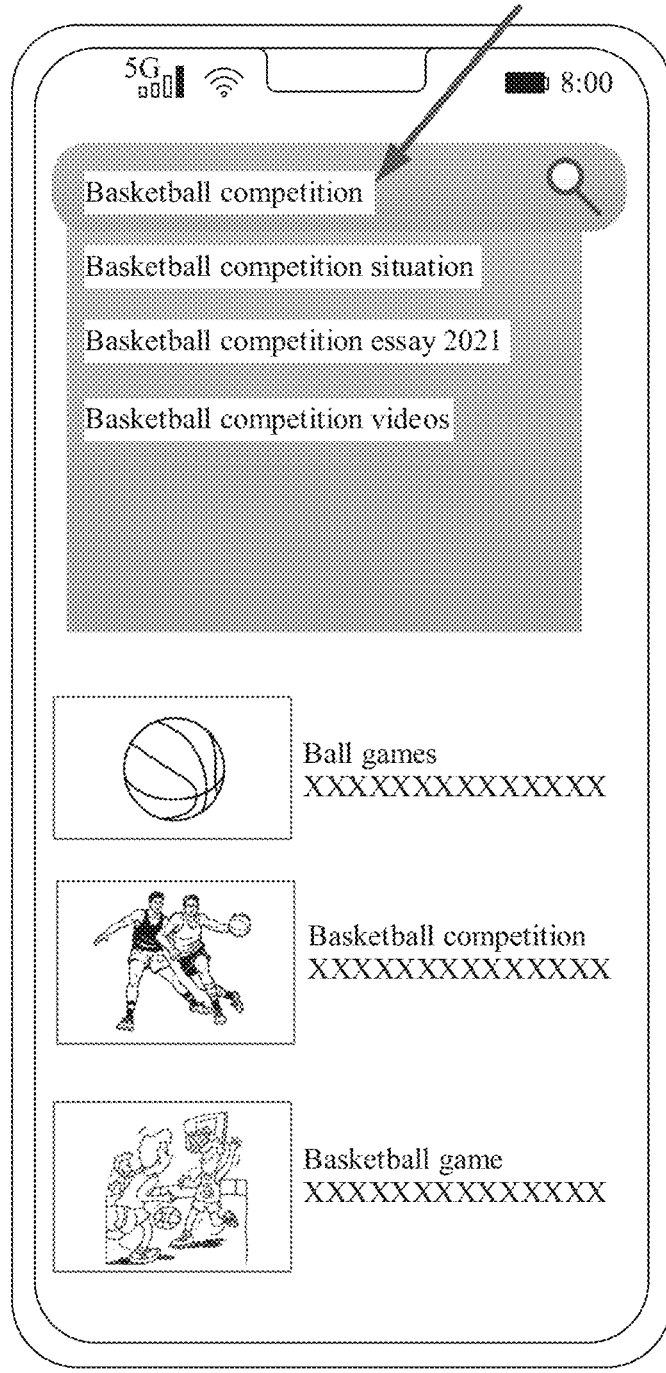
Figure 15E:
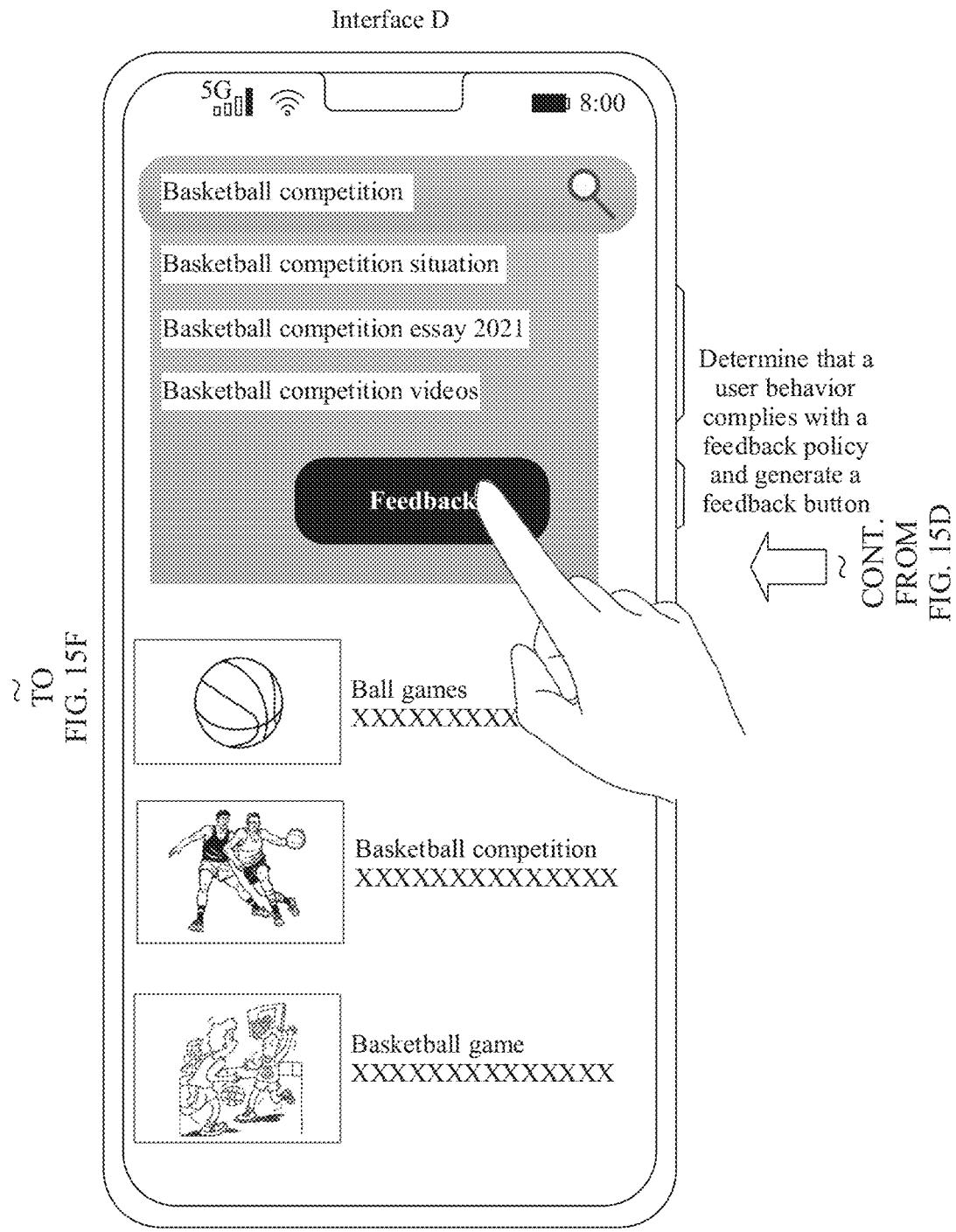
Figure 15F:
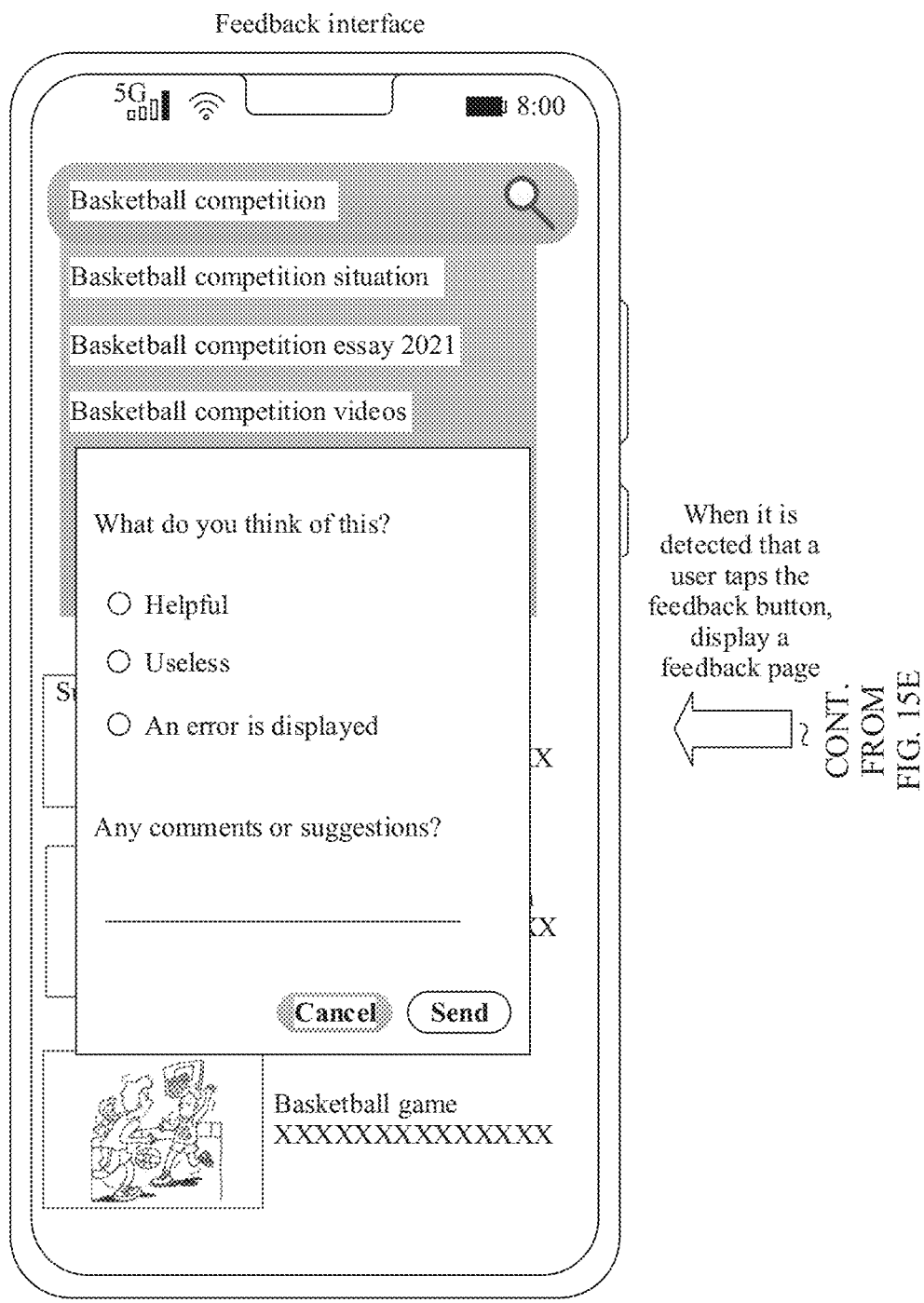

Then, the terminal device further detects that the user performs a scrolling operation on the interface B, so that a current display interface is shown as an interface C in FIG. 12C.

The user behavior detected by the terminal device includes two scrolling operations and browsing duration of 10 s.

Further, the terminal device matches the collected user behavior with the feedback policy in Table 8, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on the current interface C. After detecting that the user taps the feedback button, the terminal device

TABLE 8

Feedback policy 6 of the search application A
Feedback policy of the search application A

| Applicable to | Selected dimension | Criteria | Necessity | Generated feedback policy | Feedback policy description |
|---|---|---|---|---|---|
| Information stream | User scrolling Staying duration | Scrolling times > 2 Duration > 5 s | Necessary Necessary | (Staying duration > 5 s) + (scrolling times > 2) | After a user opens the search application A, and the search application A displays an interface obtained after searching in a form of an information stream, it is detected that a quantity of times of scrolling performed by the user exceeds two, and duration of the user on a browsing interface exceeds 5 s. |

According to the content in Table 8, it can be known that a matching calculation formula of the feedback policy of the search application is as follows:

(staying duration>5 s)+(scrolling times>2).

That is, the feedback policy is that, when a user behavior is detected, the following conditions need to be met: scrolling times exceeds 2, and staying duration of the user on the current interface exceeds 5 s.

For example, as shown in FIG. 12A to FIG. 12E, it is assumed that after opening the search application A, the terminal device enters a home page of the search application A, and a current display interface is an interface A shown in FIG. 12A. A scenario in which the user performs an operation on the home page of the search application A may be understood as an information stream scenario, and the terminal device may determine that a feedback policy used when the application feedback method is executed is the displays a feedback interface associated with the feedback button, and the terminal device performs S707 to obtain a feedback suggestion that is submitted by the user through the feedback interface and that is for the search application, to complete a feedback interaction process between the user and the application.

In this embodiment of this application, after the terminal device detects that the user taps the feedback button, displayed cases may alternatively be as shown in FIG. 9A to FIG. 11B in Embodiment 1. This is not specifically limited.

According to the foregoing content, this embodiment of this application provides an information stream display scenario, in which a feedback button is dynamically generated based on a detected user behavior and a corresponding feedback policy, flexibility is better, and user experience is high.

Embodiment 3: An example of application performed based on the application feedback method in this application when a display interface in a search application is a web page case is provided.

For example, it is assumed that, in this embodiment of this application, when the search application A is in a web page case, an application feedback policy that is set is shown in the following Table 9.

TABLE 9

Feedback policy 7 of the search application A
Feedback policy of search application A

| Applicable to | Selected dimension | Criteria | Necessity | Generated feedback policy | Feedback policy description |
|---|---|---|---|---|---|
| Information stream | User tapping | Tapping times > 0 | Necessary | (Tapping times > 0) + (staying duration > 5 s) + (opening times > 2) | After a user opens the search application A, and the search application A displays an interface obtained after searching in a form of a web page, it is detected that a quantity of times of tapping performed by the user exceeds zero, staying duration of the user on an interface exceeds 5 s, and object opening times exceeds 2. |
|  | Object opening | Opening times > 2 | Necessary |  |  |
|  | Staying duration | Duration > 5 s | Necessary |  |  |

According to the content in Table 9, it can be known that a matching calculation formula of the feedback policy of the search application is as follows:

(tapping times>0)+(staying duration>5 s)+(opening times>2).

For example, a feedback policy is that a detected user behavior includes at least twice of object opening. For example, the user accesses a next-level page and then returns to a previous-level page for a plurality of times, and browsing duration exceeds 5 s.

It should be noted that the tapping and the opening may be a same execution action. For example, opening an interface by a user is a tapping operation, and is an object opening operation.

For example, as shown in FIG. 13A to FIG. 13G, it is assumed that after the terminal device displays the interface A, the terminal device starts to detect whether the operation behavior performed by the user on the application A is matched with the feedback policy corresponding to the application A. If the terminal device detects that the current scenario is the web page scenario, the terminal device may determine that the feedback policy used when the application feedback method is executed is the feedback policy corresponding to the web page scenario, that is, content in Table 9.

Then, when the terminal device performs S703, after the terminal device detects that the user taps a "basketball association" link in the interface, a current interface A jumps to an interface B. The terminal device further detects that the user performs a return operation on the interface B. and then returns from the interface B to the interface A. Then, after the terminal device detects that the user taps a "basketball game" link in the interface A, the current interface A jumps to an interface C. The terminal device further detects that the user performs a return operation on the interface C, then returns from the interface C to the interface A, and the user stays on the interface A for 10 s. A user behavior detected by the terminal device includes four tapping operations, two object opening operations, and staying duration of 10 s.

Further, the terminal device matches the collected user behavior with the feedback policy in Table 9, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on a current interface D. After detecting that the user taps the feedback button, the terminal device displays a feedback interface associated with the feedback button, and the terminal device performs S707 to obtain a feedback suggestion that is submitted by the user through the feedback interface and that is for the search application, to complete a feedback interaction process between the user and the application.

In this embodiment of this application, after the terminal device detects that the user taps the feedback button, displayed cases may alternatively be as shown in FIG. 9A to FIG. 11B in Embodiment 1. This is not specifically limited.

According to the foregoing content, this embodiment of this application provides a web page display scenario, in which a feedback button is dynamically generated based on a detected user behavior and a corresponding feedback policy, flexibility is better, and user experience is high.

Embodiment 4: An example of application performed based on the application feedback method in this application when a display interface in search application is a suggestion (suggestion) case, which may also be referred to as an entering scenario, is provided.

In an optional manner, it is assumed that, in this embodiment of this application, when the search application A is in a web page case, an application feedback policy that is set is shown in the following Table 10.

TABLE 10

Feedback policy 8 of search application A
Feedback policy of search application A

| Applicable to | Selected dimension | Criteria | Necessity | Generated feedback policy | Feedback policy description |
|---|---|---|---|---|---|
| Information stream | User entering Staying duration | Entering times > 2 Duration > 5 s | Necessary Necessary | (Entering times > 2) + (staying duration > 5 s) | After a user opens the search application A, when the user enters information in a search bar but has not performed searching, it is detected that the user enters information in the search bar for more than three times, and a cursor stays in the search bar for more than 5 s. |

According to the content in Table 10, it can be known that a matching calculation formula of the feedback policy of the search application is as follows:

(staying duration>5 s)+(entering times>2).

That is, the feedback policy is that, when a user behavior is detected, the following conditions need to be met: entering times in the search bar exceeds 2, and staying duration of the cursor in the search bar exceeds 5 s. It should be noted that in this embodiment of this application, a quantity of entering times in the search bar may be a quantity of independent English input times, or a quantity of independent Chinese input times, or a total quantity of English input times and Chinese input times.

For example, as shown in FIG. 14A to FIG. 14F, it is assumed that after the terminal device enters a query word in the interface A, the terminal device starts to detect whether the operation behavior performed by the user on the application A is matched with the feedback policy corresponding to the application A. If the terminal device detects that the current scenario is the suggestion scenario, the terminal device may determine that the feedback policy used when the application feedback method is executed is the feedback policy corresponding to the suggestion scenario, that is, content in Table 10.

When the terminal device performs S703, and when the terminal device detects that the user enters information "Basket" in the search bar but has not performed searching, a display interface is the interface A. When the user continues to enter a word "ball" in the search bar of the interface A but has not performed searching, a display interface is an interface B. The user continues to enter a word "compe" in the search bar again but has not performed searching, a display interface is an interface C, and it is detected that the cursor stays in the search bar for up to 10 s. A user behavior detected by the terminal device includes three entering operations and staying duration of 10 s.

Further, the terminal device matches the collected user behavior with the feedback policy in Table 10, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on the current interface C. After detecting that the user taps the feedback button, the terminal device displays a feedback interface associated with the feedback button, and the terminal device performs S707 to obtain a feedback suggestion that is submitted by the user through the feedback interface and that is for the search application, to complete a feedback interaction process between the user and the application.

In an optional manner, it is assumed that, in this embodiment of this application, when the search application A is in a web page case, an application feedback policy that is set is shown in the following Table 11.

TABLE 11

Feedback policy 9 of the search application A
Feedback policy of the search application A

| Applicable to | Selected dimension | Criteria | Necessity | Generated feedback policy | Feedback policy description |
|---|---|---|---|---|---|
| Information stream | User entering | Entering times > 2 | Necessary | (Entering times > 2) | After a user opens the search application A, when the user enters information in a search bar but has not performed searching, it is detected that the user performs entering |

TABLE 11-continued

Feedback policy 9 of the search application A
Feedback policy of the search application A

| Applicable to | Selected dimension | Criteria | Necessity | Generated feedback policy | Feedback policy description |
|---|---|---|---|---|---|
| | | | | | more than two times in the search bar. |

According to content in Table 11, it can be known that a matching calculation formula of the feedback policy of the search application is as follows:

(entering times>2).

That is, the feedback policy is that, when a user behavior is detected, the following condition needs to be met: entering times in the search bar exceeds 2. It should be noted that in this embodiment of this application, a quantity of entering times in the search bar may be a quantity of independent English input times, or a quantity of independent Chinese input times, or a total quantity of English input times and Chinese input times.

For example, as shown in FIG. 15A to FIG. 15F, it is assumed that after the terminal device enters a query word in an interface A, the terminal device starts to detect whether the operation behavior performed by the user on the application A is matched with the feedback policy corresponding to the application A. If the terminal device detects that the current scenario is the suggestion scenario, the terminal device may determine that the feedback policy used when the application feedback method is executed is the feedback policy corresponding to the suggestion scenario, that is, content in Table 11.

Then, when the terminal device performs S703, and when the terminal device detects that the user enters information "Basket" in the search bar but has not performed searching, a display interface is the interface A. When the user continues to enter a word "ball" in the search bar of the interface A but has not performed searching, a display interface is an interface B. The user continues to enter a word "compe" in the search bar again but has not performed searching, a display interface is an interface C. A user behavior detected by the terminal device includes three entering operations.

Further, the terminal device matches the collected user behavior with the feedback policy in Table 11, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on the current interface C. After detecting that the user taps the feedback button, the terminal device displays a feedback interface associated with the feedback button, and the terminal device performs S707 to obtain a feedback suggestion that is submitted by the user through the feedback interface and that is for the search application, to complete a feedback interaction process between the user and the application.

In an optional manner, it is assumed that, in this embodiment of this application, when the search application A is in a web page case, an application feedback policy that is set is shown in the following Table 12.

TABLE 12

Feedback policy 10 of the search application A
Feedback policy of the search application A

| Applicable to | Selected dimension | Criteria | Necessity | Generated feedback policy | Feedback policy description |
|---|---|---|---|---|---|
| Information stream | Staying duration | Duration > 20 s | Necessary | (Staying duration > 10 s) | After a user opens the search application A, when the user enters information in a search bar but has not performed searching, it is detected that a cursor stays in the search bar for more than 20 s. |

According to the content in Table 12, it can be known that a matching calculation formula of the feedback policy of the search application is as follows:

(staying duration>20 s).

That is, the feedback policy is that, when a user behavior is detected, the following condition needs to be met: staying duration of the cursor in the search bar exceeds 20 s.

Figure 16A:
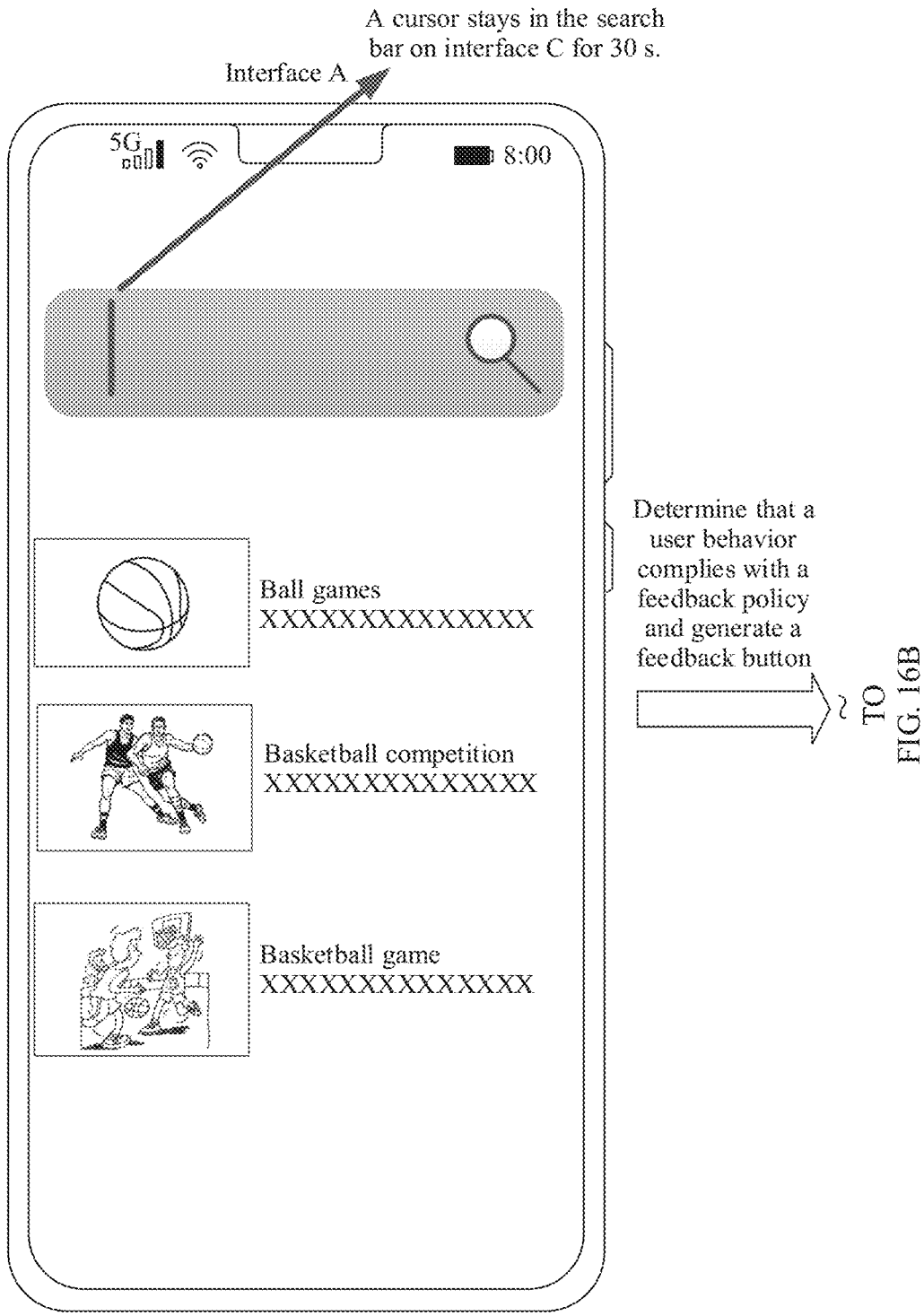
FIG. 16A to FIG. 16C are a schematic diagram of user interface operations in a third recommendation case according to an embodiment of this application.
Figure 16B:
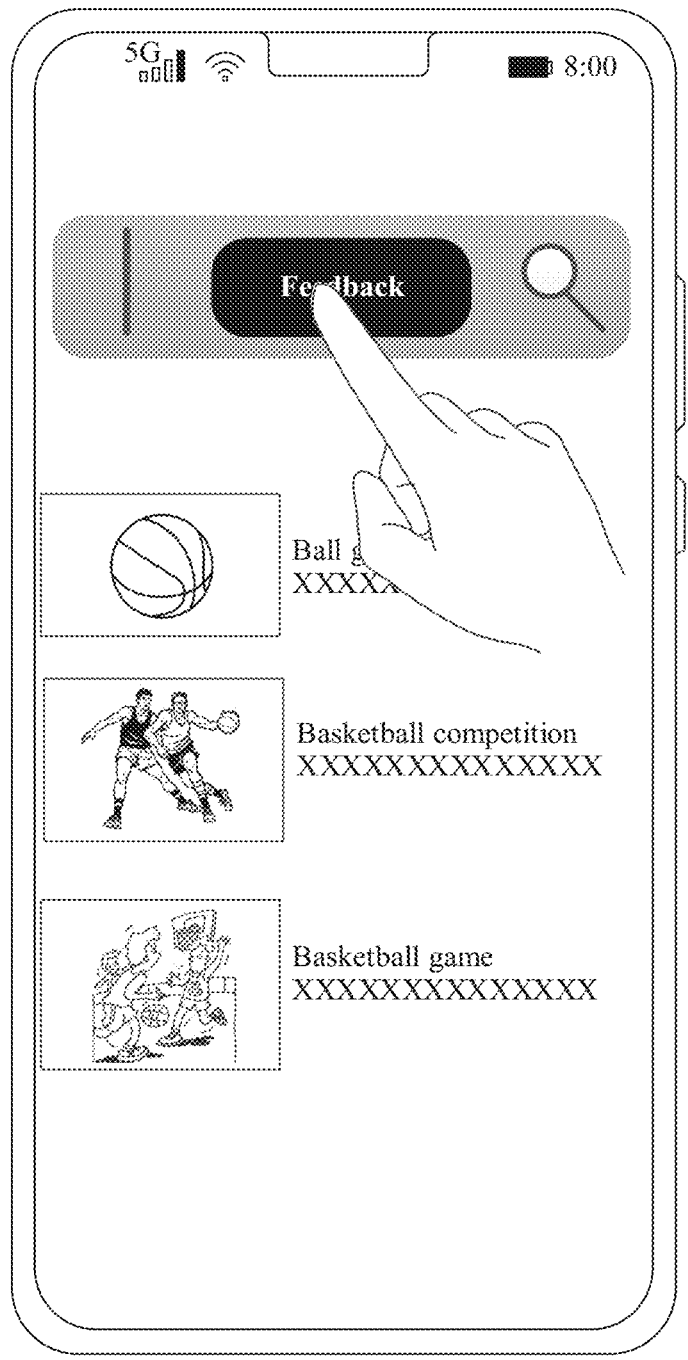
Figure 16C:
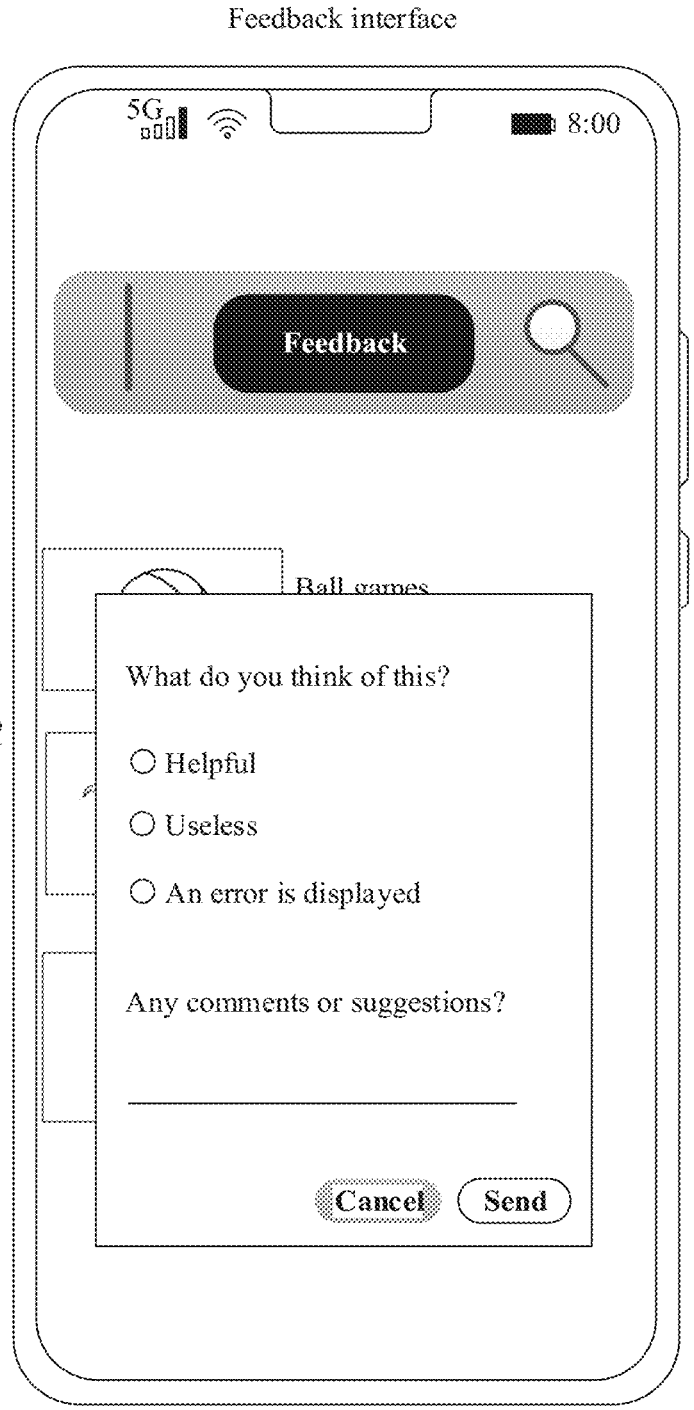

For example, as shown in FIG. 16A to FIG. 16C, it is assumed that, if the terminal device detects that the current scenario is the suggestion scenario, the terminal device may determine that the feedback policy used when the application feedback method is executed is the feedback policy corresponding to the suggestion scenario, that is, content in Table 12.

Then, when the terminal device performs S703, the terminal device detects that the cursor stay's in the search bar for 30 s.

Further, the terminal device matches the collected user behavior with the feedback policy in Table 12, and continues to perform S705 to determine whether the user behavior meets the feedback policy. When the terminal device performs S705, the terminal device determines that the operation behavior of the user for the search application complies with the feedback policy corresponding to the search application.

Therefore, the terminal device performs S706 to generate a feedback button on the current interface C. After detecting that the user taps the feedback button, the terminal device displays a feedback interface associated with the feedback button, and the terminal device performs S707 to obtain a feedback suggestion that is submitted by the user through the feedback interface and that is for the search application, to complete a feedback interaction process between the user and the application.

In this embodiment of this application, after the terminal device detects that the user taps the feedback button, displayed cases may alternatively be as shown in FIG. 9A to FIG. 11B in Embodiment 1. This is not specifically limited.

According to the foregoing content, this embodiment of this application provides a suggestion display scenario, in which a feedback button is dynamically generated based on a detected user behavior and a corresponding feedback policy, flexibility is better, and user experience is high.

It should be noted that an involved tapping operation in policy information described in the foregoing embodiment may include left tapping, right tapping, and a part or all of a double tapping; an involved page turning operation may include turning to a previous page, turning to a next page, and an interface jumping to a page; an involved opening operation may include internal opening, creating and opening, and the like; and an involved scrolling operation may include scrolling of a system peripheral device, such as mouse scrolling and screen swiping.

In addition, it should be noted that, embodiments of this application are not only applicable to a search application, but also applicable to another application, for example, a shopping application, a house rental application, and a music application. For a specific execution method, refer to content of the foregoing search application. For brevity, details are not described herein.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When being implemented in a form of a software function module and sold or used as an independent application, the integrated unit may be stored in a computer-readable storage medium. Based on such an understanding, the technical solutions of embodiments of this application essentially, or the part contributing to the conventional technology, or all or some of the technical solutions may be implemented in the form of a software application. The computer software application is stored in a storage medium and includes several instructions for instructing a computer device (which may be a personal computer, a server, or a network device) or a processor to perform all or some of the steps of the methods in embodiments of this application. The foregoing storage medium includes any medium that can store perform code, such as a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method, applied to an electronic device, wherein the method comprises:
    obtaining an operation behavior performed by a user on at least one display interface of a first application;
    generating a feedback button on a current display interface after determining that the operation behavior successfully matches a feedback policy of the first application, wherein whether to generate the feedback button is determined based on the feedback policy, the feedback policy comprises policy information and at least one threshold associated with the policy information, and the policy information comprises one or more of a tap operation, a page flipping operation, a scrolling operation, browsing duration, an entering operation, and an object opening operation;
    obtaining feedback information of the user for the first application based on the feedback button; and
    uploading the feedback information to a server.

2. The method according to claim 1, wherein before the obtaining an operation behavior performed by a user on at least one display interface, the method further comprises:
    detecting a first operation of the user, wherein the first operation is an operation of opening the first application; and
    obtaining the feedback policy of the first application either from the server or locally.

3. The method according to claim 1, wherein before the determining that the operation behavior successfully matches a feedback policy of the first application, the method further comprises:
    collecting a second operation behavior of the user after detecting that the user performs a search behavior on the first application.

4. The method according to claim 1, wherein before the determining that the operation behavior successfully matches a feedback policy of the first application, the method further comprises:
    determining scenario information of the first application; and
    determining a feedback policy corresponding to the scenario information based on a correspondence between the scenario information and the feedback policy.

5. The method according to claim 4, wherein when the current scenario information indicates a box scenario, the feedback policy comprises at least one of the following parameters:
   tapping times, and browsing duration;
   when the current scenario information indicates an information stream scenario, the feedback policy comprises at least one of the following parameters:
   scrolling times, and browsing duration;
   when the current scenario information indicates a web page scenario, the feedback policy comprises at least one of the following parameters:
   object opening times, and browsing duration; and
   when the current scenario information indicates an entering scenario, the feedback policy comprises at least one of the following parameters:
   entering times, and staying duration of a cursor in a search bar.

6. The method according to claim 5, wherein the current scenario information indicates the box scenario, the feedback policy comprises the tapping times, the browsing duration, and page turning times, and the at least one threshold comprises a first threshold, a second threshold, and a third threshold.

7. The method according to claim 6, wherein generating a feedback button comprises generating the feedback button upon determining that the tapping times are larger than the first threshold, the page turning times are smaller than the second threshold, and the browsing duration is larger than the third threshold.

8. The method according to claim 1, wherein the method further comprises:
   displaying a feedback control based on a control attribute indicated in the feedback policy, wherein
   the control attribute comprises a part or all of a control type, a control location, a control size, a control color, and a control shape.

9. The method according to claim 1, wherein the method further comprises:
   in response to that no operation performed by the user on the control is detected within threshold duration, stopping displaying the feedback control.

10. The method according to claim 1, wherein the method further comprises:
    in response to receiving a feedback progress query instruction sent by the user, obtaining feedback progress of the first application.

11. A device, comprising one or more processors, at least one memory, and a transceiver, wherein the at least one memory is coupled to the one or more processors and stores programming instructions for execution by the one or more processor to cause the device to perform operations comprising:
    obtaining an operation behavior performed by a user on at least one display interface of a first application;
    generating a feedback button on a current display interface after determining that the operation behavior successfully matches a feedback policy of the first application, wherein whether to generate the feedback button is determined based on the feedback policy, the feedback policy comprises policy information and at least one threshold associated with the policy information, and the policy information comprises one or more of a tap operation, a page flipping operation, a scrolling operation, browsing duration, an entering operation, and an object opening operation;
    obtaining feedback information of the user for the first application based on the feedback button; and
    uploading the feedback information to a server.

12. The device according to claim 11, wherein before the obtaining an operation behavior performed by a user on at least one display interface, the operations further comprise:
    detecting a first operation of the user, wherein the first operation is an operation of opening the first application; and
    obtaining the feedback policy of the first application either from the server or locally.

13. The device according to claim 11, wherein before the determining that the operation behavior successfully matches a feedback policy of the first application, the operations further comprise:
    collecting a second operation behavior of the user after detecting that the user performs a search behavior on the first application.

14. The device according to claim 11, wherein before the determining that the operation behavior successfully matches a feedback policy of the first application, the operations further comprise:
    determining scenario information of the first application; and
    determining a feedback policy corresponding to the scenario information based on a correspondence between the scenario information and the feedback policy.

15. The device according to claim 11, wherein when the current scenario information indicates a box scenario, the feedback policy comprises at least one of the following parameters:
    tapping times, and browsing duration;
    when the current scenario information indicates an information stream scenario, the feedback policy comprises at least one of the following parameters:
    scrolling times, and browsing duration;
    when the current scenario information indicates a web page scenario, the feedback policy comprises at least one of the following parameters:
    object opening times, and browsing duration; and
    when the current scenario information indicates an entering scenario, the feedback policy comprises at least one of the following parameters:
    entering times, and staying duration of a cursor in a search bar.

16. The device according to claim 11, wherein the operations further comprise:
    displaying a feedback control based on a control attribute indicated in the feedback policy, wherein
    the control attribute comprises a part or all of a control type, a control location, a control size, a control color, and a control shape.

17. The device according to claim 11, wherein the operations further comprise:
    in response to that no operation performed by the user on the control is detected within threshold duration, stopping displaying the feedback control.

18. The device according to claim 11, wherein the operations further comprise:
    in response to receiving a feedback progress query instruction sent by the user, obtaining feedback progress of the first application.

19. A non-transitory computer storage medium of a device, coupled to one or more processors of the device and storing programming instructions for execution by the one or more processors to cause the device to perform operations comprising:

obtaining an operation behavior performed by a user on at least one display interface of a first application;

generating a feedback button on a current display interface after determining that the operation behavior successfully matches a feedback policy of the first application, wherein whether to generate the feedback button is determined based on the feedback policy, the feedback policy comprises policy information and at least one threshold associated with the policy information, and the policy information comprises one or more of a tap operation, a page flipping operation, a scrolling operation, browsing duration, an entering operation, and an object opening operation;

obtaining feedback information of the user for the first application based on the feedback button; and uploading the feedback information to a server.

* * * * *